(12) United States Patent
de Castro Alves et al.

(10) Patent No.: US 8,122,006 B2
(45) Date of Patent: Feb. 21, 2012

(54) EVENT PROCESSING QUERY LANGUAGE INCLUDING RETAIN CLAUSE

(75) Inventors: Alexandre de Castro Alves, San Jose, CA (US); James Taylor, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 383 days.

(21) Appl. No.: 12/043,480

(22) Filed: Mar. 6, 2008

(65) Prior Publication Data

US 2008/0301124 A1 Dec. 4, 2008

Related U.S. Application Data

(60) Provisional application No. 60/940,655, filed on May 29, 2007, provisional application No. 60/947,011, filed on Jun. 29, 2007.

(51) Int. Cl.
*G06F 17/30* (2006.01)
(52) U.S. Cl. ........................................... 707/713
(58) Field of Classification Search .................. 707/769, 707/999.004, 713
See application file for complete search history.

(56) References Cited

U.S. PATENT DOCUMENTS

| | | | |
|---|---|---|---|
| 5,991,751 A | 11/1999 | Rivette et al. | |
| 6,138,121 A * | 10/2000 | Costa et al. ............................ | 1/1 |
| 6,141,647 A * | 10/2000 | Meijer et al. .................... | 705/1.1 |
| 6,408,324 B1 | 6/2002 | Wallace et al. | |
| 6,502,133 B1 | 12/2002 | Baulier et al. | |
| 6,785,677 B1 | 8/2004 | Fritchman | |
| 6,795,854 B1 | 9/2004 | Parker et al. | |
| 7,162,540 B2 | 1/2007 | Jasen et al. | |
| 7,356,764 B2 | 4/2008 | Radja et al. | |
| 7,457,728 B2 | 11/2008 | Chen et al. | |
| 7,627,544 B2 | 12/2009 | Chkodrov et al. | |
| 7,661,032 B2 | 2/2010 | Eberbach et al. | |
| 2005/0060372 A1 | 3/2005 | DeBettencourt et al. | |
| 2005/0108001 A1 | 5/2005 | Aarskog | |
| 2005/0108718 A1 | 5/2005 | Kumar et al. | |
| 2006/0184410 A1 | 8/2006 | Ramamurthy et al. | |
| 2006/0230029 A1 | 10/2006 | Yan | |
| 2006/0230071 A1 * | 10/2006 | Kass et al. ................. | 707/104.1 |
| 2006/0282695 A1 | 12/2006 | Mital et al. | |
| 2007/0043703 A1 * | 2/2007 | Bhattacharya et al. ........... | 707/3 |
| 2007/0250766 A1 * | 10/2007 | Medi et al. ..................... | 715/513 |
| 2007/0271280 A1 * | 11/2007 | Chandasekaran ............. | 707/100 |
| 2008/0120283 A1 * | 5/2008 | Liu et al. ........................... | 707/4 |

(Continued)

FOREIGN PATENT DOCUMENTS

WO WO 00/29942 A1 5/2000

OTHER PUBLICATIONS

Gawlick et al., Event Processing with an Oracle Database, Jun. 14-16, 2005, SIGMOD 2005, pp. 863-867.*

(Continued)

*Primary Examiner* — James Trujillo
*Assistant Examiner* — Jorge A Casanova
(74) *Attorney, Agent, or Firm* — Fliesler Meyer LLP

(57) ABSTRACT

An event processor can use event processing queries to operate an event. Event processing queries can include a "retain" clause that limits the amount of data over which the query is run.

18 Claims, 20 Drawing Sheets

U.S. PATENT DOCUMENTS

2008/0189277 A1      8/2008    Meijer et al.
2008/0307435 A1     12/2008    Rehman

OTHER PUBLICATIONS

The Stream Group, "STREAM: The Stanford Stream Data Manager", IEEE Data Engineering Bulletin, Mar. 13, 2003, 8 pages, vol. 26, Issue 1, Stanford University.

Bob Hagmann, "Stream, Schema, Adapter, and Parameter CCL Language Extensions", (C)2004-2007, 7 pages, Corel8, Inc. Retrieved from: http://www.coral8.com/developers/documentation.html.

CORAL8, Inc,. "Coral8 Programmer's Guide", (c) 2004-2007, 79 pages.

Lamonica, "A New Event in Programming?", Oct. 12, 2004, 3 pages, CNET Networks, Inc.

Santoro, et al., "SPARC-V9 Architecture Specification with Rapide", Technical Report: CSL-TR-95-677, Sep. 1995, Stanford University.

Arasu, et al., "STREAM: The Stanford Data Stream Management System", Mar. 15, 2004, 21 pages. retrieved from http:/dbpubs.stanford.edu/pub/2004-20.

Srivastava, et al., "Flexible Time Management in Data Stream Systems". PODS, Jun. 14-16, 2004, 11 pages, ACM, Paris, France.

Dani, et al., "Conceptual Modelling of Computations on Data Streams", Second Asia-Pacific Conference on Conceptual Modelling (APCCM2005), 2005, 6 pages. retrieved from: http://citeseer.ist.psu.edu/dani05conceptual.html.

Hinze, "Efficient Filtering of Composite Events", Proceedings of he 20th British National Database Conference, 2003, 19 pages, Coventry, UK. retrieved from http://citeseer.ist.psu.edu/hinze03efficient.html.

Wu, et al., "High-Performance Complex Event Processing Over Streams", Proceedings of the 2006 ACM SIGMOD international conference on Management of data, 2006, pp. 407-418. retrieved from http://portal.acm.org/citation.cfm?doid=1142473.1142520.

Stonebraker, et al., "The 8 Requirements of Real-time Stream Processing", ACM SIGMOD Record, Dec. 2005, pp. 42-47, vol. 34, Issue 4. retrieved from: http://portal.acm.org/citation.cfm?doid=1107499.1107504.

International Search Report for PCT/US2008/63986, dated Sep. 2, 2008, 11 pages.

International Search Report re: Application No. PCT/US2008/073046, ISA/KR, dated Feb. 25, 2009, 13 pages.

The Stream Group, "STREAM: The Stanford Stream Data Manager", Bulletin of IEEE Computer Society Technical Committee on Data Engineering, Mar. 2003, Stanford University, Stanford CA, 8 pages.

Unknown, "Stream, Schema, Adapter, and Parameter CCL Language Extensions", Coral8 Engine Version 4.8, 7 pages.

CORAL8, Inc., "Coral8 Programmer's Guide Version 4.8", 2004-2007, 79 pages.

Lamonica, "A New Event in Programming?", Oct. 12, 2004, CNET News.com, 3 pages.

Santoro, et al., SPARC-V9 Architecture Specification with Rapide, Technical Report: CSL-TR-95-677, Sep. 1995, Stanford University, Stanford, CA, 71 pages.

Arasu, et al., "STREAM: The Stanford Data Stream Management System", Mar. 14, 2004, 21 pages.

* cited by examiner

EVENT PROCESSING QUERY LANGUAGE INCLUDING RETAIN CLAUSE

CLAIM OF PRIORITY

This application claims priority from the following application, which is hereby incorporated in their entirety: U.S. Provisional Application No. 60/940,655 entitled: "EVENT PROCESSING LANGUAGE", by Alexandre Alves, et al., filed May 29, 2007, and to U.S. Provisional Application No. 60/947,011 entitled: "EVENT PROCESSING QUERY LANGUAGE", by Alexandre Alves, et al., filed Jun. 29, 2007.

BACKGROUND

Event processing is becoming more and more popular. In a complex event processor, streams of data are evaluated in real time. Because of the amount of data and the operation speeds required, the data is not stored into a database before it is processed. This means that a typical database language like SQL is not sufficient for processing the data.

DETAILED DESCRIPTION

Figure 1:
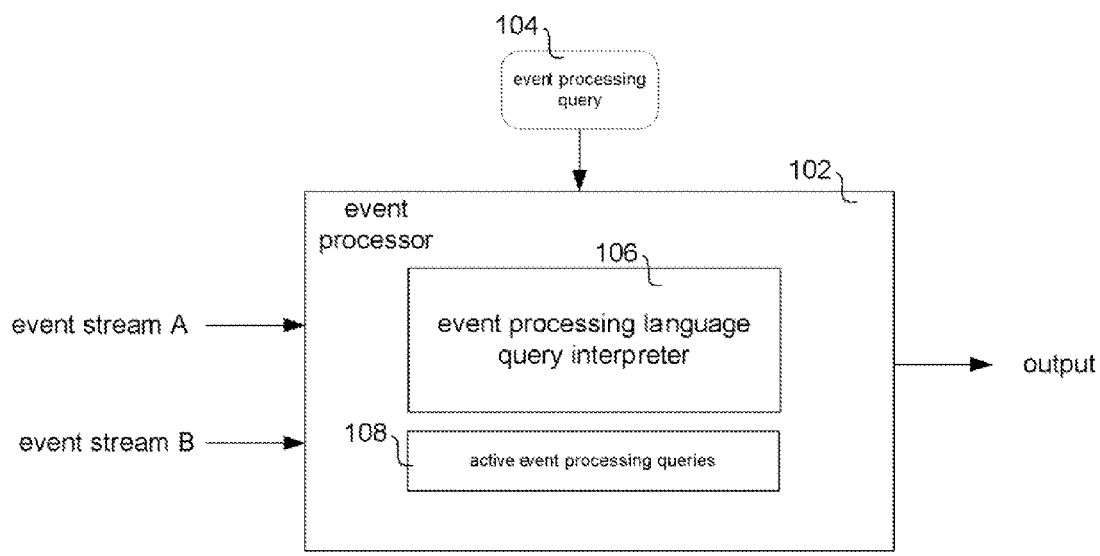
FIG. 1 illustrates an event processor of one embodiment of the present invention.

FIG. 1 shows an example of a system where event processor 102 operates on one or more event streams. In this example, event streams A and B are sent to the event processor 102. The event processing language queries can be used by the event processor 102 to operate on the event streams.

In one example, the event processing language queries 104 are interpreted by an event processing query language interpreter 106. Queries 108 can then operate on event streams.

Figure 2:
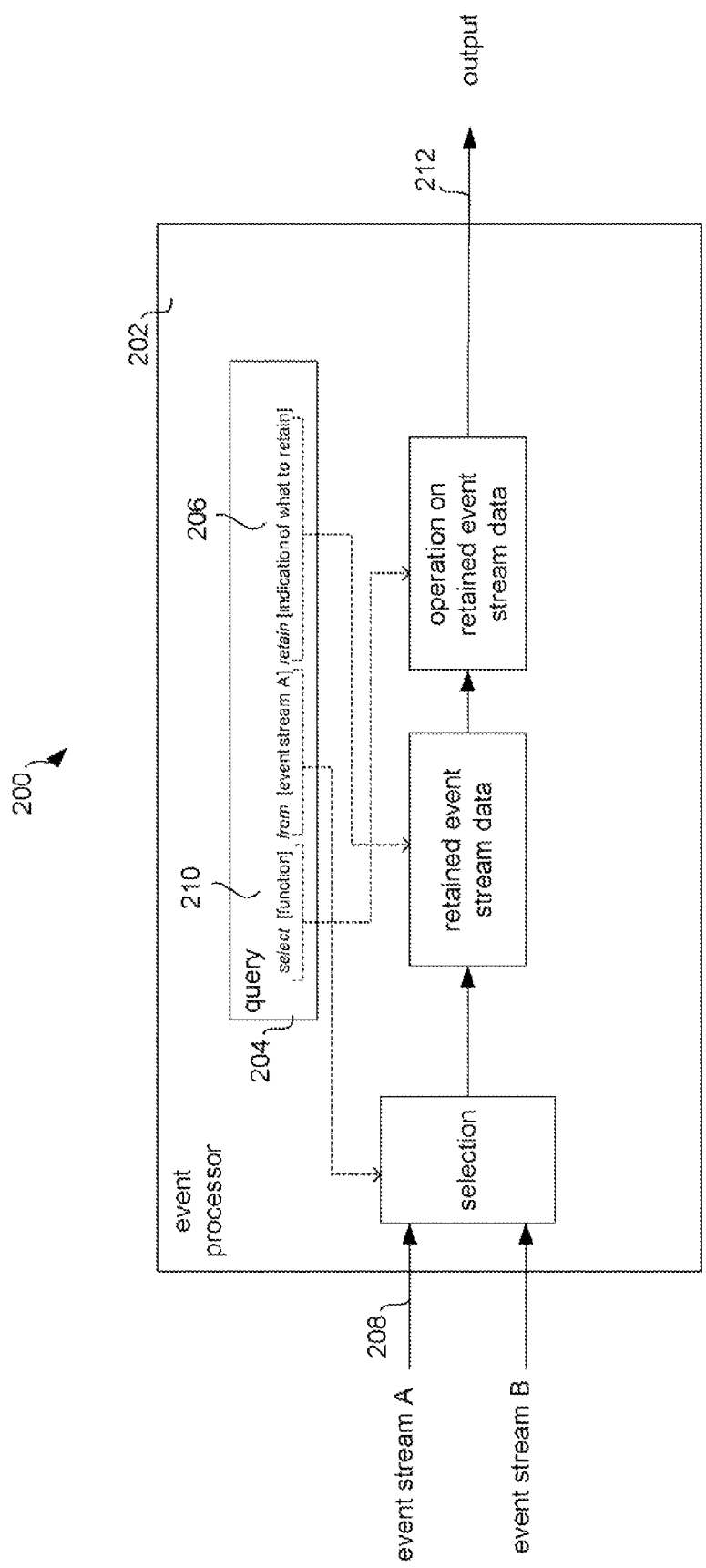
FIG. 2 illustrates the use of a "retain" clause in an event processing language.

FIG. 2 shows an exemplary computer implemented system 200 comprising an event processor using queries to operate on an event. At least some event processing queries includes a "retain" clause that limits the amount of data over which the query is run.

FIG. 2 is a functional diagram. In the example of FIG. 2, the query 204 includes a retain clause 206 that is used by the event processor 202 to determine how much of the event stream data 208 to retain for processing.

The retained event data can be processed according to a function clause 210 to produce an output 212. The retain clause can limit the query to a certain time period or to a certain number of events.

In one embodiment, at least one RETAIN clause is used in each FROM clause. The RETAIN clause can apply to all stream sources listed in the FROM clause that precedes it. Conceptually it can define a window of event data for each stream source over which the query can be executed. In one embodiment, the RETAIN clause can have the following syntax:

```
RETAIN
  ( ALL [EVENTS] ) |
  ( [BATCH OF]
    ( integer (EVENT|EVENTS) ) | ( time_interval (BASED ON prop_name)* )
    ( PARTITION BY prop_name )*
    ( WITH [n] (LARGEST | SMALLEST | UNIQUE) prop_name )* )
```

To keep all events for a stream source, in one embodiment, ALL [EVENTS] can be specified in the retain clause. For example:

SELECT AVG(price) FROM StockTick RETAIN ALL EVENTS

In this case, the average price can be calculated based on all StockTick events that occur. Care should be taken with this option, however, since memory may run out when making calculations that require all or part of each event object to be retained under high volume scenarios. One such example would be in calculating a weighted average.

In one embodiment, the amount of event data to keep when running the query may be determined in two ways. The first option is to specify the maximum number of events kept. For example, the query below would keep a maximum of 100 StockTick events on which the average price would be computed:

SELECT AVG(price) FROM StockTick RETAIN 100 EVENTS

As each new StockTick event comes in, the average price would be computed, with a maximum of 100 events being used for the calculation.

The second option is to specify the time interval in which to collect event data. For example, the query below would keep 1 minute's worth of StockTick events and compute the average price for this data:

SELECT AVG(price) FROM StockTick RETAIN 1 MINUTE

In this case, as each new StockTick event comes in, again the average price would be computed. However, events that arrived more than one minute ago would be removed from the window with the average price being recalculated based on the remaining events in the window.

In one embodiment, by default, the windows holding event data are sliding. With sliding windows, as a new event enters the window, an old events fall off the end of the window once the window is at capacity. Sliding windows can cause the query to be re-executed as each new event enters and/or old event leaves the window. An alternative is to specify that the event data should be batched prior to query execution. Only when the window is full, is the query is executed. After this, new event data can again be collected until the window is once again full at which time the query can be re-executed.

For example, the query below would batch together 100 events prior to executing the query to compute the average price:

SELECT AVG(price) FROM StockTick RETAIN BATCH OF 100 EVENTS

Once executed, it would batch the next 100 events together prior to re-executing the query.

In one embodiment, the time interval for the RETAIN clause may be specified in days, hours, minutes, seconds, and/or milliseconds:

```
time_interval: [day-part][hour-part][minute-part][seconds-part][milliseconds-part]
    day-part: number ("days" | "day")
    hour-part: number ("hours" | "hour" | "hr")
    minute-part: number ("minutes" | "minute" | "min")
    seconds-part: number ("seconds" | "second" | "sec")
    milliseconds-part: number ("milliseconds" | "millisecond" | "msec" | "ms")
```

Some examples of time intervals are: 10 seconds; 10 minutes; 30 seconds; 20 sec; 100 msec; 0.5 minutes; and 1 day 2 hours 20 minutes 15 seconds 110 milliseconds By default, the elapse of a time interval can be based on an internal system clock. However, in some cases, the time can be based on a timestamp value appearing as an event property. In one embodiment, a BASED ON clause can be used to specify the property name containing a long-typed timestamp value. This can be applicable for time-based windows. In this example, the StockTick events would be expected to have a 'timestamp' property of type long whose value would control inclusion into and removal from the window:

SELECT AVG(price) FROM StockTick RETAIN 1 MINUTE BASED ON timestamp

If more than one event source in the FROM clause has the same named property to store the timestamp, it can be listed a single time in the BASED ON clause. If multiple, differently named properties are used for the timestamp value, the BASED ON clause can be repeated. In one embodiment, when using the BASED ON clause, each stream source listed in the FROM clause has an associated timestamp property listed or an exception can be thrown. A property may be referred to by simply using its property name within the RETAIN clause. However, if ambiguities exist because the same property name exists in more than one stream source in the FROM clause, it can be prefixed with its alias name followed by a period (similar to the behavior of properties referenced in the SELECT clause). A PARTITION BY clause can allow a window to be further subdivided into multiple windows based on the unique values contained in the properties listed. For example, the following query can keep 3 events for each unique stock symbol:

```
SELECT stockSymbol, price
FROM StockTick RETAIN 3 EVENTS PARTITION BY stockSymbol
```

Conceptually this can be similar to the GROUP BY functionality in SQL or EPL. However, the PARTITION BY clause only controls the size and subdivision of the window and does not cause event data to be aggregated as with the GROUP BY clause. However, in most cases, the PARTITION BY clause can be used in conjunction with the GROUP BY clause with same properties specified in both.

The following examples illustrate the interaction between PARTITION BY and GROUP BY. In the first example, with the absence of the PARTITION BY clause, a total of 10 events can be kept across all stock symbols.

```
SELECT stockSymbol, AVG(price)
FROM StockTick RETAIN 10 EVENTS
GROUP BY stockSymbol
```

The average price for each unique set of stock symbol can be computed based on these 10 events. If a stock symbol of "AAA" comes into the window, it may cause a different stock symbol such as "BBB" to leave the window. This would cause the average price for both the "AAA" group as well as the "BBB" group to change. The second example includes the PARTITION BY clause and the GROUP BY clause.

```
SELECT stockSymbol, AVG(price)
FROM StockTick RETAIN 10 EVENTS PARTITION BY stockSymbol
GROUP BY stockSymbol
```

In this case, 10 events can be kept for each unique stock symbol. If a stock symbol of "AAA" comes into the window, it would only affect the sub-window associated with that symbol and not other windows for different stock symbols. Thus, in this case, only the average price of "AAA" would be affected.

In one embodiment, the WITH clause can allow the largest, smallest, and unique property values to be kept in the window. For example, to keep the two highest priced stocks, the following statement would be used:

```
SELECT stockSymbol, price FROM StockTick RETAIN 2 EVENTS WITH LARGEST price
```

In the case of time-based windows, the [n] qualifier before the LARGEST or SMALLEST keyword can determine how many values are kept. For example, the following statement would keep the two smallest prices seen over one minute:

```
SELECT stockSymbol, price FROM StockTick RETAIN 1 MINUTE WITH 2 SMALLEST price
```

In the absence of this qualifier, the single largest or smallest value can be kept. The UNIQUE qualifier can cause the window to include only the most recent among events having the same value for the specified property. For example, the following query would keep only the last stock tick for each unique stock symbol:

SELECT * FROM StockTick RETAIN 1 DAY WITH UNIQUE stockSymbol

Prior events of the same property value can be posted as old events by the engine. The query is done as a sliding window.

Figure 3:
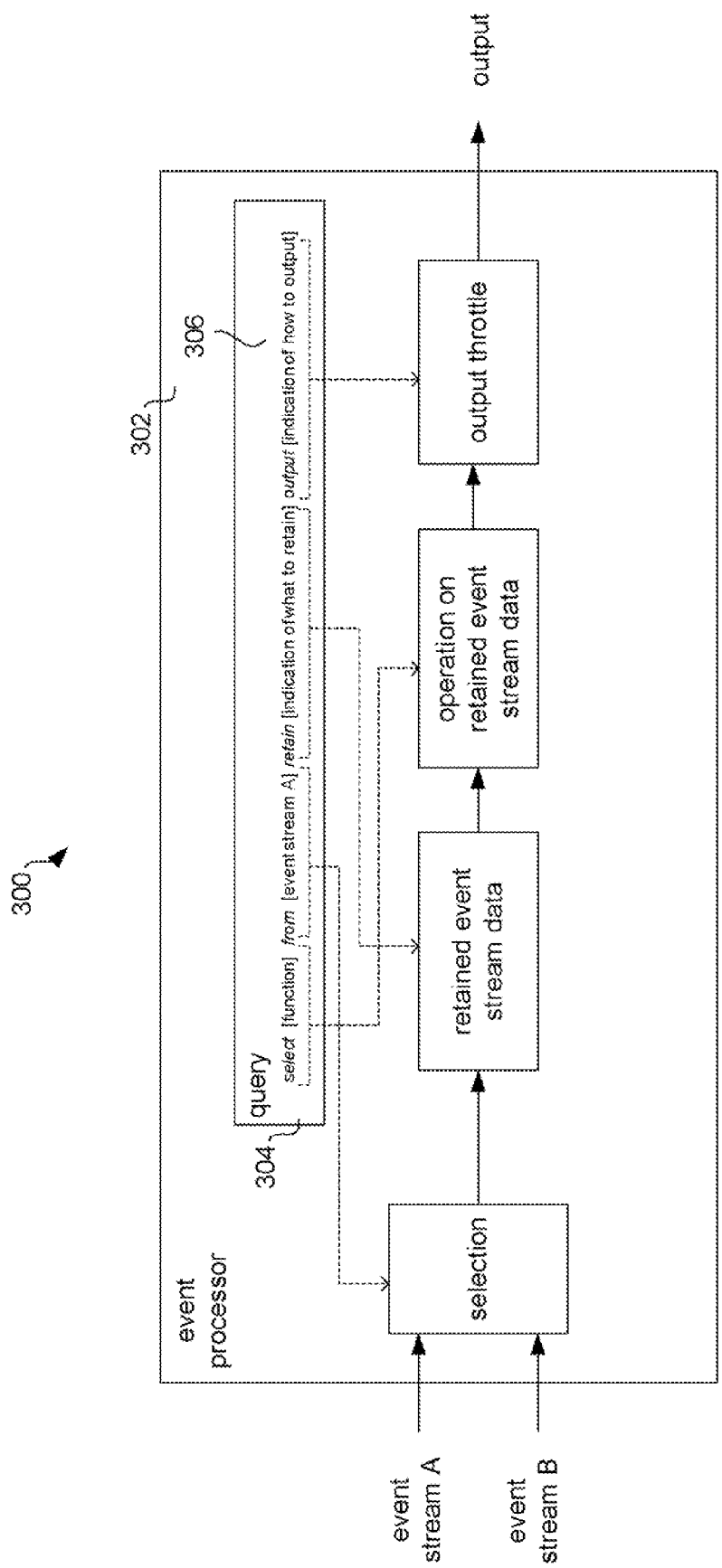
FIG. 3 illustrates the use of an "output" clause in an event processing language.

FIG. 3 shows a computer-implemented system comprising an event processor 302 using queries to operate on event streams. At least some event queries 304 can include an output clause 306 to restrict the output of the query.

In the functional diagram example of FIG. 3, the query 304 includes an output clause 306 that is used by event processor 302 to determine how to throttle the output.

The output clause can hold the output of the query until a certain amount of time has occurred or until a certain number of events have been received.

The output of the query can be another stream. An "insert into" clause can be used to create another stream.

A "First" keyword can indicate that the first event or events in an output batch is to be output. A "Last" keyword can indicate that the last event or events in an output batch is to be output.

The OUTPUT clause can be optional in the event processing language and can be used to control or stabilize the rate at which events are output. For example, the following statement can batch old and new events and outputs them at the end of every 90 second interval.

```
SELECT * FROM StockTickEvent RETAIN 5 EVENTS OUTPUT
EVERY 90 SECONDS
```

Here is the syntax for output rate limiting of one embodiment:

```
OUTPUT [ALL | ( (FIRST | LAST) [number]] EVERY number
[EVENTS | time_unit]
   where
   time_unit: MIN | MINUTE | MINUTES | SEC | SECOND |
   SECONDS | MILLISECONDS | MS
```

The ALL keyword can be the default and specifies that all events in a batch should be output. The batch size can be specified in terms of time or number of events.

The FIRST keyword can specify that only the first event in an output batch is to be output. The optional number qualifier can allow more than one event to be output. The FIRST keyword can instruct the engine to output the first matching event(s) as soon as they arrive, and then ignore matching events for the time interval or number of events specified. After the time interval elapsed, or the number of matching events has been reached, the same cycle can start again.

The LAST keyword can specify to only output the last event at the end of the given time interval or after the given number of matching events have been accumulated. The optional number qualifier allows more than one event to be output.

The time interval can also be specified in terms of minutes or milliseconds; the following statement is identical to the first one.

```
SELECT * FROM StockTickEvent RETAIN 5 EVENTS
OUTPUT EVERY 1.5 MINUTES
```

Another way that output can be stabilized is by batching events until a certain number of events have been collected. The next statement only outputs when either 5 (or more) new or 5 (or more) old events have been batched.

```
SELECT * FROM StockTickEvent RETAIN 30 SECONDS
OUTPUT EVERY 5 EVENTS
```

Additionally, in one embodiment, event output can be further modified by the optional LAST keyword, which causes output of only the last event(s) to arrive into an output batch. For the example below, the last five events would be output every three minutes.

```
SELECT * FROM StockTickEvent RETAIN 30 SECONDS
OUTPUT LAST 5 EVERY 3 MINUTES
```

Using the FIRST keyword you can be notified at the start of the interval. This allows one to be immediately notified each time a rate falls below a threshold.

```
SELECT * FROM TickRate RETAIN 30 SECONDS
WHERE rate < 100
OUTPUT FIRST EVERY 60 SECONDS
```

The OUTPUT clause can interact in two ways with the GROUP BY and HAVING clauses. First, in the OUTPUT EVERY n EVENTS case, the number n can refer to the number of events arriving into the GROUP BY clause. That is, if the GROUP BY clause outputs only 1 event per group, or if the arriving events don't satisfy the HAVING clause, then the actual number of events output by the statement could be fewer than n.

Second, the LAST and ALL keywords can have special meanings when used in a statement with aggregate functions and the GROUP BY clause. The LAST keyword can specify that only groups whose aggregate values have been updated with the most recent batch of events should be output. The ALL keyword (the default) can specify that the most recent data for all groups seen so far should be output, whether or not these groups' aggregate values have just been updated.

Figure 4:
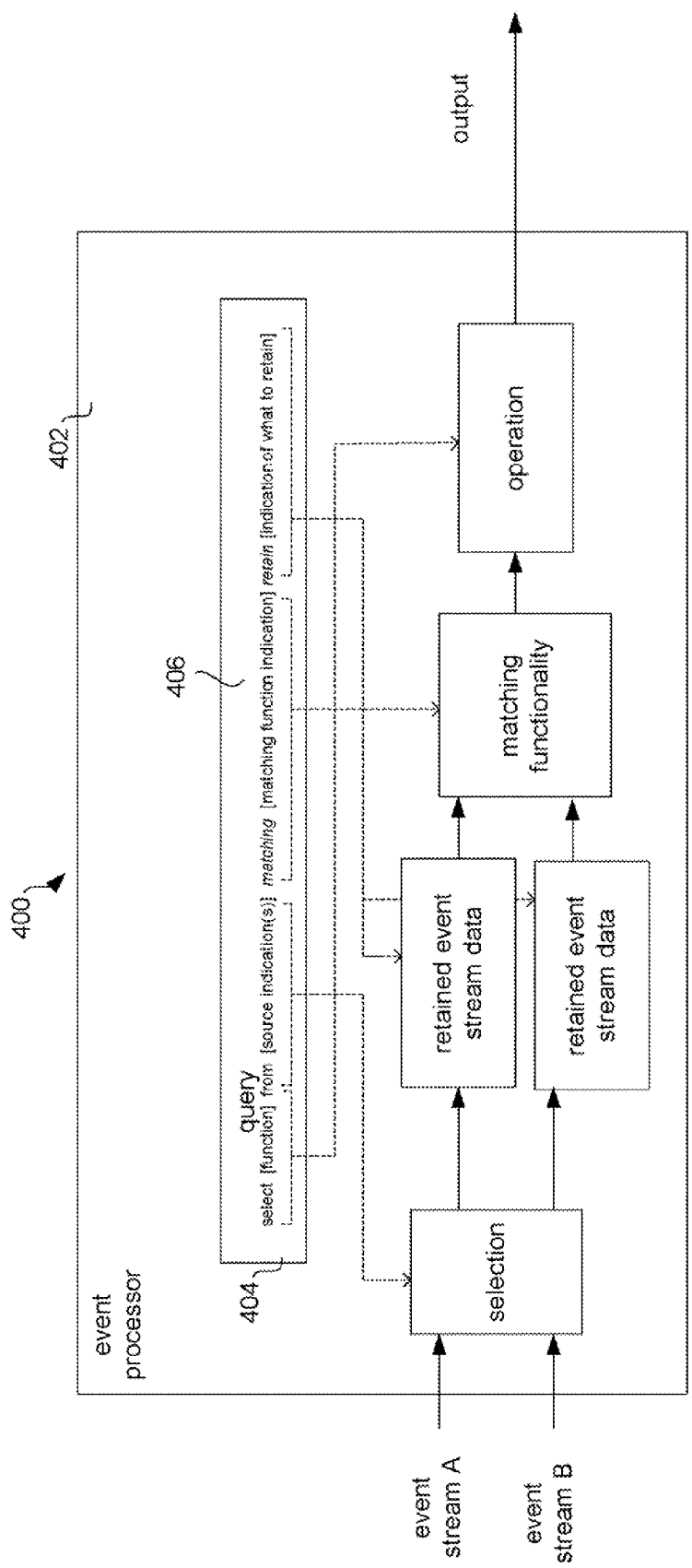
FIG. 4 illustrates the use of pattern matching in an event processing language.

FIG. 4 shows a computer-implemented system 400 comprising an event processor 402 using queries to operate on an event stream. At least some event processing queries 404 can include a "matching" clause 406 that matches a pattern in the event stream or streams.

A variable can be bound to the event that matches. The variable can be used in a later query expression. The first or second stream can be filtered before the matching by filter clause of the query. A "followed by" operator can be used to match event conditions in a particular order.

A query can use Boolean operations for a match. The Boolean operations include an "AND" an "OR" and a "NOT".

In one embodiment, the pattern matching can use multiple event streams.

A MATCHING clause can allow for the detection of a series of one or more events occurring that satisfies a specified pattern. Pattern expressions can be references to streams or stream aliases separated by logical operators such as AND, OR, and FOLLOWED BY to define the sequence of events that compose the pattern. The MATCHING clause can execute prior to the WHERE or HAVING clauses. The syntax can be as follows:

```
MATCHING stream_expression ( ( AND | OR | [NOT]
    FOLLOWED BY ) stream_expression )*
```

The stream_expression can be either a stream source name or a stream source alias optionally bound to a variable and filtered by a parenthesized expression. It can be prefixed by a NOT to match the absence of an event occurring:
stream_expression:   [NOT][var_name=] (stream_name|stream_alias)[(filter_expression)]

The var_name can be bound to the event object occurring that triggers the match. It may be referenced as any other event property in filter expressions that follow as well as in other clauses such as the SELECT and WHERE clauses. An alias can be used to eliminate ambiguity if the same event type is used multiple times in the FROM clause. In one embodiment, the stream_expression can optionally be followed by a parenthesized expression to filter the matching events of that type. The expression act as a precondition for events to enter the corresponding window and has the same syntax as a WHERE clause expression.

In the example below we look for RFIDEvent event with a category of "Perishable" followed by an RFIDError whose id matches the id of the matched RFIDEvent object.

```
SELECT * FROM RFIDEvent,RFIDError RETAIN 1 MINUTE
    MATCHING a=RFIDEvent(category="Perishable")
    FOLLOWED BY RFIDError(id=a.id)
```

The next sections discuss the syntax, semantics, and additional operators available in the MATCHING clause to express temporal constraints for pattern matching of one embodiment.

A FOLLOWED BY temporal operator can match on the occurrence of several event conditions in a particular order. This need not mean that two events must immediately follow each other.

The AND logical operator can require both nested pattern expressions to turn true before the whole expression returns true. In the context of the MATCHING clause, the operator can match on the occurrence of several event conditions but not necessarily in a particular order. For example, the following pattern can match when both event A and event B are found:

A and B

This pattern can match on any sequence of A followed by B in either order. In addition, it is not required that a B event immediately follow an A event—other events may appear in between the occurrence of an A event and a B event for this expression to return true.

The OR logical operator can require either one of the expressions to turn true before the whole expression returns true. In the context of the MATCHING clause, the operator can match on the occurrence of either of several event conditions but not necessarily in a particular order.

For example, the following pattern can match for either event A or event B:

A OR B

The following would detect all stock ticks that are either above a certain price or above a certain volume.

StockTick(price>1.0) OR StockTick(volume>1000)

The NOT operator can negate the truth value of an expression. In the context of the MATCHING clause, the operator can allow the absence of an event condition to be detected.

In one embodiment, the following pattern matches only when an event A is encountered followed by event B but only if no event C was encountered before event B.

(A FOLLOWED BY B) AND NOT C

The FROM clause may list the same event type multiple times. In this case, the event type alias can be used in the MATCHING clause. The statement below is an example in which the pattern matches for one RFIDEvent followed by another RFIDEvent prior to an RFIDErrorEvent occurring:

```
SELECT * FROM RFIDEvent rfidA, RFIDEvent rfidB, RFIDErrorEvent
rfidError
    RETAIN 1 MINUTE
    MATCHING ( rfidA FOLLOWED BY rfidB ) AND NOT rfidError
```

Using the BATCH OF qualifier in the RETAIN clause can have special meaning when matching sequences of events. Without the BATCH OF qualifier, once the specified sequence of events is detected, continued attempts to match can be made with events following the first event in the matched sequence. However, with the BATCH OF qualifier, attempts to match can continue with events following the last event in the matched sequence.

Consider exemplary operations for an example event sequence, as follows:

$A_1 B_1 C_1 B_2 A_2 D_1 A_3 B_3 E_1 A_4 F_1 B_4$

| Example | Description |
|---|---|
| SELECT * FROM EventA A, EventB B RETAIN 1 MINUTE MATCHING A FOLLOWED BY B | The pattern fires for every event A followed by an event B with a sliding window. At the time a pattern is detected with the occurrence of event B, matching starts again with the event after A.<br>1. Matches on $B_1$ for combination $\{A_1, B_1\}$<br>2. Matches on $B_3$ for combination $\{A_2, B_3\}$ and $\{A_3, B_3\}$. Note that two matches occur with $B_3$ since after the first match, the matching continue with events following $A_2$ instead of with event following $B_3$.<br>3. Matches on $B_4$ for combination $\{A_4, B_4\}$ |
| SELECT * FROM EventA A, EventB B RETAIN BATCH OF 1 MINUTE MATCHING A FOLLOWED BY B | The pattern fires for every event A followed by an event B with a batched window. At the time a pattern is detected with the occurrence of event B, matching starts again with the event after B.<br>1. Matches on $B_1$ for combination $\{A_1, B_1\}$<br>2. Matches on $B_3$ for combination $\{A_2, B_3\}$. Note that only one match of $B_3$ occurs since after the first match, matching continues with the events following $B_3$ instead of with the event following $A_2$ as was done above.<br>3. Matches on $B_4$ for combination $\{A_4, B_4\}$ |

Exemplary Embodiment

An exemplary embodiment of a system using methods of the present invention is described below. The following exemplary embodiment is not meant to be limiting as to terms, definitions and the like. For example, language in this section is not intended to limit or define the claim terms but only to describe a particular exemplary embodiment. This section merely describes one exemplary way to implement the present invention. Other architectures implementing the methods and systems of the present invention can be done.

The following describes an Event Processing Language (EPL) for an event server, such as WebLogic Event Server 2.0. The language can allow event data from streams and external JDBC sources to be declaratively filtered, correlated, aggregated, and merged, with the ability to insert results to other streams for further downstream processing. The language can have additional functionality over SQL type languages to both a) constraint the amount of data over which the query is run since unlike relatively static relational table data, the stream data is continuously flowing, and b) detect a series of events that match a specified pattern.

In one embodiment, the Complex Event Processor module can be broken down into the following functional components: event representation, processing model, programmatic interface, and language specification.

Events can be represented as Plain Old JAVA Objects (POJOs) following the JavaBeans conventions. Event properties can be exposed through getter methods on the POJO. When possible, the results from EPL statement execution can also returned as POJOs. However, there are times when un-typed events are returned such as when event streams are joined. In this case, an instance of the Map collection interface can be returned.

The EPL processing model can be continuous: results can be output as soon as incoming events are received that meet the constraints of the statement. In one embodiment, two types of events can be generated during output: insert events for new events entering the output window and remove events for old events exiting the output window. Listeners may be attached and notified when either or both type of events occur.

In one embodiment, incoming events may be processed through either sliding or batched windows. Sliding windows can process events by gradually moving the window over the data in single increments, while batched windows can process events by moving the window over data in discrete chunks. The window size may be defined by the maximum number of events contained or by the maximum amount of time to keep an event.

The EPL programmatic interfaces can allow statements to be individually compiled or loaded in bulk through a URL. Statements may be iterated over, retrieved, started and stopped. Listeners may be attached to statements and notified when either insert and/or remove events occur.

The Event Processing Language (EPL), can be a SQL-like language with SELECT, FROM, WHERE, GROUP BY, HAVING and ORDER BY clauses. Streams replace tables as the source of data with events replacing rows as the basic unit of data. Since events are composed of data, the SQL concepts of correlation through joins, filtering through sub-queries, and aggregation through grouping may be effectively leveraged. The INSERT INTO clause can be recast as a means of forwarding events to other streams for further downstream processing. External data accessible through JDBC may be queried and joined with the stream data. Additional clauses such as the RETAIN, MATCHING, and OUTPUT clauses can also be available to provide language constructs specific to event processing.

The RETAIN clause can constrain the amount of data over which the query is run, essentially defining a virtual window over the stream data. Unlike relational database systems in which tables bound the extents of the data, event processing systems can use alternative, more dynamic means of limiting the queried data.

The MATCHING clause can detect sequences of events matching a specific pattern. Temporal and logical operators such as AND, OR, and FOLLOWED BY can enable both occurrence of and absence of events to be detected through arbitrarily complex expressions.

The OUTPUT clause can throttle results of statement execution to prevent overloading downstream processors. Either all or a subset of the first or last resulting events can be passed on in either time or row-based batches.

An event can be an immutable record of a past occurrence of an action or state change. In this example, event is represented by the com.bean.wlrt.ede.StreamingEvent interface. In this example, an event can have an underlying object that represents the event object which is accessible through the StreamingEvent.getUnderlying( ) method. In one embodiment, the underlying object can have a set of event properties that supply information about the event and may be represented as any of the following:

| Java Class | Description |
| --- | --- |
| java.lang.Object | Any Java POJO with getter methods following JavaBeans conventions. |
| java.util.Map | Map events are key-values pairs |

Plain old Java object (POJO) events can be object instances that expose event properties through JavaBeans-style getter methods. Events classes or interfaces do not have to be fully compliant to the JavaBeans specification; however for the EPL engine to obtain event properties, in one embodiment, the required JavaBeans getter methods must be present.

EPL can support JavaBeans-style event classes that extend a super class or implement one or more interfaces. Also, EPL statements can refer to Java interface classes and abstract classes.

Classes that represent events can be made immutable. As events are recordings of a state change or action that occurred in the past, the relevant event properties need not be changeable. However this is not a hard requirement and the EPL engine can accept events that are mutable as well.

Events can also be represented by objects that implement the java.util.Map interface. Event properties of Map events can be the values of each entry accessible through the get method exposed by the java.util.Map interface.

Entries in the Map can represent event properties. Keys can be of the type java.util.String for the engine to be able to look up event property names specified by EPL statements. Values can be of any type. POJOs may also appear as values in a Map.

The engine can also query Java objects as values in a Map event via the nested property syntax. Thus Map events can be used to aggregate multiple data structures into a single event and query the composite information in a convenient way. The example below demonstrates a Map event with a transaction and an account object.

```
Map event = new HashMap( );
event.put("txn", txn);
event.put("account", account);
events.add(new StreamingEventObject(TxnEventType, 0, 0, event));
```

An example statement could look as follows.

```
SELECT account.id, account.rate * txn.amount
FROM TxnEvent RETAIN 60 SECONDS
GROUP BY account.id
```

EPL expressions can include simple as well as indexed, mapped and nested event properties. The table below outlines the different exemplary types of properties and their syntax in an event expression. This syntax allows statements to query deep JavaBeans objects graphs, XML structures and Map events. The following describes types of one embodiments:

| Type | Description | Syntax | Example |
|---|---|---|---|
| Simple | A property that has a single value that may be retrieved. The property type may be a primitive type (such as int, or java.lang.String) or another complex type. | name | sensorID |
| Nested | A nested property is a property that Lives within another property of an event. Note that events represented as a Map may only nest other POJO events and not other Map events. | name.nestedname | sensor.value |
| Indexed | An indexed property stores an ordered collection of objects (all of the same type) that can be individually accessed by an integer valued, non-negative index (or subscript). Note that events represented as a Map do not support Indexed properties. | name[index] | sensor[0] |
| Mapped | A mapped property stores a keyed collection of objects (all of the same type). As an extension to standard JavaBeans APIs, EPL considers any property that accepts a String-valued key a mapped property. Note that events represented as a Map do not support Indexed properties | name('key') | sensor('light') |

Assume there is an EmployeeEvent event class as shown below. The mapped and indexed properties in this example can return Java objects but could also return Java language primitive types (such as int or String). The Address object and Employee objects can themselves have properties that are nested within them, such as a street-Name in the Address object or a name of the employee in the Employee object.

```
public class EmployeeEvent {
public String getFirstName( );
public Address getAddress(String type);
public Employee getSubordinate(int index);
public Employee[] getAllSubordinates( );
}
```

Simple event properties can require a getter-method that returns the property value. In this example, the getFirstName getter method returns the firstName event property of type String.

Indexed event properties can require either one of the following getter-methods:

A method that takes an integer type key value and returns the property value, such as the getSubordinate method.

A method that returns an array-type such as the getSubordinates getter method, which returns an array of Employee.

In an EPL statement, indexed properties can be accessed via the property [index] syntax.

Mapped event properties can require a getter-method that takes a String type key value and returns a property value, such as the getAddress method. In an EPL or event pattern statement, mapped properties can be accessed via the property ('key') syntax.

Nested event properties can require a getter-method that returns the nesting object. The getAddress and getSubordinate methods can be mapped and indexed properties that return a nesting object. In an EPL statement, nested properties can be accessed via the property.nestedProperty syntax.

EPL statements can allow the use of indexed, mapped and nested properties (or a combination of these) at any place where one or more event property names are expected. The example below shows different combinations of indexed, mapped and nested properties.

address('home').streetName subordinate[0] name='anotherName' allSubordinates[1].name subordinate[0].address('home').streetName

Similarly, the syntax can be used in EPL statements in all places where an event property name is expected, such as in select lists, where clauses or join criteria.

```
SELECT firstName, address('work'), subordinate[0].name,
subordinate[1].name
FROM EmployeeEvent RETAIN ALL
WHERE address('work').streetName = 'Park Ave'
```

Event listeners can provide a means of receiving programmatic notifications when events occur that meet the criteria specified in an EPL statement. In one embodiment, listeners may be notified when either:

New events occur that meet the criteria specified in an EPL statement. These are termed ISTREAM events.

Old events that previously met the criteria specified in an EPL statement are pushed out of the output window due to their expiration or due to new incoming events occurring that take their place. These are termed RSTREAM events.

Detailed examples illustrating when each of these notifications occur are provided below.

In one embodiment, to receive ISTREAM events the com-.bea.wlrt.ede.StreamingEventListener interface is used. Implementations can provide a single onEvent method that the engine invokes when results become available. With this interface, only the new events are sent to the listener.

```
public interface StreamingEventListener extends EventListener {
    void onEvent(List<StreamingEvent> newEvents)
    throws RejectStreamingEventException;.
    /**
    * Listeners that do not want to implement the Listener interface
    * can annotate an existing method to notify runtime which method
    * to call back when events arrive.
    *
    */
    @Target(ElementType.METHOD)
    @Retention(RetentionPolicy.RUNTIME)
    @interface Callback {
    }
}
```

To receive both ISTREAM and RSTREAM events the com.bea.wlrt.ede.RStreamingEventListener interface can be used. Since this interface is derived from the StreamingEventListener interface, implementations must provide both an onEvent method as well as an onREvent method. The engine can invoke the onEvent as before while the onREvent method is invoked when either ISTREAM or RSTREAM events occur. With the on REvent method, both the new and old events can be sent to the listener.

```
public interface RStreamingEventListener extends
StreamingEventListener {
    void onREvent(List<StreamingEvent> newEvents,
    List<StreamingEvent> oldEvents)
        throws RejectStreamingEventException;
    /**
    * Listeners that do not want to implement the Listener interface
    * can annotate an existing method to notify runtime which method
    * to call back when events arrive.
    *
    */
    @Target(ElementType.METHOD)
    @Retention(RetentionPolicy.RUNTIME)
    @interface Callback {
    }
}
```

In one embodiment, the engine can provide statement results to listeners by placing results in com.bea.wlrt.ede.StreamingEvent instances. A typical listener implementation can query the StreamingEvent instances via getter methods to obtain the statement-generated results.

The get method on the StreamingEvent interface can be used to retrieve result columns by name. The property name supplied to the get method can also be used to query nested, indexed or array properties of object graphs.

The getUnderlying method on the StreamingEvent interface can allow update listeners to obtain the underlying event object. For wildcard selects, the underlying event is the original event object that was sent into the engine. For joins and select clauses with expressions, the underlying object implements java.util.Map.

The top-level extended Backus-Naur form (eBNF) for EPL can be as follows:

```
[ INSERT INTO insert_into_def]
    SELECT select_list
    FROM stream_source_list
[ MATCHING pattern_expression ]
[ WHERE search_conditions ]
[ GROUP BY grouping_expression_list ]
[ HAVING grouping_search_conditions ]
```

```
[ ORDER BY order_by_expression_list ]
[ OUTPUT output_specification ]
```

In one embodiment, literal keywords are not case sensitive. Each clause is detailed in the following sections. In addition, the built-in operators and functions are listed and described.

The SELECT clause can be required in all EPL statements. The SELECT clause can be used to select all properties via the wildcard *, or to specify a list of event properties and expressions. The SELECT clause can define the event type (event property names and types) of the resulting events published by the statement, or pulled from the statement.

The SELECT clause can also offer optional ISTREAM and RSTREAM keywords to control how events are posted to update listeners attached to the statement. The syntax for the SELECT clause, of one embodiment, is summarized below.
SELECT [RSTREAM|ISTREAM] (expression_list|*)

The following examples use the FROM clause which defines the sources of the event data.

To chose the particular event properties to return:
SELECT event_property [, event_property] [, . . . ] FROM stream_def The following statement can select the count and standard deviation of the volume for the last 100 stock tick events.
SELECT COUNT, STDDEV(volume) FROM StockTick RETAIN 100 EVENTS The select clause can contain one or more expressions.
SELECT expression [, expression] [, . . . ] FROM stream_def The following statement can select the volume multiplied by price for a time batch of the last 30 seconds of stock tick events.
SELECT volume * price FROM StockTick RETAIN BATCH OF 30 SECONDS Event properties and expressions can be aliased using below syntax.
SELECT [event_property|expression] AS identifier [, . . . ]

The following statement can select volume multiplied by price and specifies the name volPrice for the event property.
SELECT volume*price AS volPrice FROM StockTick RETAIN 100 EVENTS The syntax for selecting all event properties in a stream can be:
SELECT *FROM stream_def The following statement can select all of the StockTick event properties for the last 30 seconds:
SELECT * FROM StockTick RETAIN 30 SECONDS In a join statement, using the SELECT * syntax can select event properties that contain the events representing the joined streams themselves.

The * wildcard and expressions can also be combined in a SELECT clause. The combination selects all event properties and in addition the computed values as specified by any additional expressions that are part of the SELECT clause. Here is an example that selects all properties of stock tick events plus a computed product of price and volume that the statement names 'pricevolume':
SELECT *, price * volume AS pricevolume FROM StockTick RETAIN ALL The optional ISTREAM and RSTREAM keywords in the SELECT clause can define the event stream posted to update listeners to the statement. If neither keyword is specified, the engine can post both insert and remove stream events to statement listeners. The insert stream can consist of the events entering the respective window(s) or stream(s) or aggregations, while the remove stream consists of the events leaving the respective window(s) or the changed aggregation result.

By specifying the ISTREAM keyword you can instruct the engine to only post insert stream events to update listeners. In one embodiment, the engine can then not post any remove stream events. By specifying the RSTREAM keyword you can instruct the engine to only post remove stream events to update listeners. In one embodiment, the engine can then not post any insert stream events.

The following statement can select only the events that are leaving the 30 second time window.
SELECT RSTREAM * FROM StockTick RETAIN 30 SECONDS The ISTREAM and RSTREAM keywords in the SELECT clause can be matched by same-name keywords available in the INSERT INTO clause. While the keywords in the SELECT clause control the event stream posted to update listeners to the statement, the same keywords in the insert into clause can specify the event stream that the engine makes available to other statements.

The FROM clause can be required in all EPL statements. It can specify one or more event streams as the source of the event data.

```
FROM stream_expression [ inner_join | outer_join ]
with inner_join specified as a comma separated list of stream expressions:
   (, stream_expression )*
and outer_join defined as:
((LEFT|RIGHT|FULL) OUTER JOIN stream_expression ON prop_name = prop_name)*
```

A stream_expression can simply define the name of the event type used as the source of the stream data, or in more complex scenarios define either a subquery expression as a nested EPL statement or a parameterized SQL query to access JDBC data. In all of these cases, the stream_expression can optionally include an alias as an identifier to qualify any ambiguous property name references in other expressions and a RETAIN clause to define the window of stream data seen by the rest of the query:

```
(stream_name | subquery_expr | param_sql_query) [[AS] alias]]
[RETAIN retain_expr]
subquery_expr: ( epl_statement )
param_sql_query: database_name ('parameterized_sql_query')
```

The subquery_expr can define a sub query or nested EPL statement in parenthesis. A sub query can be used to pre-filter event stream data seen by the outer EPL statement. For example, the following query would restrict the data seen by the outer EPL statement to only StockTick events coming from a Reuters feed.

```
SELECT stockSymbol, AVG(price)
FROM (SELECT * FROM StockTick WHERE feedName = 'Reuters' )
RETAIN 1 MINUTE PARTITION BY stockSymbol
GROUP BY stockSymbol
```

Sub queries can be arbitrarily nested. In one embodiment, sub queries may not contain an INSERT INTO or an OUTPUT clause. In one embodiment, unlike with a top level EPL statement, a RETAIN clause is optional within a subquery.

The param_sql_query can specify a parameterized SQL query in quotes surrounded by parenthesis that enables reference and historical data accessible through JDBC to be retrieved. The database_name can identify the name of the database over which the query can be executed. Configuration information can be associated with this database name to establish a database connection, control connection creation and removal, and to setup caching policies for query results.

The RETAIN clause can define the quantity of event data read from the streams listed in the FROM clause prior to query processing. Each stream may have its own RETAIN clause if each require different retain policies. Otherwise, the RETAIN clause may appear at the end of the FROM clause for it to apply to all streams. Essentially the RETAIN clause can apply to all streams that appear before it in the FROM clause.

For example, in the following EPL statement, five StockTick events can be retained while three News events can be retained:

```
SELECT t.stockSymbol, t.price, n.summary
FROM StockTick t RETAIN 5 EVENTS, News n RETAIN 3 EVENTS
WHERE t.stockSymbol = n.stockSymbol
```

However, in the following statement, four StockTick and four News events can be retained:

```
SELECT t.stockSymbol, t.price, n.summary
FROM StockTick t, News n RETAIN 4 EVENTS
WHERE t.stockSymbol = n.stockSymbol
```

In one embodiment, with the exception of sub query expressions, all stream sources are constrained by a RETAIN clause. Thus, in one embodiment, at a minimum the FROM clause contains at least one RETAIN clause at the end for top level EPL statements. External data from parameterized SQL queries need not affected by the RETAIN clause.

Two or more event streams can be part of the FROM clause with all of the streams determine the resulting events. The WHERE clause can list the join conditions that EPL uses to relate events in two or more streams. In one embodiment, if the condition is failed to be met, for example if no event data occurs for either of the joined stream source, no output need be produced.

Each point in time that an event arrives to one of the event streams, the two event streams can be joined and output events can be produced according to the where-clause.

This example joins two event streams. The first event stream consists of fraud warning events for which we keep the last 30 minutes. The second stream is withdrawal events for which we consider the last 30 seconds. The streams are joined on account number.

```
SELECT fraud.accountNumber AS acentNum,
   fraud.warning AS warn, withdraw.amount AS amount,
   MAX(fraud.timestamp, withdraw.timestamp) AS timestamp,
   'withdrawlFraud' AS desc
FROM Fraud WarningEvent AS fraud RETAIN 30 MIN,
   WithdrawalEvent AS withdraw RETAIN 30 SEC
WHERE fraud.accountNumber = withdraw.accountNumber
```

Left outer joins, right outer joins and full outer joins between an unlimited number of event streams can be supported by EPL. Depending on the LEFT, RIGHT, or FULL qualifier, in the absence of event data from either stream source, output may still occur.

If the outer join is a left outer join, there can be an output event for each event of the stream on the left-hand side of the clause. For example, in the left outer join shown below we can get output for each event in the stream RfidEvent, even if the event does not match any event in the event stream OrderList.

```
SELECT *
FROM RfidEvent AS rfid
    LEFT OUTER JOIN
    OrderList AS orderlist
        ON rfid.itemId = orderList.itemId
    RETAIN 30 SECONDS
```

Similarly, if the join is a Right Outer Join, then there can be an output event for each event of the stream on the right-hand side of the clause. For example, in the right outer join shown below we can get output for each event in the stream OrderList, even if the event does not match any event in the event stream RfidEvent.

```
SELECT *
FROM RfidEvent AS rfid
    RIGHT OUTER JOIN
    OrderList AS orderlist
        ON rfid.itemId = orderList.itemId
    RETAIN 30 SECONDS
```

For all types of outer joins, if the join condition is not met, the select list can be computed with the event properties of the arrived event while all other event properties are considered to be null.

```
SELECT *
FROM RfidEvent AS rfid
    FULL OUTER JOIN
    OrderList AS orderlist
        ON rfid.itemId = orderList.itemId
    RETAIN 30 SECONDS
```

The last type of outer join is a full outer join. In a full outer join, each point in time that an event arrives to one of the event streams, one or more output events are produced. In the example below, when either an RfidEvent or an OrderList event arrive, one or more output event is produced.

A sub query expression can be a nested EPL statement that appears in parenthesis in the FROM clause. A sub query need not contain an INSERT INTO clause or an OUTPUT clause, and unlike top level EPL statements, a RETAIN clause is optional.

Sub query expressions can execute prior to their containing EPL statement and thus can be useful to pre-filter event data seen by the outer statement. For example, the following query can calculate the moving average of a particular stock over the last 100 StockTick events:

```
SELECT AVG(price)
FROM (SELECT * FROM StockTick WHERE stockSymbol = 'ACME')
RETAIN 100 EVENTS
```

In one embodiment, if the WHERE clause had been placed in the outer query, StockTick events for other stock symbols would enter into the window, reducing the number of events used to calculate the average price.

In addition, a subquery may be used to a) transform the structure of the inner event source to the structure required by the outer EPL statement or b) merge multiple event streams to form a single stream of events. This allows a single EPL statement to be used instead of multiple EPL statements with an INSERT INTO clause connecting them. For example, the following query merges transaction data from EventA and EventB and then uses the combined data in the outer query:

```
SELECT custId, SUM(latency)
FROM (SELECT A.customerId AS custId, A.timestamp -B.timestamp
    AS latency
    FROM EventA A, EventB B
    WHERE A.txnId = B.txnId)
RETAIN 30 MIN
GROUP BY custId
```

Note that a subquery itself may contain subqueries thus allowing arbitrary levels of nesting.

Parameterized SQL queries can enable reference and historical data accessible through JDBC to be queried via SQL within EPL statements. In one embodiment, in order for such data sources to become accessible to EPL, some configuration is required.

In one embodiment, the following restrictions can apply:

Only one event stream and one SQL query may be joined; Joins of two or more event streams with an SQL query are not supported.

Constraints specified in the RETAIN clause are ignored for the stream for the SQL query; That is, one cannot create a time-based or event-based window on an SQL query. However one can use the INSERT INTO syntax to make join results available to a further statement.

The database software supports JDBC prepared statements that provide statement metadata at compilation time. Most major databases provide this function.

Other embodiments need have these restrictions.

The query string can be single or double quoted and surrounded by square brackets. The query may contain one or more substitution parameters. The query string can be passed to the database software unchanged, allowing the use of any SQL query syntax that your database understands, including stored procedure calls.

Substitution parameters in the SQL query string take the form ${event_property_name}. The engine resolves event_property_name at statement execution time to the actual event property value supplied by the events in the joined event stream.

The engine can determine the type of the SQL query output columns by means of the result set metadata that your database software returns for the statement. The actual query results can be obtained via the getObject on java.sql.ResultSet.

The sample EPL statement below joins an event stream consisting of CustomerCallEvent events with the results of an SQL query against the database named MyCustomerDB and table Customer:

```
SELECT custId, cust_name
FROM CustomerCallEvent,
    MyCustomerDB (' SELECT cust_name FROM Customer WHERE
    cust_id = ${custId} ')
        RETAIN 10 MINUTES
```

The example above assumes that CustomerCallEvent supplies an event property named custId. The SQL query can select the customer name from the Customer table. The WHERE clause in the SQL can match the Customer table column cust_id with the value of custId in each CustomerCallEvent event. In one embodiment, the engine executes the SQL query for each new CustomerCallEvent encountered. If the SQL query returns no rows for a given customer id, the engine can generate no output event. Else the engine can generate one output event for each row returned by the SQL query. An outer join as described in the next section can be used to control whether the engine should generate output events even when the SQL query returns no rows. The next example adds a time window of 30 seconds to the event stream CustomerCallEvent. It also renames the selected properties to customerName and customerId to demonstrate how the naming of columns in an SQL query can be used in the select clause in the EQL query. The example uses explicit stream names via the AS keyword.

```
SELECT customerId, customerName
FROM CustomerCallEvent AS cce RETAIN 30 SECONDS,
    MyCustomerDB
        ("SELECT cust_id AS customerId, cust_name AS customerName
            FROM Customer WHERE cust_id = ${cce.custId}") AS cq
```

Any window, such as the time window, generates insert events as events enter the window, and remove events as events leave the window. The engine executes the given SQL query for each CustomerCallEvent in both the insert stream and the remove stream cases. As a performance optimization, the ISTREAM or RSTREAM keywords in the SELECT clause can be used to instruct the engine to only join insert or remove events, reducing the number of SQL query executions. Parameterized SQL queries can be used in outer joins as well. Use a left outer join, such as in the next statement, if you need an output event for each event regardless of whether or not the SQL query returns rows. If the SQL query returns no rows, the join result populates null values into the selected properties.

```
SELECT custId, custName
FROM CustomerCallEvent AS cce
    LEFT OUTER JOIN
    MyCustomerDB
        ("SELECT cust_id, cust_name AS custName
            FROM Customer WHERE cust_id = ${cce.custId}") AS cq
        ON cce.custId = cq.cust_id
        RETAIN 10 MINUTES
```

The statement above can always generates at least one output event for each CustomerCallEvent, containing all columns selected by the SQL query, even if the SQL query does not return any rows. Note the ON expression that is used for outer joins. The ON can act as an additional filter to rows returned by the SQL query. The WHERE clause can be an optional clause in EPL statements. Using the WHERE clause event streams can be joined and events can be filtered. In one embodiment, aggregate functions may not appear in a WHERE clause. To filter using aggregate functions, the HAVING clause can be used.

WHERE aggregate_free_expression

Comparison operators =, <, >, >=, <=, !=, < >, IS NULL, IS NOT NULL and logical combinations via AND and OR can be supported in the where clause. Some examples are listed below.

```
... WHERE fraud.severity = 5 AND amount > 500
... WHERE (orderItem.orderId IS NULL) OR (orderItem.class != 10)
... WHERE (orderItem.orderId = NULL) OR (orderItem.class < > 10)
... WHERE itemCount / packageCount > 10
```

The GROUP BY clause can be optional in EPL statements. The GROUP BY clause can divide the output of an EPL statement into groups. You can group by one or more event property names, or by the result of computed expressions. When used with aggregate functions, GROUP BY can retrieve the calculations in each subgroup. You can use GROUP BY without aggregate functions, but generally that can produce confusing results.

For example, the below statement can return the total price per symbol for all stock tick events in the last 30 seconds:

```
SELECT symbol, SUM(price) FROM StockTickEvent RETAIN 30
    SEC GROUP BY symbol
```

The syntax of the group by clause can be:
GROUP BY arregate_free_expression [, arregate_free_expression] [, ...]

EPL can place the following restrictions on expressions in the GROUP BY clause:
1. Expressions in the GROUP BY clause cannot contain aggregate functions
2. Event properties that are used within aggregate functions in the SELECT clause cannot also be used in a GROUP BY expression In one embodiment, you can list more then one expression in the GROUP BY clause to nest groups. Once the sets are established with GROUP BY, the aggregation functions can be applied. This statement can post the median volume for all stock tick events in the last 30 seconds grouped by symbol and tick data feed. EPL can post one event for each group to statement update listeners:

```
SELECT symbol, tickDataFeed, MEDIAN(volume)
FROM StockTickEvent RETAIN 30 SECONDS
GROUP BY symbol, tickDataFeed
```

In the statement above the event properties in the select list (symbol and tickDataFeed) can be listed in the GROUP BY clause. The statement can thus follow the SQL standard which prescribes that non-aggregated event properties in the select list must match the GROUP BY columns. EPL can also support statements in which one or more event properties in the select list are not listed in the GROUP BY clause. The statement below demonstrates this case. It calculates the standard deviation for the last 30 seconds of stock ticks aggregating by symbol and posting for each event the symbol, tickDataFeed and the standard deviation on price.

```
SELECT symbol, tickDataFeed, STDDEV(price)
FROM StockTickEvent RETAIN 30 SECONDS
GROUP BY symbol
```

The above example still aggregates the price event property based on the symbol, but produces one event per incoming event, not one event per group. Additionally, EPL can support statements in which one or more event properties in the GROUP BY clause are not listed in the select list. This is an example that calculates the mean deviation per symbol and tickDataFeed and posts one event per group with symbol and mean deviation of price in the generated events. Since tickDataFeed is not in the posted results, this can potentially be confusing.

```
SELECT symbol, AVEDEV(price)
FROM StockTickEvent RETAIN 30 SECONDS
GROUP BY symbol, tickDataFeed
```

Expressions can also be allowed in the GROUP BY list:

```
SELECT symbol * price, count(*)
FROM StockTickEvent RETAIN 30 SECONDS
GROUP BY symbol * price
```

If the GROUP BY expression can result in a null value, the null value can become its own group. All null values can be aggregated into the same group. In one embodiment, the COUNT(expression) aggregate function does not count null values and the COUNT returns zero if only null values are encountered.

In one embodiment, you can use a WHERE clause in a statement with GROUP BY. Events that do not satisfy the conditions in the WHERE clause can be eliminated before any grouping is done. For example, the statement below posts the number of stock ticks in the last 30 seconds with a volume larger then 100, posting one event per group (symbol).

```
SELECT symbol, count(*)
FROM StockTickEvent RETAIN 30 SECONDS
WHERE volume > 100
GROUP BY symbol
```

The HAVING clause can be optional in EPL statements. The HAVING clause can be used to pass or reject events defined by the GROUP BY clause. The HAVING clause can set conditions for the GROUP BY clause in the same way WHERE sets conditions for the SELECT clause, except the WHERE clause cannot include aggregate functions, while HAVING often does.

HAVING expression

This statement is an example of a HAVING clause with an aggregate function. It can post the total price per symbol for the last 30 seconds of stock tick events for only those symbols in which the total price exceeds 1000. The HAVING clause eliminates all symbols where the total price is equal or less then 1000.

```
SELECT symbol, SUM(price)
FROM StockTickEvent RETAIN 30 SEC
GROUP BY symbol
HAVING SUM(price) > 1000
```

To include more then one condition in the HAVING clause combine the conditions with AND, OR or NOT. This is shown in the statement below which selects only groups with a total price greater then 1000 and an average volume less then 500.

```
SELECT symbol, SUM(price), AVG(volume)
FROM StockTickEvent RETAIN 30 SEC
GROUP BY symbol
HAVING SUM(price) > 1000 AND AVG(volume) < 500
```

EPL can place the following restrictions on expressions in the HAVING clause:
    3. Any expressions that contain aggregate functions must also occur in the SELECT clause A statement with the HAVING clause should also have a GROUP BY clause. If you omit GROUP BY, all the events not excluded by the WHERE clause return as a single group. In that case HAVING can act like a WHERE except that HAVING can have aggregate functions.

The HAVING clause can also be used without GROUP BY clause as the below example shows. The example below posts events where the price is less then the current running average price of all stock tick events in the last 30 seconds.

```
SELECT symbol, price, AVG(price)
FROM StockTickEvent RETAIN 30 SEC
HAVING price < AVG(price)
```

When an EPL statement includes subqueries, a MATCHING clause, WHERE conditions, a GROUP BY clause, and HAVING conditions, the sequence in which each clause executes can determine the final result:
    4. Any subqueries present in the statement run first. The subqueries act as a filter for events to enter the window of the outer query.
    5. The event stream's filter conditions in the MATCHING clause, if present, can dictate which events enter a window. The filter discards any events not meeting filter criteria.
    6. The WHERE clause excludes events that do not meet its search condition.
    7. Aggregate functions in the select list calculate summary values for each group.
    8. The HAVING clause can exclude events from the final results that do not meet its search condition.

The following query can illustrate the use of filter, WHERE, GROUP BY and HAVING clauses in one statement with a SELECT clause containing an aggregate function.

```
SELECT tickDataFeed, STDDEV(price)
FROM (SELECT * FROM StockTickEvent WHERE symbol='ACME')
    RETAIN 10 EVENTS
    WHERE volume > 1000
    GROUP BY tickDataFeed
    HAVING STDDEV(price) > 0.8
```

EPL can filter events using the subquery for the event stream StockTickEvent. In the example above, only events with symbol ACME enter the window over the last 10 events, all other events are simply discarded. The WHERE clause can remove any events posted into the window (events entering the window and event leaving the window) that do not match the condition of volume greater then 1000. Remaining events are applied to the STDDEV standard deviation aggregate function for each tick data feed as specified in the GROUP BY clause. Each tickDataFeed value can generate one event. EPL can apply the HAVING clause and only lets events pass for tickDataFeed groups with a standard deviation of price greater then 0.8.

The ORDER BY clause can be optional in EPL. It can be used for ordering output events by their properties, or by expressions involving those properties. For example, the following statement can batch 1 minute of stock tick events sorting them first by price and then by volume.

```
SELECT symbol FROM StockTickEvent RETAIN BATCH OF 1 MINUTE
ORDER BY price, volume
```

Here is an exemplary syntax for an ORDER BY clause:

ORDER BY expression [ASC|DESC] [, expression [ASC|DESC] [, . . . ]]

EPL can place the following restrictions on the expressions in the ORDER BY clause:

9. All aggregate functions that appear in the ORDER BY clause must also appear in the SELECT expression.

Otherwise, in one embodiment, any kind of expression that can appear in the SELECT clause, as well as any alias defined in the SELECT clause, is also valid in the ORDER BY clause.

The INSERT INTO clause can be optional in EPL. This clause can be specified to make the results of a statement available as an event stream for use in further statements. The clause can also be used to merge multiple event streams to form a single stream of events.

```
INSERT INTO CombinedEvent
SELECT A.customerId AS custId, A.timestamp -B.timestamp AS latency
FROM EventA A, EventB B RETAIN 30 MIN
WHERE A.txnId = B.txnId
```

The INSERT INTO clause in the above statement, can generate events of type CombinedEvent. Each generated CombinedEvent event can have two event properties named "custId" and "latency". The events generated by the above statement can be used in further statements. For example, the statement below uses the generated events.

```
SELECT custId, SUM(latency)
FROM CombinedEvent RETAIN 30 MIN
GROUP BY custId
```

The INSERT INTO clause can consist of just an event type alias, or of an event type alias and one or more event property names. The syntax for the INSERT INTO clause can be as follows:

```
INSERT [ISTREAM | RSTREAM] INTO event_type_alias
[(prop_name [,prop_name, [,...]] ) ]
```

The ISTREAM (default) and RSTREAM keywords are optional. If neither keyword is specified, the engine can supply the insert stream events generated by the statement to attached update listeners. The insert stream can consist of the events entering the respective window(s) or stream(s). If the RSTREAM keyword is specified, the engine supplies the remove stream events generated by the statement. The remove stream can consist of the events leaving the respective window(s).

The event_type_alias can be an identifier that names the events generated by the engine. The identifier can be used in statements to filter and process events of the given name.

The engine can also allow update listeners to be attached to a statement that contain an INSERT INTO clause.

To merge event streams, the same event_type_alias identifier can be used in any EPL statements that you would like to be merged. Make sure to use the same number and names of event properties and that event property types match up.

EPL can place the following restrictions on the INSERT INTO clause:

10. The number of elements in the SELECT clause must match the number of elements in the INSERT INTO clause if the clause specifies a list of event property names.

11. If the event type alias has already been defined by a prior statement and the event property names and types do not match, an exception is thrown at statement creation time.

The example statement below shows the alternative form of the INSERT INTO clause that explicitly defines the property names to use.

```
INSERT INTO CombinedEvent (custId, latency)
SELECT A.customerId, A.timestamp - B.timestamp
FROM EventA A, EventB B RETAIN 30 MIN
WHERE A.txnId = B.txnId
```

The RSTREAM keyword can be used to indicate to the engine to generate only remove stream events. This can be useful if we want to trigger actions when events leave a window rather then when events enter a window. The statement below generates CombinedEvent events when EventA and EventB leave the window after 30 minutes.

```
INSERT RSTREAM INTO CombinedEvent
SELECT A.customerId AS custId, A.timestamp - B.timestamp AS latency
FROM EventA A, EventB B RETAIN 30 MIN
WHERE A.txnId = B.txnId
```

The precedence of arithmetic and logical operators in EPL can follow Java standard arithmetic and logical operator precedence.

The table below outlines the arithmetic operators available, in one embodiment.

| Operator | Description |
| --- | --- |
| +, − | As unary operators they denote a positive or negative expression. As binary operators they add or subtract. |
| *, / | Multiplication and division are binary operators. |
| % | Modulo binary operator. |

The table below outlines the logical and comparison operators available, in one embodiment.

| Operator | Description |
| --- | --- |
| NOT | Returns true if the following condition is false, returns false if it is true |
| OR | Returns true if either component condition is true, returns false if both are false |
| AND | Returns true if both component conditions are true, returns false if either is false |
| =, !=, <, > <=, >=, <> | Comparison operators |

The table below outlines the concatenation operators available, in one embodiment.

| Operator | Description |
| --- | --- |
| \|\| | Concatenates character strings |

The table below outlines the binary operators available, in one embodiment.

| Operator | Description |
| --- | --- |
| & | Bitwise AND if both operands are numbers; conditional AND if both operands are Boolean |
| \| | Bitwise OR if both operands are numbers; conditional OR if both operands are Boolean |
| ^ | Bitwise exclusive OR (XOR) |

The {and} curly braces can be array definition operators following the Java array initialization syntax. Arrays can be useful to pass to user-defined functions or to select array data in a SELECT clause.

Array definitions can consist of zero or more expressions within curly braces. Any type of expression can be allowed within array definitions including constants, arithmetic expressions or event properties. This is the syntax of an array definition:
{[expression [,expression [, . . . ]]]}

Consider the next statement that returns an event property named actions. The engine populates the actions property as an array of java.lang.String values with a length of 2 elements. The first element of the array contains the observation property value and the second element the command property value of RFIDEvent events.
SELECT {observation, command} AS actions FROM RFIDEvent RETAIN ALL The engine can determine the array type based on the types returned by the expressions in the array definition. For example, if all expressions in the array definition return integer values then the type of the array is java.lang.Integer[ ]. If the types returned by all expressions are a compatible number types, such as integer and double values, the engine coerces the array element values and returns a suitable type, java.lang.Double[ ] in this example. The type of the array returned is Object[ ] if the types of expressions cannot be coerced or return object values. Null values can also be used in an array definition.

Arrays can come in handy for use as parameters to user-defined functions:
SELECT * FROM RFIDEvent RETAIN ALL WHERE Filter.myFilter(zone, {1,2,3})

The IN operator can determine if a given value matches any value in a list. The syntax of the operator can be:

test_expression [NOT] IN (expression [,expression [, . . . ]])

The test_expression can be any valid expression. The IN keyword can be followed by a list of expressions to test for a match. The optional NOT keyword can specify that the result of the predicate be negated.

The result of an IN expression can be of type Boolean. In one embodiment, if the value of test_expression is equal to any expression from the comma-separated list, the result value is true. Otherwise, the result value is false. In one embodiment, all expressions must be of the same type or a type compatible with test_expression.

The next example shows how the IN keyword can be applied to select certain command types of RFID events:

SELECT * FROM RFIDEvent RETAIN ALL
WHERE command IN ('OBSERVATION', 'SIGNAL')

The statement is equivalent to:

SELECT * FROM RFIDEvent RETAIN ALL
WHERE command = 'OBSERVATION' OR symbol = 'SIGNAL'

The BETWEEN operator can specify a range to test. In one embodiment, the syntax of the operator is:

test_expression [NOT] BETWEEN begin_expression AND end_expression

The test_expression can be any valid expression and is the expression to test for the range being inclusively within the expressions defined by begin_expression and end_expression. The NOT keyword can specify that the result of the predicate be negated.

The result of a BETWEEN expression can be of type Boolean. If the value of test_expression is greater then or equal to the value of begin_expression and less than or equal to the value of end_expression, the result can be true.

The next example shows how the BETWEEN keyword can be used to select events with a price between 55 and 60 (inclusive).

SELECT * FROM StockTickEvent RETAIN ALL WHERE price
BETWEEN 55 AND 60

The equivalent expression without using the BETWEEN keyword is:

```
SELECT * FROM StockTickEvent RETAIN ALL
     WHERE price >= 55 AND price <= 60
```

In one embodiment, the begin_expression and end_expression may occur in either order without affecting the query. For example, the following can be equivalent to the above example:

```
SELECT * FROM StockTickEvent RETAIN ALL WHERE price
     BETWEEN 60 AND 55
```

The LIKE operator can provide standard SQL pattern matching. SQL pattern matching can allow you to use '_' to match any single character and '%' to match an arbitrary number of characters (including zero characters). In EPL, SQL patterns are case-sensitive by default. The syntax of LIKE is:
test_expression [NOT] LIKE pattern_expression [ESCAPE string_literal]

The test_expression can be any valid expression yielding a String type or a numeric result. The optional NOT keyword specifies that the result of the predicate be negated. The LIKE keyword is followed by any valid standard SQL pattern_expression yielding a String-typed result. The optional ESCAPE keyword signals the escape character used to escape '_' and '%' values in the pattern.

The result of a LIKE expression is of type Boolean. If the value of test_expression matches the pattern_expression, the result value is true. Otherwise, the result value is false. An example for the LIKE keyword is shown below.
SELECT * FROM PersonLocationEvent RETAIN ALL WHERE name LIKE '%Jack%'

The escape character can be defined as follows. In this example the where-clause matches events where the suffix property is a single '_' character.

```
SELECT * FROM PersonLocationEvent RETAIN ALL WHERE suffix
LIKE '!_' ESCAPE '!'
```

The REGEXP operator can be a form of pattern matching based on regular expressions implemented through the Java java.util.regex package. The syntax of REGEXP is:
test_expression [NOT] REGEXP pattern_expression The test_expression can be any valid expression yielding a String type or a numeric result. The optional NOT keyword specifies that the result of the predicate be negated. The REGEXP keyword can be followed by any valid regular expression pattern_expression yielding a String-typed result.

The result of a REGEXP expression can be of type Boolean. In one embodiment, if the value of test_expression matches the regular expression pattern_expression, the result value is true. Otherwise, the result value is false.

An example for the REGEXP operator is below.
SELECT * FROM PersonLocationEvent RETAIN ALL WHERE name REGEXP '*Jack*'

The followed by FOLLOWED BY operator can specify that first the left hand expression must turn true and only then is the right hand expression evaluated for matching events.

Look for event A and if encountered, look for event B. A and B can itself be nested event pattern expressions.
A FOLLOWED BY B Note that this does not mean that event A must immediately be followed by event B. Other events may occur between the event A and the event B and this expression would still evaluate to true. If this is not the desired behavior, the NOT operator can be used as described in the next section.

This is a pattern that fires when two status events indicating an error occur after the other.
status='ERROR' FOLLOWED BY status='ERROR'

Single-row functions return a single value for every single result row generated by your statement. These functions can appear anywhere where expressions are allowed.

EPL can allow static Java library methods as single-row functions, and also features built-in single-row functions.

EPL can auto-import the following Java library packages:
java.lang.*
java.math.*
java.text.*
java.util.*

The Java static library methods can be used in all expressions as shown in below example:

```
SELECT symbol, Math.round(volume/1000)
     FROM StockTickEvent RETAIN 30 SECONDS
```

Other arbitrary Java classes may also be used, however their names may need to be fully qualified or configured to be imported.

The table below outlines the built-in single-row functions available, in one embodiment.

| Single-row Function | Result |
| --- | --- |
| MAX(expression, expression [, expression [,...]) | Returns the highest numeric value among the two or more comma-separated expressions. |
| MIN(expression, expression [, expression [,...]) | Returns the lowest numeric value among the two or more comma-separated expressions. |
| COALESCE(expression, expression [, expression ,...]) | Returns the first non-null value in the list, or null if there are no non-null values. |
| CASE value<br>  WHEN compare_value THEN result<br>  [WHEN compare_value THEN result ...]<br>  [ELSE result]<br>END | Returns result where the first value equals compare_value. |
| CASE value<br>  WHEN condition THEN result<br>  [WHEN condition THEN result ...]<br>  [ELSE result]<br>END | Returns the result for the first condition that is true. |
| PREV(expression, event_property) | Returns a property value of a previous event, relative to the event order within a data window |
| PRIOR(integer, event_property) | Returns a property value of a prior event, relative to the natural order of arrival of events |

The MIN and MAX functions can take two or more expression parameters. The min function can return the lowest numeric value among these comma-separated expressions, while the MAX function can return the highest numeric value. The return type can be the compatible aggregated type of all return values.

The next example shows the MAX function that has a Double return type and returns the value 1.1.
SELECT MAX(1, 1.1, 2*0.5) FROM ...

The MIN function can return the lowest value. The statement below uses the function to determine the smaller of two timestamp values.

```
SELECT symbol, MIN(ticks.timestamp, news.timestamp) AS minT
FROM StockTickEvent AS ticks, NewsEvent AS news
RETAIN 30 SECONDS
WHERE ticks.symbol = news.symbol
```

Note that the MIN and MAX functions can also available as aggregate functions.

The result of the COALESCE function can be the first expression in a list of expressions that returns a non-null value. The return type can be the compatible aggregated type of all return values.

This example returns a String type result with a value of 'foo'.
SELECT COALESCE(NULL, 'foo') FROM ...

The CASE control flow function can have two versions. The first version can take a value and a list of compare values to compare against, and returns the result where the first value equals the compare value. The second version can take a list of conditions and returns the result for the first condition that is true.

The return type of a CASE expression is the compatible aggregated type of all return values.

The example below shows the first version of a CASE statement. It has a String return type and returns the value 'one'.

```
SELECT CASE 1 WHEN 1 THEN 'one' WHEN 2 THEN 'two'
ELSE 'more' END FROM
...
```

The second version of the CASE function can take a list of conditions. The next example has a Boolean return type and returns the Boolean value true.
SELECT CASE WHEN 1>0 THEN true ELSE false END FROM ...

The PREV function can return the property value of a previous event. The first parameter can denote the $i^{th}$ previous event in the order established by the data window. The second parameter can be a property name for which the function returns the value for the previous event.

This example selects the value of the price property of the second previous event from the current Trade event.
SELECT PREV(2, price) FROM Trade RETAIN 10 EVENTS Since the PREV function takes the order established by the data window into account, the function can work well with sorted windows. In the following example the statement selects the symbol of the three Trade events that had the largest, second-largest and third-largest volume.

```
SELECT PREV(0, symbol), PREV(1, symbol), PREV(2, symbol)
FROM Trade RETAIN 10 EVENTS WITH HIGHEST volume
```

The $i^{th}$ previous event parameter can also be an expression returning an Integer type value. The next statement joins the Trade data window with a RankSelectionEvent event that provides a rank property used to look up a certain position in the sorted Trade data window:

```
SELECT PREV(rank, symbol) FROM Trade, RankSelectionEvent
RETAIN 10 EVENTS WITH HIGHEST volume
```

The PREV function can return a NULL value if the data window does not currently hold the $i^{th}$ previous event. The example below can illustrate this using a time batch window. Here the PREV function can return a null value for any events in which the previous event is not in the same batch of events. The PRIOR function as discussed below can be used if a null value is not the desired result.
SELECT PREV(1, symbol) FROM Trade RETAIN BATCH OF 1 MINUTE The combination of the PREV function and the PARTITION BY clause can return the property value for a previous event in the given group.

Let's look at an example. Assume we want to obtain the price of the previous event of the same symbol as the current event.

The statement that follows can solve this problem. It can partition the window on the symbol property over a time window of one minute. As a result, when the engine encounters a new symbol value that it hasn't seen before, it can create a new window specifically to hold events for that symbol. Consequently, the PREV function can return the previous event within the respective time window for that event's symbol value.
SELECT PREV(1, price) AS prevprice FROM Trade RETAIN 1 MIN PARTITION BY symbol The following restrictions can apply to the PREV functions and its results, in one embodiment:
  The function always returns a null value for remove stream (old data) events
  The function may only be used on streams that are constrained by a RETAIN clause The PRIOR function can return the property value of a prior event. The first parameter can be an integer value that denotes the $i^{th}$ prior event in the natural order of arrival. The second parameter can be a property name for which the function returns the value for the prior event. This example selects the value of the price property of the second prior event to the current Trade event.
SELECT PRIOR(2, price) FROM Trade RETAIN ALL The PRIOR function can be used on any event stream or view and does not require a stream to be constrained by a RETAIN clause as with the PREV function. The function can operate based on the order of arrival of events in the event stream that provides the events. The next statement uses a time batch window to compute an average volume for 1 minute of Trade events, posting results every minute. The select-clause can employ the prior function to select the current average and the average before the current average:

```
SELECT AVG(volume) AS avgVolume, PRIOR(1, avgVolume)
FROM TradeAverages RETAIN BATCH OF 1 MINUTE
```

The PRIOR function can be similar to the PREV function. The key differences between the two functions can be as follows:

The PREV function can return previous events in the order provided by the window, while the PRIOR function returns prior events in the order of arrival in the stream.

The PREV function can require a RETAIN clause while the PRIOR function does not.

The PREV function can return the previous event taking into account any grouping. The PRIOR function returns prior events regardless of any grouping.

The PREV function can return a null value for remove stream events, i.e. for events leaving a data window. The PRIOR function does not have this restriction.

The aggregate functions can be SUM, AVG, COUNT, MAX, MIN, MEDIAN, STDDEV, and AVEDEV. You can use aggregate functions to calculate and summarize data from event properties. For example, to find out the total price for all stock tick events in the last 30 seconds, type:

SELECT SUM(price) FROM StockTickEvent RETAIN 30 SECONDS

Here is the syntax for aggregate functions:

aggregate_function([all|distinct] expression)

You can apply aggregate functions to all events in an event stream window or other view, or to one or more groups of events. From each set of events to which an aggregate function is applied, EPL generates a single value.

The expression can be usually an event property name. However it can also be a constant, function, or any combination of event property names, constants, and functions connected by arithmetic operators.

For example, to find out the average price for all stock tick events in the last 30 seconds if the price was doubled:

SELECT AVG(price*2) FROM StockTickEvent RETAIN 30 SECONDS

You can use the optional keyword DISTINCT with all aggregate functions to eliminate duplicate values before the aggregate function is applied. The optional keyword ALL which performs the operation on all events is the default.

Note that the MIN and MAX aggregate functions are also available as single row functions.

The syntax of the aggregation functions and the results they produce, for one embodiment, are shown in table below.

| Aggregate Function | Result |
|---|---|
| SUM([ALL\|DISTINCT] expression) | Totals the (distinct) values in the expression, returning a value of long, double, float or integer type depending on the expression |
| AVG([ALL\|DISTINCT] expression) | Average of the (distinct) values in the expression, returning a value of double type |
| COUNT([ALL\|DISTINCT] expression) | Number of the (distinct) non-null values in the expression, returning a value of long type |
| COUNT(*) | Number of events, returning a value of long type |
| MAX([ALL\|DISTINCT] expression) | Highest (distinct) value in the expression, returning a value of the same type as the expression itself returns |
| MIN([ALL\|DISTINCT] expression) | Lowest (distinct) value in the expression, returning a value of the same type as the expression itself returns |
| MEDIAN([ALL\|DISTINCT] expression) | Median (distinct) value in the expression, returning a value of double type |
| STDDEV([ALL\|DISTINCT] expression) | Standard deviation of the (distinct) values in the expression, returning a value of double type |
| AVEDEV([ALL\|DISTINCT] expression) | Mean deviation of the (distinct) values in the expression, returning a value of double type |
| TREND(expression) | Number of consecutive up ticks (as positive number), down ticks (as negative number), or no change (as zero) for expression. |

In one embodiment, you can use aggregation functions in a SELECT clause and in a HAVING clause. In one embodiment, you cannot use aggregate functions in a WHERE clause, but you can use the WHERE clause to restrict the events to which the aggregate is applied. The next query computes the average and sum of the price of stock tick events for the symbol AMCE only, for the last 10 stock tick events regardless of their symbol.

SELECT 'BEA stats' AS title, AVG(price) AS avgPrice, SUM(price) AS sumPrice
FROM StockTickEvent RETAIN 10 EVENTS
WHERE symbol='ACME'

In the above example, the length window of 10 elements is not affected by the WHERE clause; all events enter and leave the length window regardless of their symbol. If we only care about the last 10 ACME events, we need to use a subquery expression as shown below.

SELECT 'ACME stats' AS title, AVG(price) AS avgPrice, SUM(price) AS sumPrice FROM (SELECT * FROM StockTickEvent WHERE symbol='ACME')
RETAIN 10 EVENTS In one embodiment, you can use aggregate functions with any type of event property or expression, with the following restrictions:

1. You can use SUM, AVG, MEDIAN, STDDEV, and AVEDEV with numeric event properties only EPL can ignore any null values returned by the event property or expression on which the aggregate function is operating, except for the COUNT(*) function, which counts null values as well. All aggregate functions can return null if the data set contains no events, or if all events in the data set contain only null values for the aggregated expression. A user-defined function can be invoked anywhere as an expression itself or within an expression. The function can simply be a public static method that the class loader can resolve at statement creation time. The engine can resolve the function reference at statement creation time and verifies parameter types. The example below assumes a class MyClass that exposes a public static method myFunction accepting two parameters, and returning a numeric type such as double.

SELECT 3 * MyClass.myFunction(price, volume) as myValue
FROM StockTick RETAIN 30 SECONDS User-defined functions also take array parameters as this example shows.

```
SELECT * FROM RFIDEvent RETAIN 10 MINUTES
WHERE com.mycompany.rfid.MyChecker.isInZone(zone, {10, 20, 30})
```

The EPL processing model can be continuous: Listeners to statements receive updated data as soon as the engine processes events for that statement, according to the statement's choice of event streams, retain clause restrictions, filters and output rates.

In this section, we look at the output of a very simple EPL statement. The statement selects an event stream without using a data window and without applying any filtering, as follows:
SELECT * FROM Withdrawal RETAIN ALL This statement selects all Withdrawal events. Every time the engine processes an event of type Withdrawal or any sub-type of Withdrawal, it invokes all update listeners, handing the new event to each of the statement's listeners.

The term insert stream can denote the new events arriving, and entering a data window or aggregation. The insert stream in this example is the stream of arriving Withdrawal events, and is posted to update listeners as new events.

Figure 5:
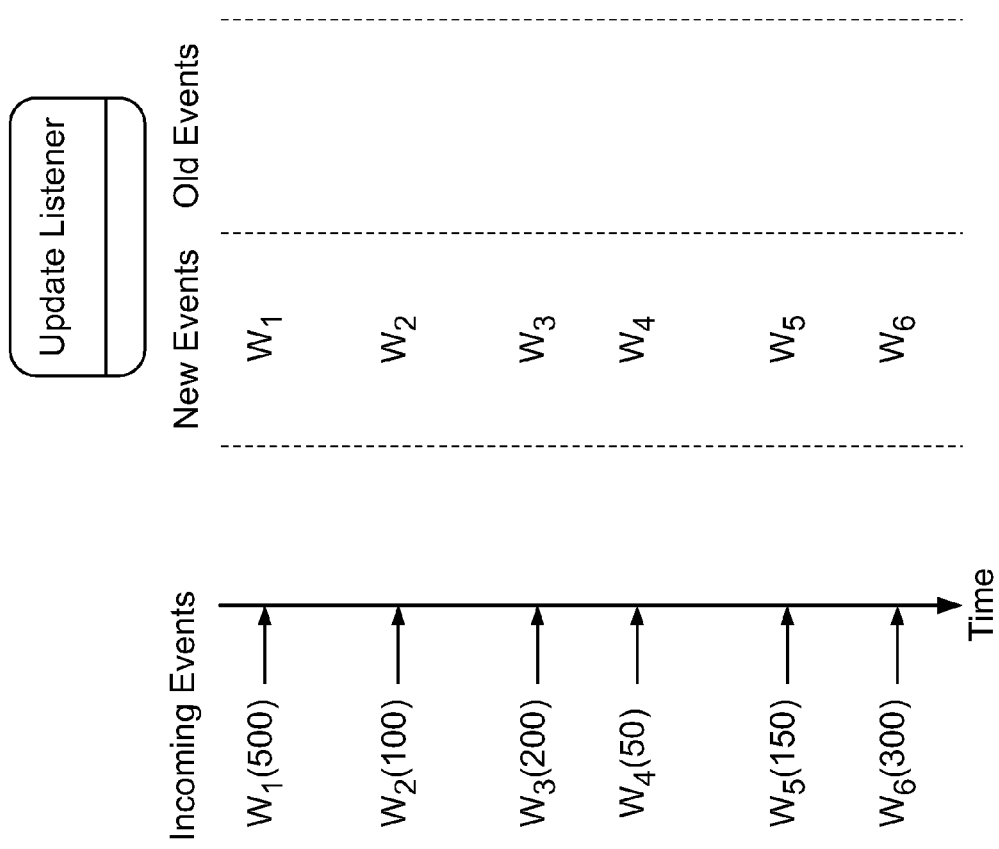
FIGS. 5-10 illustrate the operation of event processing queries.

FIG. 5 below shows a series of Withdrawal events 1 to 6 arriving over time. For this diagram as well as the others in this section, the number in parenthesis is the value of the amount property in the Withdrawal event.

The example statement above results in only new events and no old events posted by the engine to the statement's listeners since no RETAIN clause is specified.

In one embodiment, there can be two types of sliding windows: row-based and time-based. Each of these is discussed in the following sections.

A row-based sliding window can instruct the engine to only keep the last N events for a stream. The next statement can apply a length window onto the Withdrawal event stream. The statement serves to illustrate the concept of data window and events entering and leaving a data window:
SELECT * FROM Withdrawal RETAIN 5 EVENTS The size of this statement's window is five events. The engine enters all arriving Withdrawal events into the window. When the window is full, the oldest Withdrawal event is pushed out the window. The engine indicates to update listeners all events entering the window as new events, and all events leaving the window as old events.

While the term insert stream can denote new events arriving, the term remove stream can denote events leaving a data window, or changing aggregation values. In this example, the remove stream is the stream of Withdrawal events that leave the length window, and such events are posted to update listeners as old events.

Figure 6:
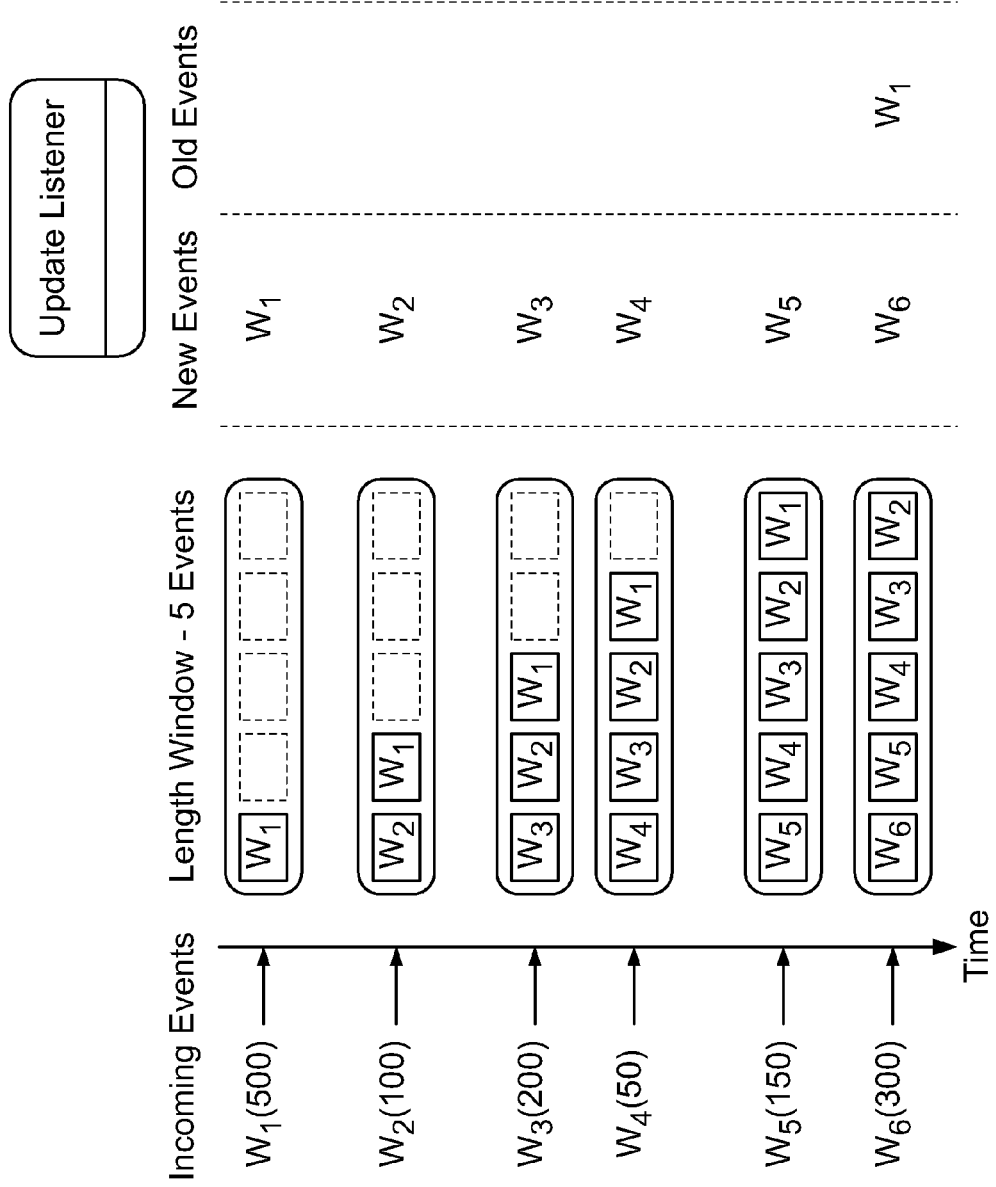

FIG. 6 illustrates how the length window contents change as events arrive and shows the events posted to an update listener.

As before, all arriving events are posted as new events to update listeners. In addition, when event $W_1$ leaves the length window on arrival of event $W_6$, it is posted as an old event to update listeners.

Similar to a length window, a time window also keeps the most recent events up to a given time period. A time window of 5 seconds, for example, keeps the last 5 seconds of events. As seconds pass, the time window actively pushes the oldest events out of the window resulting in one or more old events posted to update listeners.

Note that EPL can support optional ISTREAM and RSTREAM keywords on SELECT clauses and on INSERT INTO clauses. These can instruct the engine to only forward events that enter or leave data windows, or select only current or prior aggregation values, i.e. the insert stream or the remove stream.

Figure 7:
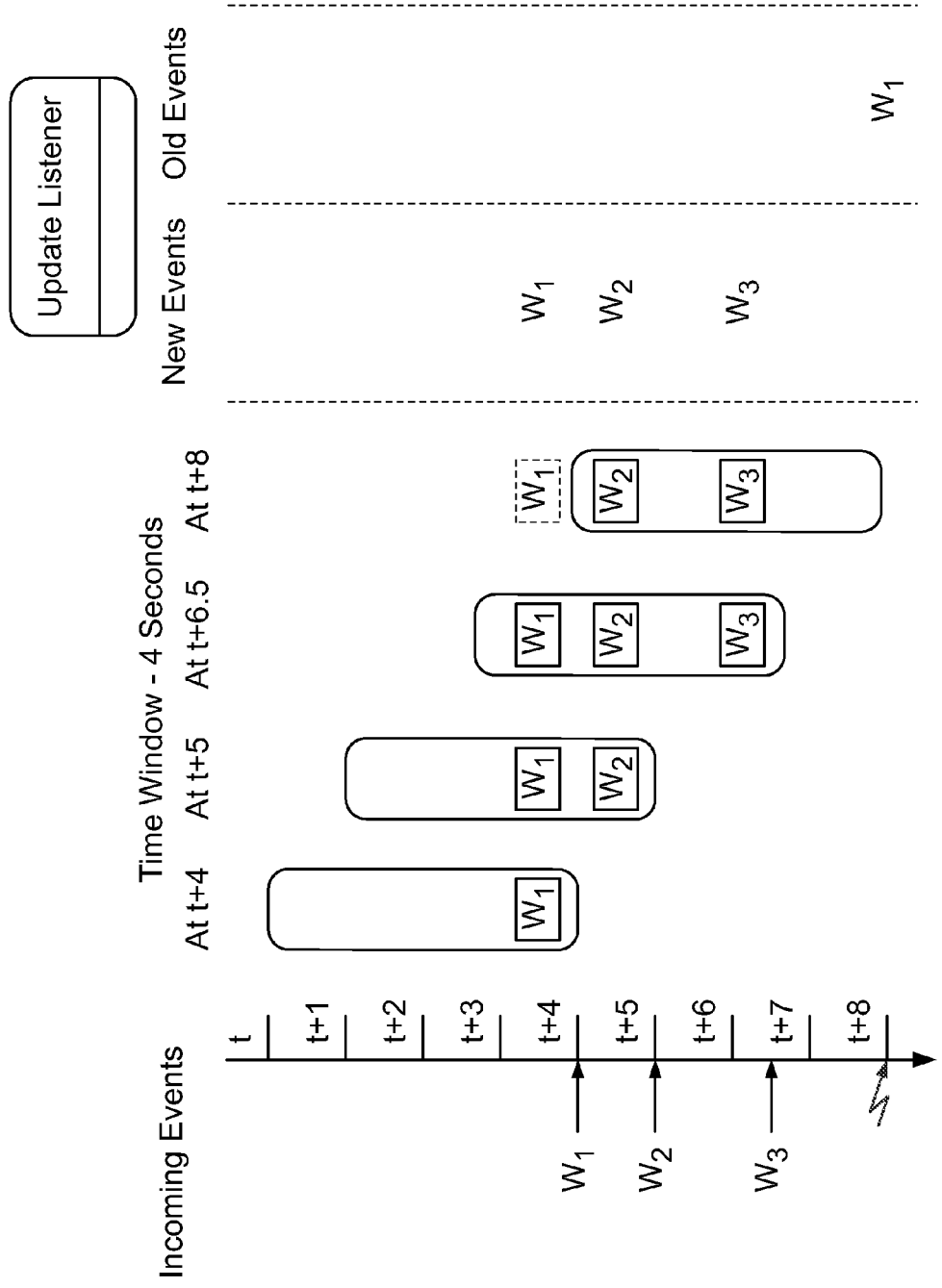

A time-based sliding window can be a moving window extending to the specified time interval into the past based on the system time. Time-based sliding windows enable us to limit the number of events considered by a query, as do row-based sliding windows. FIG. 7 serves to illustrate the functioning of a time window. For the diagram, we assume a query that simply selects the event itself and does not group or filter events.
SELECT * FROM Withdrawal RETAIN 4 SECONDS FIG. 7 starts at a given time t and displays the contents of the time window at t+4 and t+5 seconds and so on. The activity as illustrated by the FIG. 7:

1. At time t+4 seconds an event $W_1$ arrives and enters the time window. The engine reports the new event to update listeners.
2. At time t+5 seconds an event $W_2$ arrives and enters the time window. The engine reports the new event to update listeners.
3. At time t+6.5 seconds an event $W_3$ arrives and enters the time window. The engine reports the new event to update listeners.
4. At time t+8 seconds event $W_1$ leaves the time window. The engine reports the event as an old event to update listeners.

As a practical example, consider the need to determine all accounts where the average withdrawal amount per account for the last 4 seconds of withdrawals is greater then 1000. The statement to solve this problem is shown below.

```
SELECT account, AVG(amount)
FROM Withdrawal RETAIN 4 SECONDS
GROUP BY account
HAVING amount > 1000
```

Both row-based and time-based windows may be batched. The next sections explain each of these concepts in turn.

The time-based batch window can buffer events and releases them every specified time interval in one update. Time-based batch windows can control the evaluation of events, as does the length batch window.

Figure 8:
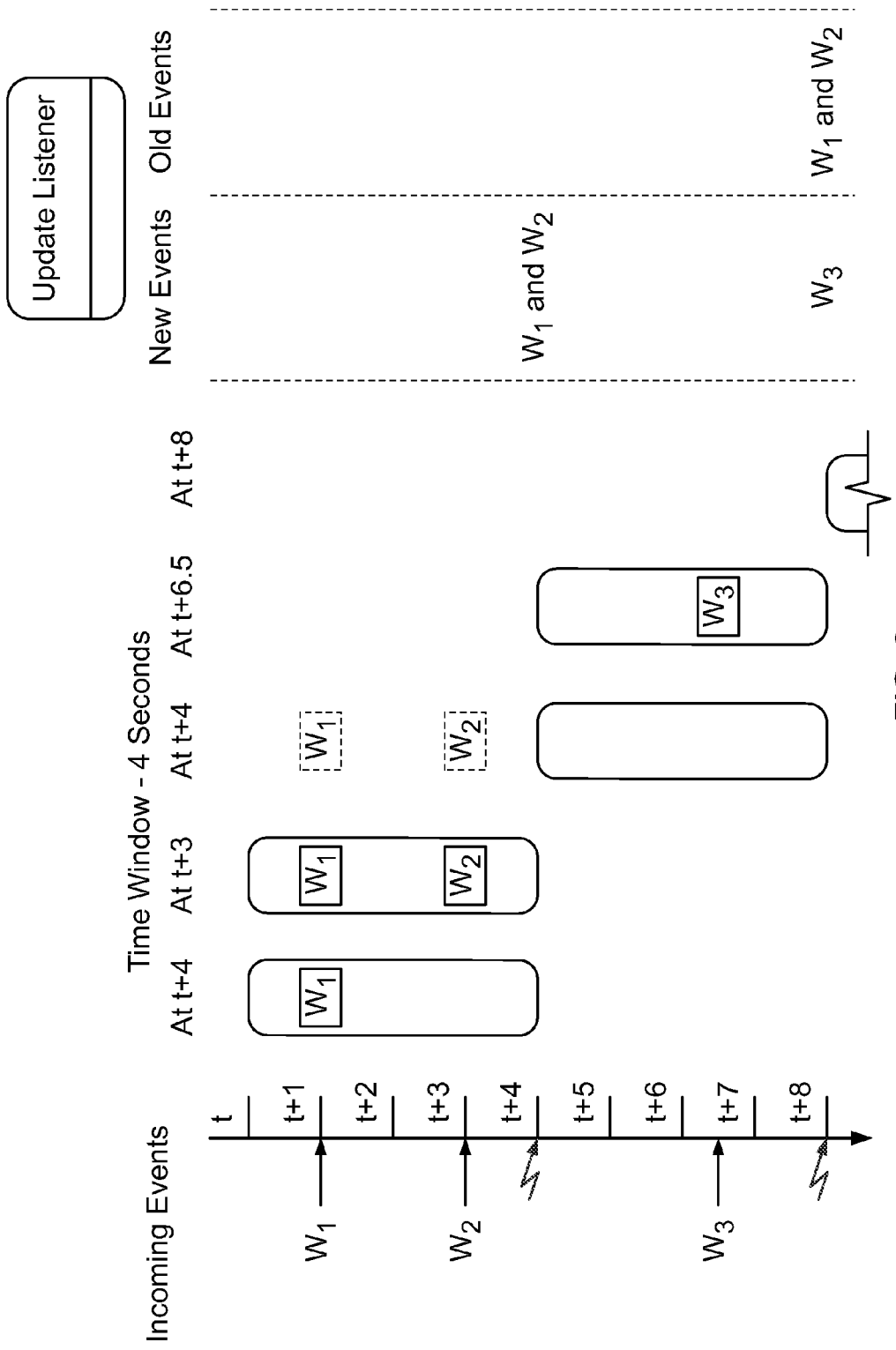

FIG. 8 serves to illustrate the functioning of a time batch view. For the diagram, we assume a simple query as below:
SELECT * FROM Withdrawal RETAIN BATCH OF 4 SECONDS FIG. 8 starts at a given time t and displays the contents of the time window at t+4 and t+5 seconds and so on. The activity as illustrated by FIG. 8:

1. At time t+1 seconds an event WI arrives and enters the batch. No call to inform update listeners occurs.
2. At time t+3 seconds an event W2 arrives and enters the batch. No call to inform update listeners occurs.
3. At time t+4 seconds the engine processes the batched events and a starts a new batch. The engine reports events W1 and W2 to update listeners.
4. At time t+6.5 seconds an event W3 arrives and enters the batch. No call to inform update listeners occurs.
5. At time t+8 seconds the engine processes the batched events and a starts a new batch. The engine reports the event W3 as new data to update listeners. The engine reports the events W1 and W2 as old data (prior batch) to update listeners.

A row-based window may be batched as well. For example, the following query would wait to receive five events prior to doing any processing:
SELECT * FROM Withdrawal RETAIN BATCH OF 5 EVENTS Once five events were received, the query would run and again wait for a new set of five events prior to processing.

Filters to event streams appear in a subquery expression and allow filtering events out of a given stream before events enter a data window. This filtering can occur prior to the WHERE clause executing. When possible, filtering should be done in a subquery as opposed to the WHERE clause, since this can improve performance by reducing the amount of data seen by the rest of the EPL statement.

Figure 9:
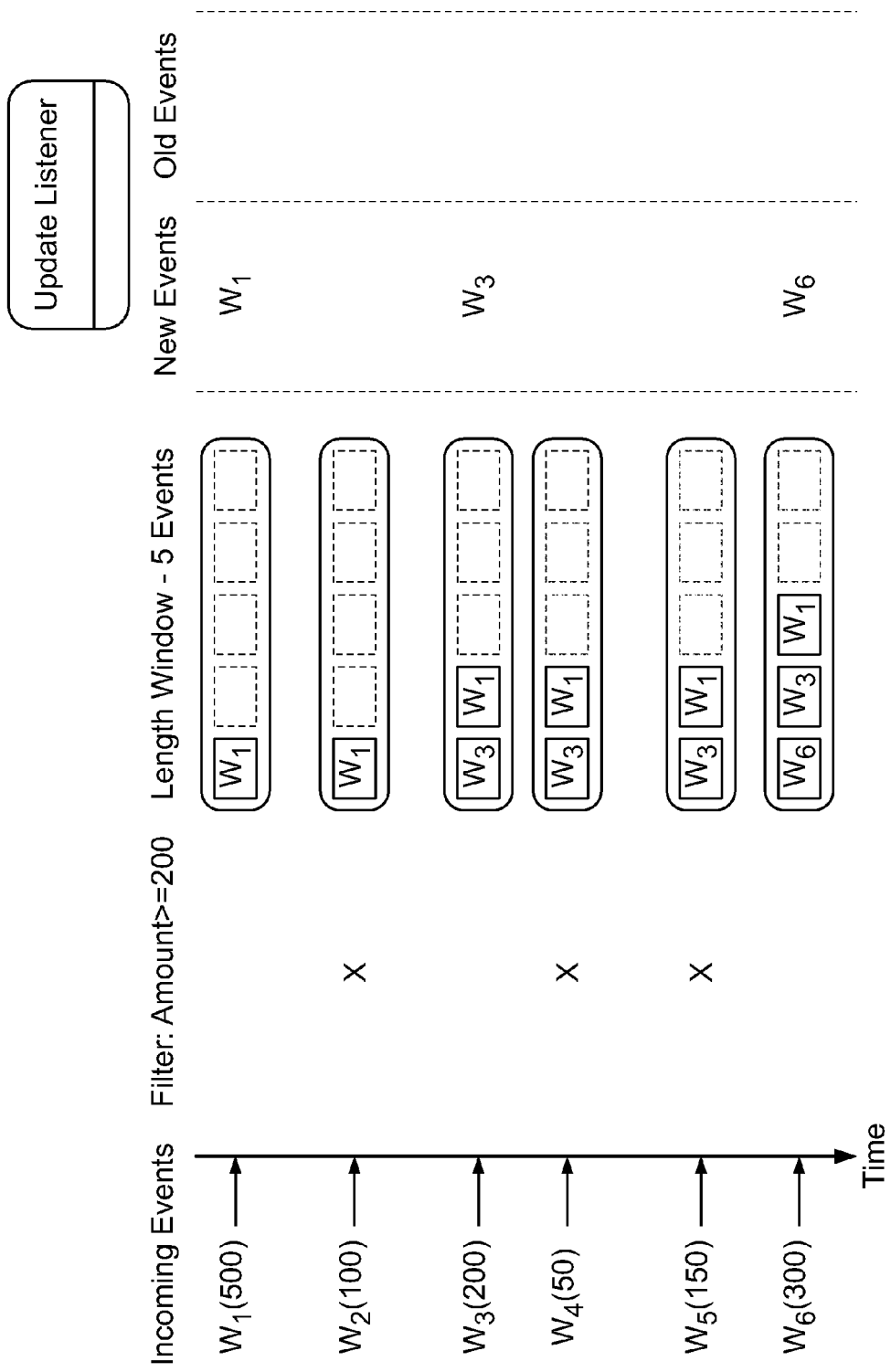

The statement below, illustrated in FIG. 9, shows a subquery that selects Withdrawal events with an amount value of 200 or more.

---
SELECT * FROM (SELECT * FROM Withdrawal WHERE amount >= 200) RETAIN 5 EVENTS
---

With the subquery, any Withdrawal events that have an amount of less then 200 do not enter the window of the outer query and are therefore not passed to update listeners.

The WHERE clause and HAVING clause in statements eliminate potential result rows at a later stage in processing, after events have been processed into a statement's data window or other views.

Figure 10:
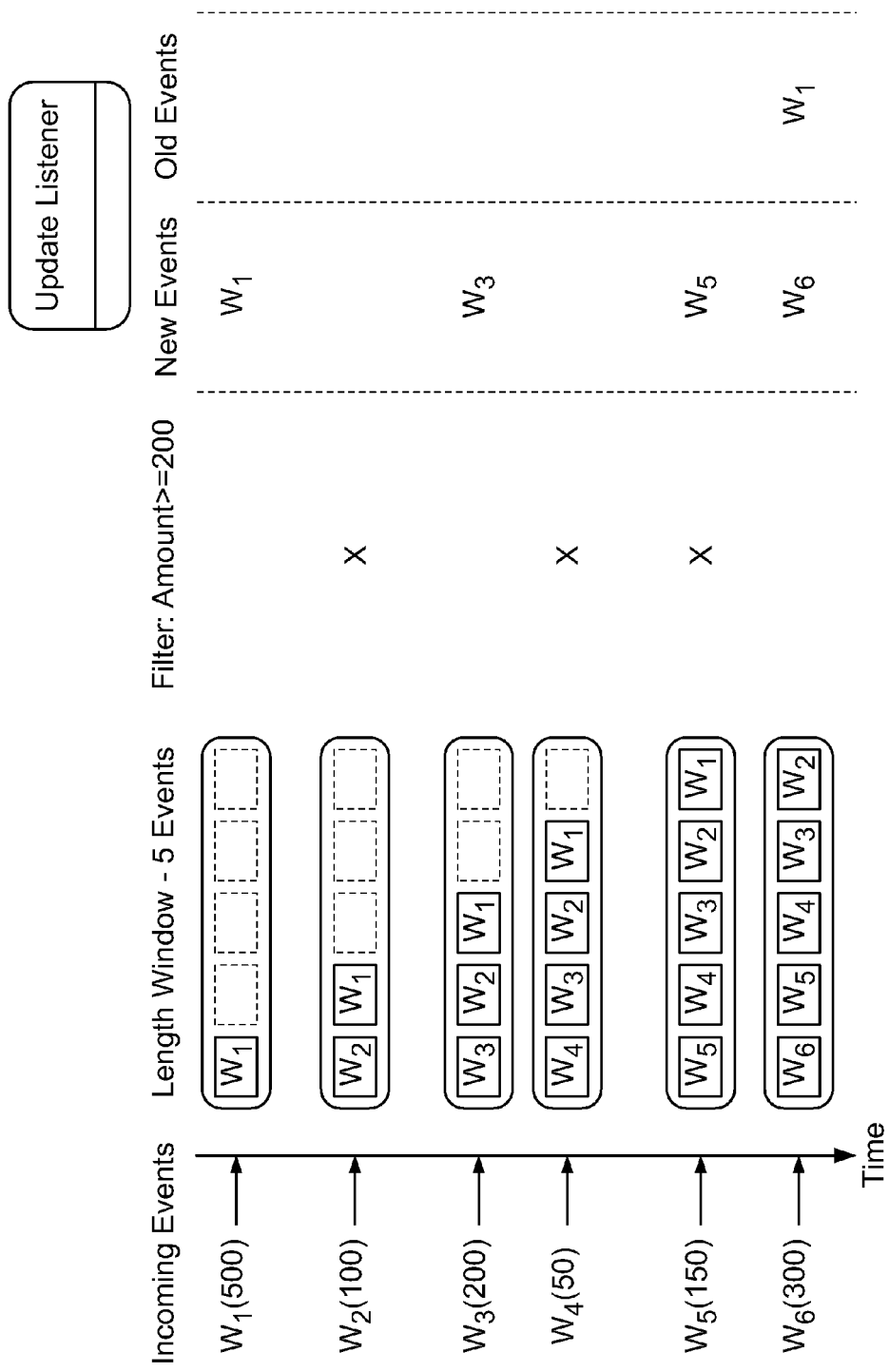

The next statement, illustrated in FIG. 10, applies a WHERE clause to Withdrawal events instead of a subquery.
SELECT * FROM Withdrawal RETAIN 5 EVENTS WHERE amount>=200

The WHERE clause can apply to both new events and old events. As the diagram below shows, arriving events enter the window regardless of the value of the "amount" property. However, only events that pass the WHERE clause are handed to update listeners. Also, as events leave the data window, only those events that pass the conditions in the WHERE clause are posted to update listeners as old events.

Statements that aggregate events via aggregations functions also post remove stream events as aggregated values change. Consider the following statement that alerts when two Withdrawal events have been received:

---
SELECT COUNT(*) AS mycount FROM Withdrawal RETAIN ALL HAVING COUNT(*) = 2
---

When the engine encounters the second withdrawal event, the engine can post a new event to update listeners. The value of the mycount property on that new event is 2. Additionally, when the engine encounters the third Withdrawal event, it can post an old event to update listeners containing the prior value of the count. The value of the mycount property on that old event is also 2.

The ISTREAM or RSTREAM keyword can be used to eliminate either new events or old events posted to update listeners. The next statement uses the ISTREAM keyword causing the engine to call the update listener only once when the second Withdrawal event is received:

---
SELECT ISTREAM COUNT(*) AS mycount FROM Withdrawal RETAIN ALL HAVING COUNT(*) = 2
---

The Java programmatic interface for the EPL can be rooted at the com.bea.wlrt.ede.Processor interface. This interface can provide methods to load, compile, start, stop, and retrieve EPL statements.

EPL statements can be loaded and compiled individually through the following method:
Statement compileQuery(String query);

If the query fails to compile, a StatementException can be thrown. Alternatively, multiple statements may be loaded from a URL using the following method:
void loadQueries (URL location);

If the queries fail to compile, a MultiStatementException can be thrown. Note that individual queries compiled through the compileQuery need not persisted and have no effect on the rule files located at the URL location.

Figure 11:
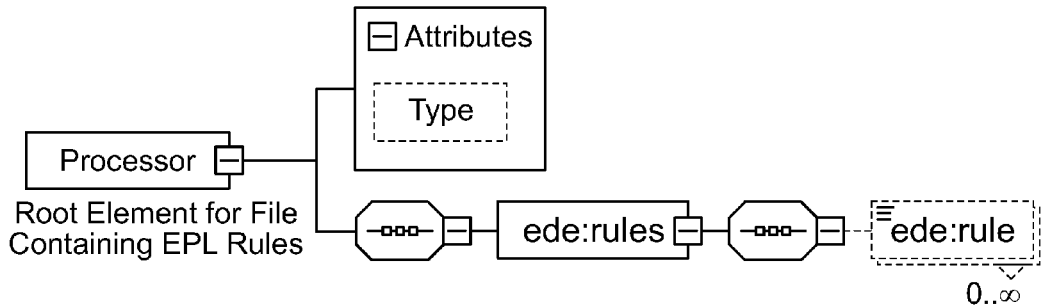
FIG. 11 illustrates an XML schema for a rules file of one embodiment.

The com.bea.wlrt.ede.Statement interface can allow update listeners to be attached to an EPL statement using the following method:
void addStreamingEventListener (StreamingEventListener listener);

The engine can call the following method on the com.bea.wlrt.ede.StreamingEventListener interface when events are added to the output window as a result of executing the statement:
void onEvent (List newEvents);

Alternatively, the occurrence of both added and removed events may be monitored by using the com.bea.wlrt.ede.RStreamingEventListener interface. In this case, the engine can invoke the following method when events are added to or removed from the output window as a result of executing the statement:
void on REvent (List addedEvents, List removedEvents);

The rules file containing queries loaded through the Processor.loadQueries(URI) method can have the structure shown in the XML schema of FIG. 11.

Below is an example of a rules file with two EPL statements:

---
<processor xmlns="http://www.bea.com/wlrt/ede" type=" wlevs:epl">
<rules>
<rule><![CDATA[
SELECT stockSymbol, price
FROM StockTick RETAIN 2 events
WHERE stockSymbol = 'AAA' AND price > 10.0
]]></rule>
<rule><![CDATA[
SELECT stockSymbol, price
FROM StockTick RETAIN 2 events
WHERE stockSymbol = 'BBB' AND price > 80.0
]]></rule>
</rules>
</processor>
---

The use cases below illustrate through examples usage of various language features.

For the throughput statistics and to detect rapid fall-off we calculate a ticks per second rate for each market data feed.

We can use an EPL statement that batches together 1 second of events from the market data event stream source. We specify the feed and a count of events per feed as output values. To make this data available for further processing, we insert output events into the TicksPerSecond event stream:

```
INSERT INTO TicksPerSecond
  SELECT feed, COUNT(*) AS cnt
  FROM MarketDataEvent
  RETAIN BATCH OF 1 SECOND
  GROUP BY feed
```

For computing the highest priced stocks, we define a sliding window that retains 100 events for each unique stock symbol where the block size of the trade is greater than 10. For example, if there are 5,000 stock symbols, then 5,000× 100 or 5,000,000 events would be kept. Only MarketTrade events with a block size of greater than 10 can enter the window and only the 100 highest priced events can be retained.

The results can be grouped by stock symbol and ordered alphabetically with stock symbols having an average price of less than 100 being filtered from the output.

```
SELECT symbol, AVG(price)
FROM (SELECT * FROM MarketTrade WHERE blockSize > 10)
RETAIN 100 EVENTS PARTITION BY symbol WITH LARGEST price
GROUP BY symbol
HAVING AVG(price) >= 100
ORDER BY symbol
```

We detect the route a car is taking based on the car location event data that contains information about the location and direction of a car on a highway. We first segment the data by carId to isolate information about a particular car and subsequently segment by expressway, direction and segment to plot its direction. We are then able to calculate the speed of the car based on this information.

The first PARTITION BY carId groups car location events by car while the following PARTITION BY expressway PARTITION BY direction further segment the data by more detailed location and direction property values. The number of events retained, 4 in this query, applies to the maximum number kept for the last PARTITION BY clause. Thus at most 4 events can be kept for each distinct segment property value.

```
SELECT carId, expressway, direction,
    SUM(segment)/(MAX(timestamp)-MIN(timestamp)) AS speed
FROM CarLocationEvent
RETAIN 4 events PARTITION BY carId PARTITION BY expressway
PARTITION BY
direction
```

We define a rapid fall-off by alerting when the number of ticks per second for any second falls below 75% of the average number of ticks per second over the last 10 seconds.

We can compute the average number of ticks per second over the last 10 seconds simply by using the TicksPerSecond events computed by the prior statement and averaging the last 10 seconds. Next, we compare the current rate with the moving average and filter out any rates that fall below 75% of the average:

```
SELECT feed, AVG(cnt) AS avgCnt, cnt AS feedCnt
  FROM TicksPerSecond
  RETAIN 10 seconds
  GROUP BY feed
  HAVING cnt < AVG(cnt) * 0.75
```

A customer may be in the middle of a check-in when the terminal detects a hardware problem or when the network goes down. In that situation we want to alert a team member to help the customer. When the terminal detects a problem, it issues an OutOfOrder event. A pattern can find situations where the terminal indicates out-of-order and the customer is in the middle of the check-in process:

```
SELECT *
FROM Checkin RETAIN 2 MINUTES, OutOfOrder, Cancelled,
Completed RETAIN 3
MIN
MATCHING ci=Checkin FOLLOWED BY
    ( OutOfOrder (term.id=ci.term.id) AND NOT
      (Cancelled (term.id=ci.term.id) OR
        Completed (term.id=ci.term.id) ) ) )
```

Each self-service terminal can publish any of the four events below.

Checkin—Indicates a customer started a check-in dialog

Cancelled—Indicates a customer cancelled a check-in dialog

Completed—Indicates a customer completed a check-in dialog

OutOfOrder—Indicates the terminal detected a hardware problem

All events provide information about the terminal that published the event, and a timestamp. The terminal information is held in a property named "term" and provides a terminal id. Since all events carry similar information, we model each event as a subtype to a base class TerminalEvent, which can provide the terminal information that all events share. This enables us to treat all terminal events polymorphically, that is we can treat derived event types just like their parent event types. This helps simplify our queries. All terminals publish Status events every 1 minute. In normal cases, the Status events indicate that a terminal is alive and online. The absence of status events may indicate that a terminal went offline for some reason and that may need to be investigated.

Since Status events arrive in regular intervals of 60 seconds, we can make use of temporal pattern matching using the RETAIN clause in combination with the MATCHING clause to find events that didn't arrive in time. We can use the RETAIN clause to keep a 65 second window to account for a possible delay in transmission or processing and the MATCHING clause to detect the absence of a Status event with a term.id equal to 'T1':

```
SELECT 'terminal 1 is offline'
FROM Status RETAIN 65 SECONDS
MATCHING NOT Status(term.id = 'T1')
OUTPUT FIRST EVERY 5 MINUTES
```

By presenting statistical information about terminal activity to our staff in real-time we enable them to monitor the system and spot problems. The next example query simply gives us a count per event type every 1 minute. We could further use this data, available through the CountPerType event stream, to join and compare against a recorded usage pattern, or to just summarize activity in real-time.

```
INSERT INTO CountPerType
SELECT type, COUNT(*) AS countPerType
FROM TerminalEvent
RETAIN 10 MINUTES
GROUP BY type
OUTPUT ALL EVERY 1 MINUTE
```

In this example an array of RFID readers sense RFID tags as pallets are coming within the range of one of the readers. A reader generates XML documents with observation information such as reader sensor ID, observation time and tags observed. A statement computes the total number of tags per reader sensor ID within the last 60 seconds.

```
SELECT ID AS sensorId, SUM(countTags) AS numTagsPerSensor
FROM AutoIdRFIDExample
RETAIN 60 SECONDS
WHERE Observation[0].Command = 'READ_PALLET_TAGS_ONLY'
GROUP BY ID
```

In this example we compose an EPL statement to detect combined events in which each component of the transaction is present. We restrict the event matching to the events that arrived within the last 30 minutes. This statement uses the insert into syntax to generate a CombinedEvent event stream.

```
INSERT INTO CombinedEvent(transactionId, customerId, supplierId,
    latencyAC, latencyBC, latencyAB)
SELECT C.transactionId, customerId, supplierId,
    C.timestamp - A.timestamp,
    C.timestamp - B.timestamp,
    B.timestamp - A.timestamp
FROM TxnEventA A, TxnEventB B, TxnEventC C
RETAIN 30 MINUTES
WHERE A.transactionId = B.transactionId AND
    B.transactionId = C.transactionId
```

To derive the minimum, maximum and average total latency from the events (difference in time between A and C) over the past 30 minutes we can use the EPL below. In addition, in order to monitor the event server, a dashboard UI can subscribe to a subset of the events to measure system performance such as server and end-to-end latency. It is not feasible to expect a UI to monitor every event flowing through the system, so there must be a way of rate limiting the output to a subset of the events that can be handled by the monitoring application. Note that in the old syntax there is no way to specify how many of the LAST events should be output. Instead only the single last event or all events can be output.

```
SELECT MIN(latencyAC) as minLatencyAC,
    MAX(latencyAC) as maxLatencyAC,
    AVG(latencyAC) as avgLatencyAC
FROM CombinedEvent
RETAIN 30 MINUTES
GROUP BY customerId
OUTPUT LAST 50 EVERY 1 SECOND
```

An outer join allows us to detect a transaction that did not make it through all three events. When TxnEventA or TxnEventB events leave their respective time windows consisting of the last 30 minutes of events, EPL filters out rows in which no EventC row was found.

```
SELECT *
FROM TxnEventA A
    FULL OUTER JOIN TxnEventC C ON
        A.transactionId = C.transactionId
    FULL OUTER JOIN TxnEventB B ON
        B.transactionId = C.transactionId
RETAIN 30 MINUTES
WHERE C.transactionId is null
```

The richness of the event model can be improved with the use of Java Beans to represent event objects. With Java Beans, property types may be nested, mapped, and indexed. However, this representation requires the use of reflection at runtime to access property values. This may potentially degrade performance.

In one embodiment, an EVERY operator can be used, but this may affect performance. The expressive power of a language is often at odds with usability. For example, pattern matching may introduce expression qualifiers such as EVERY to control the repetition of matching and WITHIN to constrain the length of time an expression must be met. Alternatively, these mechanisms can be mapped to existing concepts in the RETAIN clause such as batched and time-based windows. Although simpler, since fewer concepts are introduced, the level of control is not as fine grained as would be achieved with the former approach. For example, the EVERY operator can allow an expression such as (EVERY A FOLLOWED BY EVERY B) to detect of all of the combinations of A events followed by B events.

The EVERY operator can indicate that the pattern sub-expression should restart when the sub-expression qualified by the EVERY keyword evaluates to true or false. Without the EVERY operator the pattern sub-expression stops when the pattern sub-expression evaluates to true or false. Note that the MATCHING clause as a whole has an implicit EVERY operator surrounding it such that the statement can continue to match incoming events.

Thus the EVERY operator can work like a factory for the pattern sub-expression contained within. When the pattern sub-expression within it fires and thus quits checking for events, the EVERY can cause the start of a new pattern sub-expression listening for more occurrences of the same event or set of events.

Every time a pattern sub-expression within an EVERY operator turns true the engine can start a new active sub-expression looking for more event(s) or timing conditions that match the pattern sub-expression. If the EVERY operator is not specified for a sub-expression, the sub-expression can stop after the first match was found.

Let's consider an example event sequence as follows, for one example:

$A_1 \ B_1 \ C_1 \ B_2 \ A_2 \ D_1 \ A_3 \ B_3 \ E_1 \ A_4 \ F_1 \ B_4$

| Example | Description |
|---|---|
| EVERY (A FOLLOWED BY B) | Detect event A followed by event B. At the time when B occurs the pattern matches, then the pattern matcher restarts and looks for event A again.<br>4. Matches on $B_1$ for combination $\{A_1, B_1\}$<br>5. Matches on $B_3$ for combination $\{A_2, B_3\}$<br>6. Matches on $B_4$ for combination $\{A_4, B_4\}$ |
| EVERY A FOLLOWED BY B | The pattern fires for every event A followed by an event B.<br>1. Matches on $B_1$ for combination $\{A_1, B_1\}$<br>2. Matches on $B_3$ for combination $\{A_2, B_3\}$ and $\{A_3,$ |

-continued $A_1 B_1 C_1 B_2 A_2 D_1 A_3 B_3 E_1 A_4 F_1 B_4$

| Example | Description |
|---|---|
| | $B_3$} 3. Matches on $B_4$ for combination {$A_4$, $B_4$} |
| EVERY A FOLLOWED BY EVERY B | The pattern fires for every event A followed by every event B (i.e. all combinations of A followed by B). 1. Matches on $B_1$ for combination {$A_1$, $B_1$}. 2. Matches on $B_2$ for combination {$A_1$, $B_2$}. 3. Matches on $B_3$ for combination {$A_1$, $B_3$} and {$A_2$, $B_3$} and {$A_3$, $B_3$} 4. Matches on $B_4$ for combination {$A_1$, $B_4$} and {$A_2$, $B_4$} and {$A_3$, $B_4$} and {$A_4$, $B_4$} |

The examples show that it is possible that a pattern fires for multiple combinations of events that match a pattern expression.

Let's consider the EVERY operator in conjunction with a sub-expression that matches three events that follow each other:
EVERY (A FOLLOWED BY B FOLLOWED BY C)

The pattern first looks for event A. When event A arrives, it looks for event B. After event B arrives, the pattern looks for event C. Finally, when event C arrives the pattern matches. The engine then starts looking for event A again.

Assume that between event B and event C a second event $A_2$ arrives. The pattern would ignore the $A_2$ entirely since it's then looking for event C. As observed in the prior example, the EVERY operator restarts the sub-expression A FOLLOWED BY B FOLLOWED BY C only when the sub-expression fires.

In the next statement the every operator applies only to the A event, not the whole sub-expression:
EVERY A FOLLOWED BY B FOLLOWED BY C This pattern now matches for any event A that is followed by an event B and then event C, regardless of when the event A arrives. Oftentimes this can be unpractical unless used in combination with the AND NOT syntax or the RETAIN syntax to constrain how long an event remains in a window.

In one embodiment, a WITHIN qualifier can be used in pattern matching to specify the amount of time to wait for a match of an expression to occur.
WITHIN operator The WITHIN qualifier can act like a stopwatch. If the associated pattern expression does not turn true within the specified time period it is stopped and permanently false. The WITHIN qualifier can take a time period as a parameter.

This pattern can fire if an A event arrives within 5 seconds after statement creation.
A WITHIN 5 seconds This pattern fires for all A events that arrive within 5 seconds. After 5 seconds, this pattern stops matching even if more A events arrive.

This pattern matches for any one A or B event in the next 5 seconds.
(A or B) WITHIN 5 seconds This pattern matches for any two errors that happen 10 seconds within each other.
A.status='ERROR' FOLLOWED BY B.status='ERROR' WITHIN 10 seconds A mechanism can be used to specify in the language when a query would start and when a query would end. This functionality could possibly be added to the RETAIN clause as shown below:

RETAIN
[BATCH OF]
[integer {EVENT|EVENTS}] | [time_interval [BASED ON prop_name [,prop_name] [,[...]] ]]]
[PARTITION BY prop_name [,prop_name] [,[...]] ] ]
[WITH [n][LARGEST|SMALLEST] prop_name [, [n][LARGEST|SMALLEST]
prop_name [,[...]] ] ] ]
[UNIQUE OVER prop_name [,prop_name [,[...]] ] ]
[START AT time_spec]
[STOP AT time_spec]

In one embodiment, properties that are not grouped in the GROUP BY clause to be referenced in the SELECT clause. One behavior is to return the value of the last event for these properties. Another option could be to raise a syntax error at parse time. The statement can be changed to surround the property with a LAST or CURRENT function to explicitly specify that the last value should be returned. Note that this function can be implemented or the PRIOR function can be used with 0 as the parameter.

The default behavior be for a stream source listed in the FROM clause that does not have a RETAIN clause to constrain the window size. Can cause an error at parse time or keep all incoming events.

An exception at parse time can be raised if a stream source is left unconstrained without a RETAIN clause. A RETAIN ALL option has been added to allow for the default behavior prior to this change.

The single-row MIN/MAX functions can be renamed to remove the duplication with the MIN/MAX aggregate functions. One idea is to rename them as MIN_VALUE/MAX_VALUE instead.

The WHERE clause executes after data is put into the window while filters execute before data is put in the window. Embodiments can inspect the WHERE clause and automatically move expressions when possible to filters that execute prior to data entering a window.

There may be use cases for doing the filtering after the data is in the window if the first n events should be part of a calculation after which the filtering should be done. For example, if there's a contest in which the first 10 callers should be considered and then out of those 10, the ones to answer a question correctly would be put into a raffle. In this case, the window should be filled with 10 callers and further filtering (i.e. those who answer the question correctly) would be performed on this group. If the filtering is done first, then 10 callers who answered the question correctly would be put in the window. If one of these 10 was not in the first 10, he would not be eligible to win. Note that the behavior to filter before can be accomplished by supporting subqueries. For example:

select symbol, price from (select * from StockTick where volume > 100) where price > 10

Without subqueries, we can use multiple processors to emulate this. However, the processor for the query would have to be a single query which may become cumbersome if many queries have subqueries.

This document specifies the software architecture for real-time application server. The software architecture for a system is the structures of that system, which comprise software elements, the externally-visible properties of those elements, and the relationships among them.

WLRT can be a Java middleware for the development and execution of event driven applications that perform event processing of high-volume streaming data in real-time.

The Real-time application server can provide an integrated stack, including components at the Java Runtime (i.e. JVM), a specialized infrastructure for real-time event stream processing, and an adequate programming model.

Event-driven applications are important, because the real-world is event-driven. Event-driven situations can be modeled by event-driven applications.

Event driven applications can be defined as sense-and-respond applications, that is, applications that react to and process events.

Events can be state changes that are meaningful to an observer. Generally, events are in the form of a message. Events may be simple or complex. Simple events contain no meaningful member event. Complex events contain meaningful member events, which are significant on their own.

In one embodiment, events may be delivered through different mediums, two of which are channels and streams. Channels can be non-active virtual pipes, that is, a module is responsible for inserting data on one side of the pipe and another module is responsible for removing the data on the other side of the pipe. The data can be kept in the channel as long as it is not removed by a module. Channels may be bound, in which case it may stop accepting new data or purging existing data as it sees fit. Examples of channels can be JMS queues and topics. Streams can be active virtual pipes, that is, they can support a continuous flow of data. If a module does not directly listen to the stream, it is likely to miss data.

Event processing can be a computation step that uses events. In one embodiment, there are four ways to process events:

Event Passing:
Events are simply handled off between modules, there are no pattern matching (i.e. as if a rule always evaluate to true), and it mostly deals with simple events.
Event-passing applications are asynchronous, staged, and trigged by the arrival of one event from a single event stream or channel. Sometimes they are referenced as message-driven or document-driven applications.
Examples are simple pub-sub applications.

Event Mediation (or Brokering):
Events are filtered, routed (e.g. content-based), and transformed (e.g. enriched).
Event mediators are stateless, and deal with both simple and complex events; however they do not synthesize new complex events of their own. Messages include simple events and may be split, but are not combined (i.e. aggregated). Generally there is a single event stream or channel fan-in, and multiple event streams or channels fan-out.
Examples are integration brokers.

Complex Event Processing:
Events are matched for complex patterns, and for complex relationships, such as causality, timing, correlation and aggregation. Simple and complex events are received from several event streams and new complex events may be synthesized. CEP applications (i.e. agents) are stateful. Events may contain generic data, such as causality information.
Due to the timing and aggregation functions, CEP generally only works off streams, and not channels.

Non-Linear Complex BPM:
Event-based business processes modeling non-linear complex flows. The business process is able to handle unpredictable situations, including complex patterns, and complex event relations.

In one embodiment, event stream processing (ESP) is event processing solely on streams, as opposed to channels. Hence, CEP is always part of ESP; however ESP includes other event processing types aside just CEP.

An event-driven application can play the roles of event source, event sink, or both. An event source can handle off events to event sinks. Note that event sources do not necessarily create the event, nor events sinks are necessarily the consumer of events. Furthermore, event sources and event sinks can be completely decoupled from each other:

An event source does not pass control to event sinks, which is the case of service consumers delegating work to providers; and
Event sinks do not provide services to event sources, which is the case of providers that are initiated by consumers; and
One can add and remove event sources and sinks as needed without impacting other event sources and sinks.
How does EDA compare to SOA? That depends on how the loosely term SOA is defined. If SOA is defined as an architecture that promotes re-use of modular, distributed components, then EDA is a type of SOA. If SOA is defined as an architecture where modules provide services to consumer modules, then EDA is not SOA.

Real-time is the capability of a system on being able to ensure the timely and predictable execution of code. In another words, if a developer specifies that an object must be executed in the next 100 milliseconds (or in the next 100 minutes for that matter), a real-time infrastructure can guarantee the execution of this object within this temporal constraint.

Objects that have temporal constraints can be named schedulable objects. The system can measure how well the temporal constraints are being met by means of a particular metric, for example, the number of missed deadlines. Schedulers can order the execution of schedulable objects attempting to maximize these metrics. Schedulers have different algorithms or policies to do this, one of which is the Rate Monotonic Analyze, which uses thread priority as a scheduling parameter and determines that the highest priority should be associated to the shortest tasks.

Let's re-consider CEP. CEP allows one to specify temporal constraints in the processing of events. For example, one can specify to match for an event that happens within 100 milliseconds of another event. Hence, CEP rules (e.g. queries) are essentially a type of schedulable object, and therefore a CEP agent must be a real-time agent. In a very loosely form, CEP can be further characterized by two functions, a guarding function, and an action function. The former determines whether an event should trigger a response, and the latter specifies the responses (e.g. actions) to be taken if the guard is satisfied.

It is desired to provide (or support) CEP agents whose action functions are coded in Java. This implies that the system should support the development, and deployment of Java applications, and hence, in this regards, it must be a Java application server, or rather as we have concluded previously, a real-time Java application server.

So it seems that to meet our established goal we need a real-time Java application server. In one embodiment, CEP agents do not need the full services of a complete application server, for instance, most of the transactional and persistence container services are not needed. What is needed is a minimal-featured application server. This minimalist aspect is also applicable to the real-time capability. We do not need a full set of real-time features that enable the development of any type of applications, but rather a minimal set of real-time features that enables the support of CEP agents. Therefore, in essence, what is needed is a light-weight real-time application server.

A system that supports CEP for Java-based applications can also support other event processing types, such as event passing and event mediation. Such a system can be a light-weight real-time Java application server for event-driven applications.

A Real-time application server can receive real-time market data from single event stream, and is waiting for simple event patterns, such as equity value increasing or decreasing more than x percent over a fixed initial price. When pattern is found, the application can create and publish alarm message to configured destination.

Client application can dynamically initiate and terminate requests into server application, which trigger the event matching. For example, a client may register the following watch request: notify if a stock increases more than 3% today considering opening price. Notably, the time constraint can be very coarse.

Other examples of rules are:
  Match price from cached value, or from relational store.
  Check if equity has n consecutive increases or decreases over a period of time
  Generally, these rules do not involve correlation across streams, chaining of rules, or time constraints.

Similarly to previous use-case, however in this case volume is higher and cannot be handled by a single server application.

One solution is to partition the load across different nodes. Partition is determined by data, and achieved by configuring the messaging layer for routing adequately.

Data can be partitioned arbitrarily, taken care not to separate data that would later need to be aggregated or correlated. They are issues aggregating data across partitions.
Nodes need to be managed and configured (e.g. queries).

The system can be replicated using a hot stand-by node. Nodes are receiving similar input streams, and executing the same processing to guarantee that both have the same internal state. However, only the output of the primary system is used. A singleton service can be responsible for verifying if the primary system is up, and if not, switches to the output of the stand-by system.

During fail-over, some events may be lost. There is no need to catch-up to lost events.

In one embodiment, the system has to perform a function within a fixed time. This is slightly different than having to perform a function with the best possible latency. In the latter case, it is desirable to have the result as quickly as possible, in the former case it is mandatory to have the result within a time period otherwise it is not useful anymore.

For example, consider a system that is calculating the price index from a large set of stocks and their historical prices. Assume it generally takes 30 seconds to calculate the index, and the index is kept up-to-date every one minute, in another words, the system spends 30 seconds calculating the price, waits another 30 seconds for new data to arrive, and starts the calculation process again. However, if the calculation has not been finished within 1 minute, it makes more sense to stop the current calculation, and re-start the process again, but now using the most up-to-date data.

A less common variant of this are functions that have a fixed execution cost.

Consider a system that is monitoring stock prices and correlating the changes of prices to company news.

The stock price is processed and the result is forwarded to external applications that use it for providing quotes, among other things. The processing of the stock prices is of high priority and cannot be delayed.

As part of the processing of the stock price, the system tries to correlate the price changes to news as an optional property of the final price that is eventually forwarded to the external applications.

The news also undergoes some amount of processing, for example to search for relevant information.

Both the stock price processing and the news processing need to be collocated otherwise the forwarded processed price would not be able to include the most up-to-date news, however when the load in the system peaks, the system should give higher priority to the processing of the stock symbols and only process the news as possible.

Consider a system that is processing stock ticks. How does the end-user know how many different symbols the system is able to cope with? This number also varies depending on the system load. At peak times, the number of symbols that can be handled is less.

The end-user should be able to associate a worst-case acceptable time for the processing, and then the system should be continuously monitoring itself and if it is not meeting the worst-case time, it should raise alerts that would allow the application to reconfigure itself by re-partitioning the symbols across different nodes.

A Real-time application server receives foreign exchange quote from different markets, and is checking for arbitrage opportunities. This is done by checking if the same cross rate (e.g. US for Euro) is quoted x percent higher or lower by different markets in a sliding window of t time (e.g. 50 milliseconds). If this discrepancy is found, buy and sell transactions are initiated.

A Real-time application server application can probe inbound TCP/IP packets. The application can monitor if any single external client (i.e. same source IP) is constantly sending packets to different destination ports, which characterizes a mechanism for detecting network vulnerability. If such external client is found, firewall can be configured to block its IP.

An application monitors system level performance of distributed system, such as CPU and memory usage, and application level performance, such as application latency.

An application generates alert if bottlenecks are identified, such as thread being blocked more than n milliseconds. Alert should contain enough information to allow bottleneck to be fixed. For example, one should be able to correlate thread to application, that is, to processing of a certain event at a certain stage of the application execution path.

Monitor request-response messages part of a MOM or ESB. Generate alarms if response for a request has not been received within a configurable threshold. Alarms can be used to determine nonconforming quality of service problems. It is worth documenting some common scenarios attributed to CEP:
  Retail management of misplaced inventory and detection of shoplifting combined with RFID technology;
  Computer network monitoring for denial of services and other security attacks;
  Monitoring the position of military vehicles and soldiers equipped with GPS for their real-time positioning;

Tracking if the right medication are being taken at the right time by the right patient in the health-care industry;

Common scenarios, such as the first use-case (i.e. 4.2.1. Basic Event Matching), can be highly optimized for low latency and determinism.

For example, the first scenario can be configured to avoid all buffering, to have no thread context switch, simple data normalization, and minimal number of locking. With a performing inbound channel, realtime application server should be able to process this scenario under 10 milliseconds, excluding the time spent in the user code itself.

Of course, as the scenario becomes more complicated, for example when having multiple streams, and applications, the processing time can increase.

A common use-case for an application server is to serve web requests for a large number of clients. For this particular scenario, it is preferable to serve as many concurrent clients as possible, even if the latency, that is, the time it takes to a serve a particular request, may be slightly decreased.

This is not the case for a Real-Time Application Server. For a Real-Time Application Server, it is preferable to serve a particular request as quick as possible (i.e. low latency), even if the overall throughput of the system is degraded.

Lower latency can be achieved by profiling realtime application server for latency instead of throughput. Some of approaches for doing so are:
- Minimize the number of thread context switch, which also serves to increase data locality.
- Keep state data small, to improve hardware cache (i.e. data locality).
- Avoid pipelining of requests The infrastructure code for a realtime application server can be profiled for latency. In addition, a set of guidelines on how to develop low latency user applications can be published.

Real-time applications can have strict timing requirements, that is, they have to execute application code under some determined, known latency. Unpredictability, or jitter, can cause latency increase.

There are several sources of unpredictability in a Java software application:
- Garbage collection
- Priority inversion caused by locking contingency
- Lazy initialization of structures and memory allocation
- Unbound data structures (e.g. queues)
- Runtime exceptions and exceptional scenarios The infrastructure code for a real-time application server can be profiled to minimize these sources of jitter. In addition, a set of guidelines on hot to develop jitter-free applications can be published.

Latency and determinism are not easily observed system functions. For example, POCs for realtime application server are usually very technical and demand the presence of a realtime application server engineer onsite.

Hence, there is a need for a development tool that helps one understand the latency problems of an application. Unfortunately, existing profiling and monitoring tool only allows one to see where running time is spent. There are currently no tools to allow one to see where dead time is spent.

A Latency Analysis tool can address this problem. This latency analysis (development) tool (LAT) can:
- Monitor Java block (i.e. synchronized), lock (i.e. java.concurrent) and wait time (i.e. sleep) per thread over a configurable threshold (e.g. 20 milliseconds);
- Monitor Virtual Machine (VM) block, lock, and wait time per thread over a configurable threshold (e.g. 20 milliseconds);
- Monitor I/O block, and wait time per thread over a configurable threshold (e.g. 20 milliseconds);
- Monitor thread yield and resume events;
- Provide a coloring feature settable in threads so that higher level applications can correlate transactions that cross threads. Thread coloring can be used to measure the actual the latency of a transaction;

Access to the LAT information can be provided by a native API, which can include a filtering mechanism that can be used to decrease volume of data.

The typical usage of LAT can be at design-time, as a development tool that helps the authoring of low-latency applications.

A Real-Time Application Server could also use LAT at runtime, to provide latency events to realtime application server applications that wish to constantly monitor latency and take dynamic actions. For this use-case, there is a need of a Java API; however care must be taken to avoid a bad feedback loop in this case.

A Real-Time Application Server can provide a thread executor, i.e. work manager, whose threads can be assigned to execute on a specific priority. This prioritized executor can then be associated to different Java objects. By doing so, one can create prioritized end-to-end execution paths in a Real-Time Application Server.

For example, one can define the execution path that process news to be of less priority of the execution path that process stock ticks.

In addition, prioritized end-to-end execution paths can synchronize using priority-inversion avoidance synchronization. For example, if both the news processing path and the stock ticks execution path need to synchronize to the same socket, the latter must be given priority over the former. The configuration of the synchronization mechanism to have priority-inversion avoidance quality for prioritized executions paths should be done automatically by the realtime application server infrastructure. This means that Java objects synchronizing outside of the prioritized execution path do not need to have this quality.

The priority of the thread executors for a realtime application server application can be established by the user. Another option is to allow the realtime application server infrastructure to deduce what should be the best priority that allows the realtime application server application to maximize over some metric, i.e. few number of dead-line misses, based upon some set of heuristic or policies.

In one embodiment, since the realtime application server infrastructure is aware of the components that make a real-time application server application (e.g. adapters, processors, client POJOs), the infrastructure can monitor the latency time of the execution paths and use Rate Monotonic Analysis to determine what should be the priority of each path.

The real-time application server infrastructure can also monitor the latency of the execution paths in combination with the Hot Beans deadlines and perform an online feasibility analysis, for example informing that if execution path I executes around its average latency time, then the Hot Bean H would never meet its deadline.

Event pattern matching is the ability to identify a set of events by comparing attributes of the events with user-specified templates, or patterns.

A Real-Time Application Server can support the declarative specification of pattern matching for the streaming events.

Event aggregation is the ability to deduce a higher (abstraction) level event from a set of lower level events. Some examples are:

Buy stock event, sell stock event, and acknowledge event can be aggregated into an exchange stock event.

A series of stock quote events can be aggregated into a single average price stock event.

Event aggregation allows one to construct a business perspective of the event driven system.

A Real-Time Application Server can support the declarative specification of event aggregation. Real-time application server should provide the usual aggregation functions, such as average, count, minimum, and maximum. Real-time application server should also support the drill down from an aggregated event to its triggering events.

Event correlation is the ability to connect events to each other that share some common knowledge, or attribute. These events are generally at the same level of abstraction.

A similar concept to event correlation is the join operation of a DBMS. A join operation connects tuples of different tables that share the same value for a specific set of columns.

WLRT can support event correlation between the streams of events, however, due to its complexity; we may limit some of the usage of this functionality until we are able to fully optimize it.

Event correlation need not dictate causality.

The source of data for real-time application server applications can be from continuous stream of events, hence the event-related operations, such as event matching, event aggregation, and event correlation; can be continuously executed in the stream of events.

At a discreet point of time, the event processor can act upon a fixed set of events, logically including the first event received up to the last event received at that point of time.

It is sometimes useful to restrict this set of events on which the processor acts upon. This can be done by specifying sliding windows that include the last set of events received in some arbitrary time duration, namely a time-based sliding window, or plainly just the last set of events received, namely a tuple-based sliding window.

For time-based sliding windows, the time granularity of at least milliseconds can be supported (i.e. underflow).

There are no specific upper limits (i.e. overflow) for the sliding windows, it being restricted by the available memory. In the case of overflow, there are currently no requirements for caching the data and moving it to secondary storage as a way of scaling-up.

Other sources of data may be needed for event processing. For example, one may need to correlate an event with a database row, or to color an event with attributes from a cache, or to use some context state set by the user.

A Real-Time Application Server can provide declarative access to external data sources. The external sources may be wrapped in a common abstraction, such as a map abstraction, or JDBC.

A Real-Time Application Server event processor should also support a context memory, which could be used across events.

A Real-Time Application Server need not provide the (full) Java runtime context to the event processors. Typically, an event driven architecture can be composed of several processing steps intermingled with user logic. For example, one can imagine a set of several event processors, where each aggregates events into a higher level of abstraction and feeds them into another processor; in between the processors there may be user code performing auditing, reporting, validation, etc.

This arrangement of event processing components is called an event processing network.

A Real-Time Application Server can provide the authoring of event processing networks, supporting the horizontal composition of processing, as well as the vertical layering of processing.

The topology of an event processing network is dynamic; one can add and remove components as needed.

A Real-Time Application Server can support the declarative specification of the Event Processing Network (EPN), and (runtime) dynamic modifications by providing a Java API. For the latter, realtime application server infrastructure can use lock-free structures (e.g. java.util.concurrent).

In one embodiment, the real-time application server developer should be able to author real-time applications without having to deal with the complexity of real-time.

Real-time programming is generally complicated; one has to deal with managing their own memory, modeling thread prioritization and thread scheduling, priority inversions, preallocation of data structures, etc.

It is the intent of realtime application server to abstract these difficulties away from the developer. Hence, realtime application server need not be implementing JSR-1.

Memory can continue to be managed by the Java runtime using the DGC; or in the future also by the infrastructure using TSS. Some real-time concepts, e.g. thread prioritization, can be surfaced to the user.

A Real-Time Application Server can provide a declarative language for specifying event processing. Specification should be trivial for simple tasks. Complex tasks should be possible. There are currently no standards for Event Processing Language (EPL). Some of the existing EPLs are: CQL (Stanford's STREAM project), CCL (Corel8), iSphere's EPL, and RAPIDE (David Luckham).

Application developers do not want to be tied to middleware technology. Developers want to implement their business logic in a way that they are able to move to different platforms as needed, without having to change their code. Part of this trend was caused by the seeming complexity of J2EE, where one ended up having to mix together business logic with technology-specific code, such as it is the case of Enterprise Java Beans (EJBs).

In light of this problem, we have seem the emergence of light-weight development frameworks, such as the Spring framework, in which dependencies, or rather, services are injected into the business objects by non-intrusive means, the most popular being external XML configuration files. This mechanism is popularly called dependency injection, and this form of programming where business logic is kept into technology agnostic objects is called POJO programming.

Real-Time Application Server applications can be based upon POJO programming. Business logic can be implemented in the form of POJOs, and the POJOs are injected with the realtime application server services as needed.

A final aspect of programming realtime application server applications is that these applications can be executed in a somewhat container-less environment. Whereas in J2EE application objects are dropped into a J2EE container and inherit a set of capabilities or services, such as security, transaction, threading; realtime application server applications need to be injected or configured with the services that can be used. In a Real-Time Application Server, one can get what one uses, there is typically no magic. For example, realtime application server applications can be explicitly injected with the Executor that can manage its threading model. This approach is transparent, thus making realtime application server applications more flexible and easier to integrate with other technologies.

In practical terms, POJO programming can mean:
- At no time objects containing business logic need to implement technology specific Java interfaces;
- WRLT services (e.g. event processor) are abstracted into interfaces; there is no need for the application objects to directly reference implementation components;
- Dependency injection is used to assemble and configure the application;
- Infrastructure services are reference-able and can be replaced by other equivalent services.

Real-Time Application Server applications can be assembled from provided services, such as adapter and processing services, and then configured (e.g. TCP/IP port number for a socket adapter).

The supported declarative mechanism for both assembly and configuration can be:
- Spring-beans module of the Spring framework. This mechanism is particularly suitable for Spring-based applications.

Depending on its availability, we can also like to use SCA as our assembly and configuration model.

In the context of SCA:
- Real-time application Server applications can be represented as SCA modules.
- Real-time application Server services, e.g. adapters, processors; are specified as SCA components. User code, e.g. POJO, is also an SCA component.
- Real-time application Server Adapters may be specified as SCA entry points, if the realtime application server applications need to be wired to external client modules.
- User code, e.g. POJO, may optionally reference to other non-Real-time application Server services directly or as an SCA external service.

If realtime application server is hosted in an OSGi Service Platform, then the assembly configuration model of choice, i.e. Spring-beans or SCA, can be integrated with OSGi. In another words, these mechanisms can map seamlessly their services to OSGi services. This can be done by using the OSGi Framework API (OSGi Service Platform Core Specification Release 4). The OSGi API can provide us a standard-based and open model for dealing with services. It allows us to support different assembly and configuration mechanisms, even third-party ones.

Real-time application Server need not support the use of the OSGi Configuration Admin Service or of the OSGi Declarative Service (OSGi Service Platform Service Compendium Release 4).

There is nothing preventing one from using other programming models, such as EJB, to assemble and configure applications that use realtime application server services. Specially, EBJ 3.0, which makes use of Java Metadata, is also a reasonable alternative.

Using Spring and (Open Services Gateway initiative) OSGi, assembly can be achieved by retrieving OSGi service objects from the OSGi service registry, and wiring the service objects together using Spring's dependency injection. Configuration can also be achieved by using dependency injection directly on the service objects. This approach can mandate that the service object expose Java bean methods for its configuration, including factory-like methods when new instances of services are needed. For example, it means that we can register the Work Manager Factory as an OSGi service, and that the Work Manager should provide public methods for setting the max and min thread pool size.

By registering factories as services, we can allow the client applications to create new service instances as needed. One problem with this approach is if applications need to share the same service instance. For example, this would be the case if one wants to configure all realtime application server applications of an OSGi node to use the same work manager. However, we can work-around this issue by having a master configuration application that registers the service instance to be shared directly in the OSGi service registry in addition to the service factory.

An alternative approach to registering factories as services can be to use OSGi's service factory facility. However, OSGi caches the service object created by the service factory per bundle, in another words, it would not allow one to create more than one service object from the service factory in the same bundle, hence this may not be usable.

Dynamic (i.e. runtime) update to the assembly and configuration of realtime application server applications is possible, but may be restricted to certain functions. For example, it is allowed to change the topology of the EPN by adding or removing new adapters or client POJOs. However, it is not allowed to change the priority of a thread Executor, or to change the port of an established I/O connection, as these operations are disruptive.

Dynamic updates can be realized through a realtime application server Java API. Methods that do not allow changes after their initialization can throw an IllegalStateException. A realtime application server can also allow configuration updates through JMX. In this case, a realtime application server JMX Configuration Provider can interface with a Core Engine Configuration Manager. In the service-side, we intend can use Core Engine SDS to update the service configuration.

A Real-time application Server need not create its own deployment model, but can leverage that of its hosting environment.

The deployment unit for realtime application server applications can be the OSGi bundle. OSGi bundles are the unit of modularization used for deploying Java-based applications in an OSGi Service Platform. A bundle can be deployed as a Java Archive (JAR) file.

Real-time application Server applications can be deployed into a Core-engine backplane, which is an implementation of the OSGi Service Platform, and contains the realtime application server infrastructure support. The realtime application server infrastructure can include the realtime application server event-driven environment (EDE), which provides support for real-time event processing.

An OSGi bundle can include:
- User code (e.g. Java classes), user libraries (e.g. JAR files), and user resources (e.g. HTML files, XML files);
- Manifest.mf file describing the contents of the JAR file, and providing information about the bundle, such as references (e.g. dependencies) to realtime application server services or other OSGi services;
- An optional OSGi directory providing further OSGi information;

A realtime application server application deployment unit (e.g. OSGi bundle) can be created:
- By using a Core Engine Bundler command-line tool;
- By using an Ant task, which wraps the Bundler tool;
- Manually by the application developer;

A real-time application server need not be providing any Eclipse editor or builder for creating realtime application server application deployment units.

A realtime application server application deployment unit can be installed (i.e. deployed), uninstalled (i.e. un-deployed), and updated (i.e. redeployed). The runtime state of a realtime application server application is described in section 4 (Lifecycle Service) of the OSGi Service Platform Core Specification Release 4 and can include:

INSTALLED, RESOLVED, STARTING, ACTIVE, STOPPING, and UN-INSTALLED.

The lifecycle operations (deployment, un-deployment, and re-deployment) of realtime application server applications can be realized:

- Programmatically by another OSGi bundle using the OSGi Framework API;
- By using a Core Engine Deployer command-line tool, however in this case update is not supported. The supported operations are install, start, stop, uninstall. Remote usage is supported, and is likely to be used when deploying realtime application server applications to multiple nodes.
- By using an Ant task, which wraps the Deployer tool;
- Statically by manually editing the Core Engine backplane load file to include the realtime application server application and then using the Core Engine Launcher command-line tool;

In one embodiment, regarding the update of realtime application server applications, it can be possible to:

- Redeploy a realtime application server application, which may have changed its dependency list (e.g. added a dependency to a new adapter type) and its configuration (e.g. EPN) without having to bounce the underlying server infrastructure (i.e. Core Engine backplane). The latter is explained in the previous section. For the former, currently one would have to uninstall and then re-install an application.

Before realtime application server applications can be deployed and started, the realtime application server infrastructure (i.e. Core Engine backplane) must be bootstrapped. Core Engine backplane can be bootstrapped (e.g. launched) by using a Core Engine Launcher command-line tool. The Core Engine Launcher specification describes the process of launching Core Engine and the schema of its load and configuration files.

The realtime application server user (i.e. administrator) can be able to manage (e.g. start, stop) several concurrent instances (not withholding licensing restrictions) of the realtime application server infrastructure. The administrator can do this by using the Launcher tool, and the appropriate parameters. For instance, the administrator should configure different logging files for each realtime application server infrastructure instance. The administrator can understand the Launcher specification, and be responsible for specifying the appropriate modules to run, system properties, etc.

A Real-time application Server can provide a default "start" script to launch the realtime application server infrastructure using the default parameters, such as logging to the current directory and using the bundles.

In one embodiment, the Real-time application Server is not supporting the use of the CE Initial Provisioning Service. Also, realtime application server is not providing any wrapping of the CE Launcher, or providing its own bootstrapping facility for the realtime application server infrastructure.

An Ant task can create a domain-like directory for realtime application server applications. This domain can consist of a pre-configured launch.xml configuration file that includes the realtime application server application being developed, and a default start script, among other artifacts.

In one embodiment, a Real-time application Server need not be a full-fledged enterprise development environment, and realtime application server does not intend to replace J2EE. Hence, realtime application server should be able to integrate to other technologies.

For example, in the context of a realtime application server application, it should be possible to use JMS, Web-Services, Aspect Oriented Programming (AOP), security providers, etc; by manually including these technologies in the realtime application server application.

It can be possible to embed realtime application server within other technologies. For example, providing some amount of code, it should be possible to include the realtime application server event processor within a web application.

In summary, realtime application server can be modularized and open so as to allow its usage and integration with other technologies. This is facilitated by the fact that realtime application server is modeled so as to be hosted by an OSGi Service Platform.

Real-time applications are generally asynchronous, as this typically performs better.

User code in realtime application server applications can be in the form of POJOs. The user code can register to listen to streams that contain processed events. By doing this, the user code can be trigged and receive these events as they become available in the observed streams. This is essentially a push-model approach and can follow the Observer design pattern.

A Real-time application Server need not directly support a pull-model approach, in which user code would be able to request for processed events.

Real-time application Server can be provided as a set of loosely-coupled services.

The main realtime application server services can be:
- Event processing (i.e. matching, correlation, aggregation)
- Prioritized bounded execution paths
- Schedulable objects (i.e. Hot Beans)
- Rate Monotonic Scheduler
- Online Feasibility Analyzer The realtime application server services themselves, particularly the event processor, can be modularized components. They can be hosted in different infrastructures, such as a J2EE container (i.e. WLS), or an OSGi Service Platform (i.e. Core Engine backplane).

The Real-time application Server can receive events originating from a diverse set of event sources. Examples of event sources are: proprietary data format over TCP/IP sockets, JMS destinations; market feed handlers, TIBCO rendezvous, etc.

The Real-time application Server can allow different transport handlers and data format encoders and decoders to be plugged into its infrastructure. In other words, one can be able to adapt proprietary protocols and data formats into the real-time application server. This can be realized by providing an adapter service provider interface (SPI).

The Adapter SPI can be minimal, and need not replace JCA, or duplicate JBI.

Adapters are mostly needed for the inbound data. The inbound entry-point can be tightly coupled with the application (e.g. Message Driven Beans (MDBs) in J2EE). Outbound interfaces can be loosely coupled, and can be integrated into the application directly in the user code (i.e. 5.3.7 Integration to other Technologies).

The real-time application server infrastructure can be designed in such a way to allow for the pluggability of event processors. Different event processors support different event processing languages.

Pluggability can be provided at two levels: at the EPN level, where one can support additional processors type; and at a runtime framework for continuous query, to a lesser extent.

Caching is an important and popular approach used to lower transaction latency. Caching can be realized within the infrastructure, as well as by the user application itself.

Particularly within the infrastructure of the real-time application server, caching can be used:
- As a mechanism for scaling-up by allowing realtime application server to handle more events that can be stored in-memory at a time;
- As a efficient mechanism of logging (i.e. persisting) events for future auditing by using a write-behind approach;
- As a mechanism for replicating (and distributing) events and internal state using a distributed cache;
- With regards to the user application itself, it is expected that caching can be used to store the application state. This is principally important since realtime application server applications can be state-less. It can be common to distribute the cache, to make the information available.

In one embodiment, a real-time application server need not provide a native caching implementation. However, realtime application server applications can use third-party caching technologies (e.g. Tangosol). In addition, the realtime application server can provide hooks to allow caching to be incorporated in the infrastructure of a real-time application server. This can be done by providing a pluggable stream abstraction.

A real-time application server can allow the:
Monitoring of the lifecycle of realtime application server applications (i.e. start, stop, installed, un-installed). It should be possible to leverage OSGi's infrastructure support for monitoring OSGi bundles.

Real-time application server infrastructure modules can log info, warning, and error messages. The application developer can configure the level of logging wanted.

Real-time application server can support the localization of runtime error messages.

This can be based upon I18N.

A real-time application server can support the licensing of its modules.

In one embodiment, there are no direct atomicity requirements for the realtime application server services. For example, if a realtime application server application can be composed of several processing steps, these steps need not be atomic, should a latter one fail, former ones need not be rolled back.

However, a real-time application server need not prevent user objects from participating on a transaction if they wish to do so and have access to some Transaction Manager. A real-time application server need not provide a native Transaction Manager.

In one embodiment, there is no need to persist the current state of the real-time application server. If real-time application server is restarted, processing can be reset to its beginning. For example, if the real-time application server is waiting on two events, and the first one had already been received, in the case that real-time application server is restarted; first event may need to be received again.

Note that this is not related to the configuration of real-time application server. The configuration itself may need to be persisted. If new rules are dynamically added, they should not be lost by the restart of real-time application server.

Event causality is the relationship where an event is caused by another event.

Some examples are:
A request event causes a response event.
A buy event causes a sell event.
Non-causality, that is, the fact that an event is not related to another event, is also an important relationship of events.

The events of an event causality relationship can generally be of the same level of abstraction.

Obviously, for an event causality relationship to exist between events, it must first be established between them.

The establishment of event causality can be done by the event processor itself, however this means that event causality can be a two step process, that is, a first level of event processing establishes that event causality exists between events, and then a second level of event processing may use event causality for further processing.

This is different than the other event-related operations (e.g. event aggregation), where their execution already yields a useful result, and does not mandate further processing to add value to the application.

Hence, due to its two step nature, it is not clear if event causality can be an important feature.

One may replicate a realtime application server application across several nodes to achieve high availability using a hot standby approach. Using this approach, one still needs a way of determining which node is the primary node, and to fail-over to a secondary node should the primary node go down. This is generally referenced as a cluster singleton service. The primary and the secondary nodes of the cluster do not need to share state.

A real-time application server support a singleton service, or provide any other direct support for replicating realtime application server applications.

Another approach for achieving high availability is by creating redundant realtime application server nodes, and failing-over to them as needed. In one embodiment, the redundant nodes are not in a hot standby mode; hence the nodes of this cluster generally do share some state.

A real-time application server can provide support for redundancy.

Event processing languages can allow one to specify temporal constraints to the processing of events. Similarly, one can extend this concept to Java objects, by assigning temporal constraints to the execution of Java methods.

This would allow one to directly monitor the execution of Java methods and guarantee that they are executed completely in a timely fashion.

Time-constrained Java objects, or Hot Beans, are Java Beans whose methods have been annotated with a deadline parameter. The deadline is a relative time in relation to the start of the execution of the annotated method (absolute time won't generally be useful). If the deadline is not met by the time the method finishes execution, either successfully by returning or unsuccessfully by propagating an exception, then a missed deadline action is taken. The missed deadline action can be configured to interrupt the current execution of the method by raising a MissedDeadlineException and then to call a missed deadline handler.

The deadline annotation is an example of a scheduling parameter. Other scheduling parameters, such as a tardiness annotation, could be specified in future releases.

The deadline annotation can be associated to a class or to individual methods, in which case the method annotation takes precedence. The missed deadline handler must be a method on this same class.

This feature is a simplification of the more general Schedulable Objects feature of JSR-1.

Load balancing can be an approach for scaling realtime application server systems. It can be achieved by replicating realtime application server nodes and load balancing the events to the nodes. The load balancing feature could be part of a load balancing event stream implementation.

Another approach for achieving higher scalability and performance is to divide processing queries into stages, similarly to an instruction pipeline, and distribute the execution of these stages across a clustered set of realtime application server nodes.

A real-time application server need not provide a rich integrated development environment.

It is expected that realtime application server applications can be developed in Eclipse or BEA Workshop for Eclipse as Java projects. However, no realtime application server specific Eclipse perspective, editor, or Eclipse builder need be provided.

Note that Ant tasks for compiling the EPL files, packing and deploying realtime application server applications can be provided.

Figure 12:
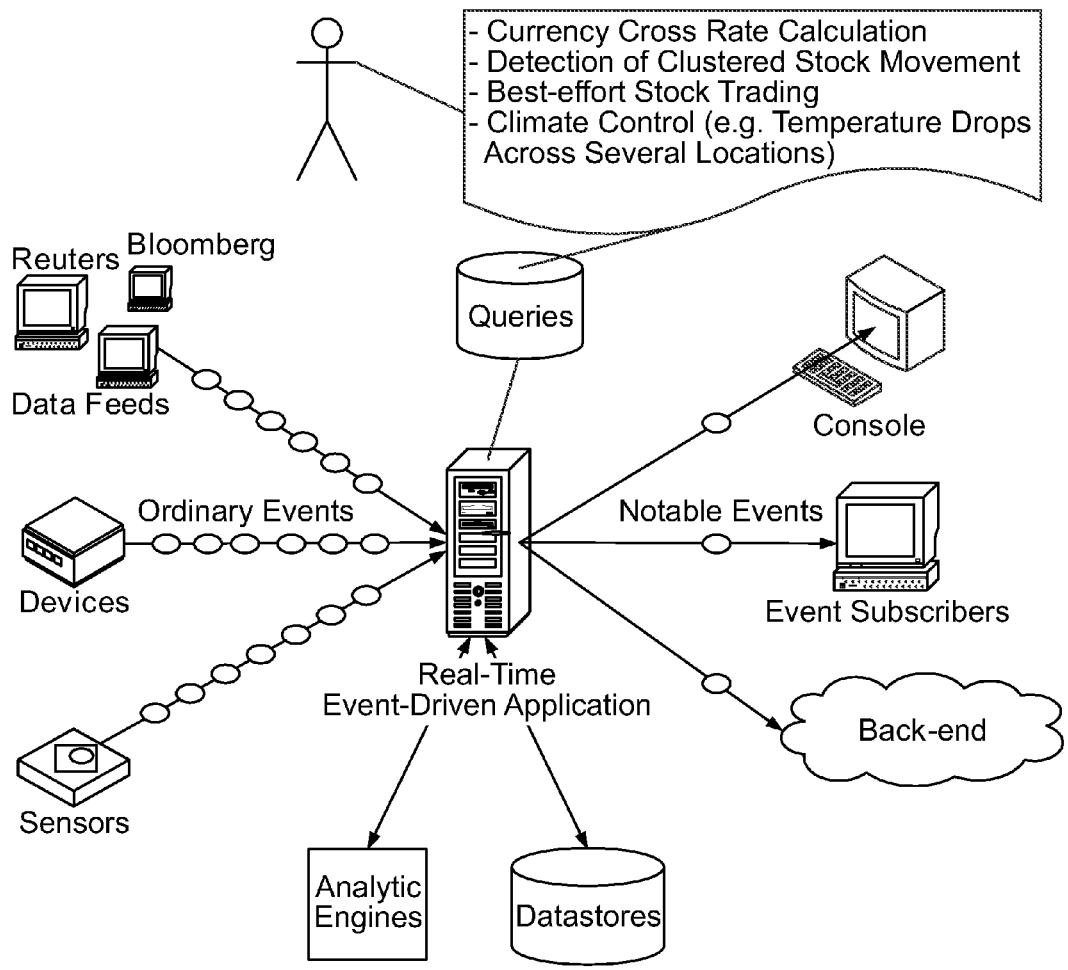
FIG. 12 illustrates a high level view of an event-driven system.

FIG. 12 illustrates a high level view of an event-driven system. An event-driven system can generally be comprised of several event sources, the real-time event-driven (WLRT) applications, and event sinks. The event sources can generate streams of ordinary event data. The real-time application server applications can listen to the event streams, processes these events, and generate notable events. Event sinks can receive the notable events.

Event sources, event-driven applications, and event sinks can be decoupled of each other; one can add or remove any of these components without causing changes to the other components. This is an attribute of event driven architectures.

Event-driven applications can be rule-driven. These rules, or queries, which are persisted using some data store, can be used for processing the inbound stream of events, and generating the outbound stream of events. Generally, the number of outbound events is much lower than that of the inbound events.

A real-time application server is a middleware for the development of event-driven applications. A realtime application server application is essentially an event-driven application.

Next, consider the realtime application server application itself, which is hosted by the realtime application server infrastructure (i.e. event-driven environment).

Figure 13:
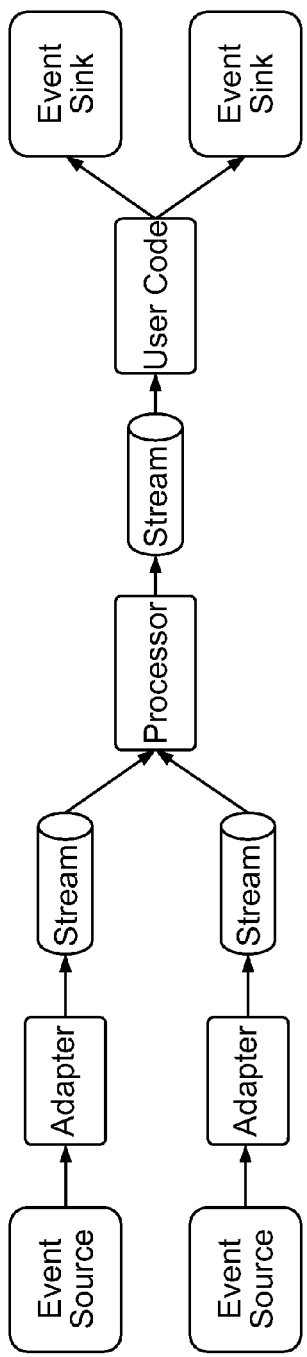
FIG. 13 illustrates an exemplary application model of one embodiment.

FIG. 13 illustrates an exemplary application model of one embodiment. A realtime application server application can be viewed as comprising of four main component types. Adapters can interface directly to the inbound event sources. Adapters can understand the inbound protocol, and can be responsible for converting the event data into a normalized data that can be queried by a processor (i.e. event processing agent, or EPA). Adapters can forward the normalized event data into Streams. Streams can be event processing endpoints. Among other things, streams can be responsible for queuing event data until the event processing agent can act upon it. The event processing agent can remove the event data from the stream, processes it, and may generate new events to an output stream. The user code can register to listen to the output stream, and can be trigged by the insertion of a new event in the output stream. The user code can be generally just a plain-old-Java-object (POJO). The user application makes use of a set of external services, such as JMS, WS, file writers, etc; to forward on the generated events to external event sinks.

Figure 14:
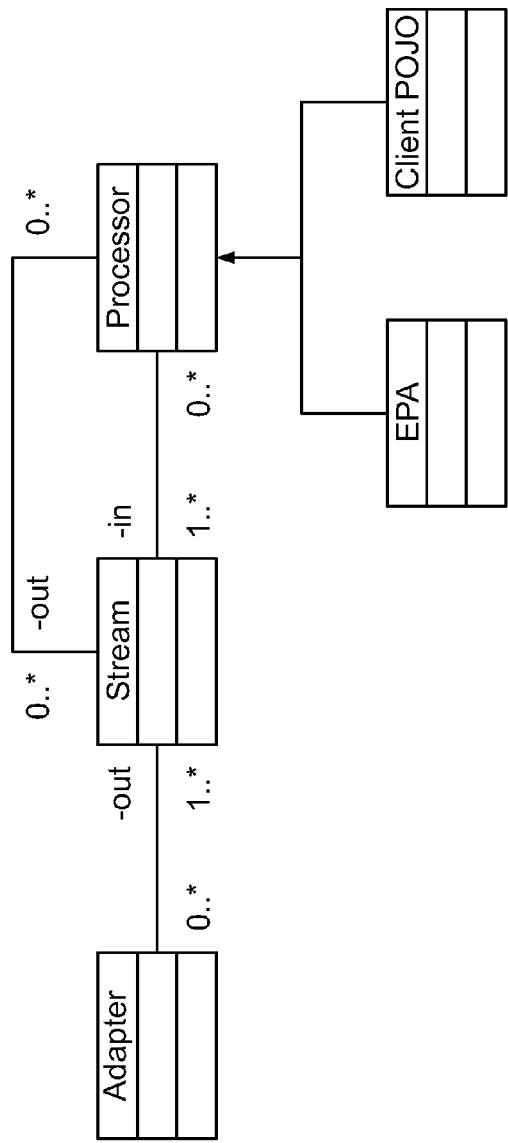
FIG. 14 illustrates an exemplary UML class diagram for the logical components of a realtime application server.

FIG. 14 illustrates an exemplary UML class diagram for the logical components of a realtime application server.

Client POJOs can be conceptually Java-based user-specific processors. Event Processing Applications (EPAs) can be generic processors whose rules are specified in some declarative form.

Adapters, Streams, EPA, and Client POJOs can be connected arbitrarily to each other, forming event processing networks (EPN). Examples of topologies of EPNs are:

Adapter->Stream->Client POJO
    Scenario: no processing is needed, aside adaptation from proprietary protocol to some normalized model.

Adapter->Stream->EPA->Stream->Client POJO
    Scenario: straight through processing to user code.

Adapter->Stream->EPA->Stream->Client POJO->
Stream->EPA->Stream->Client POJO
    Scenario: two layers of event processing, the first EPA creates causality between events, and the second EPA aggregates events into complex events.

Adapter->Stream->EPA->Stream->Client POJO
|---->EPA->Stream->Client POJO
    Scenario: two EPAs are listening to the same inbound stream, but perform different processing and outbound to different user code.

EPNs can have two important attributes.

First, event processing networks can be used to create hierarchy of processing agents, and thus achieve very complex processing of events. Each layer of the EPN can aggregates events of its layer into complex events that become simple events in the layer above it.

Figure 15:
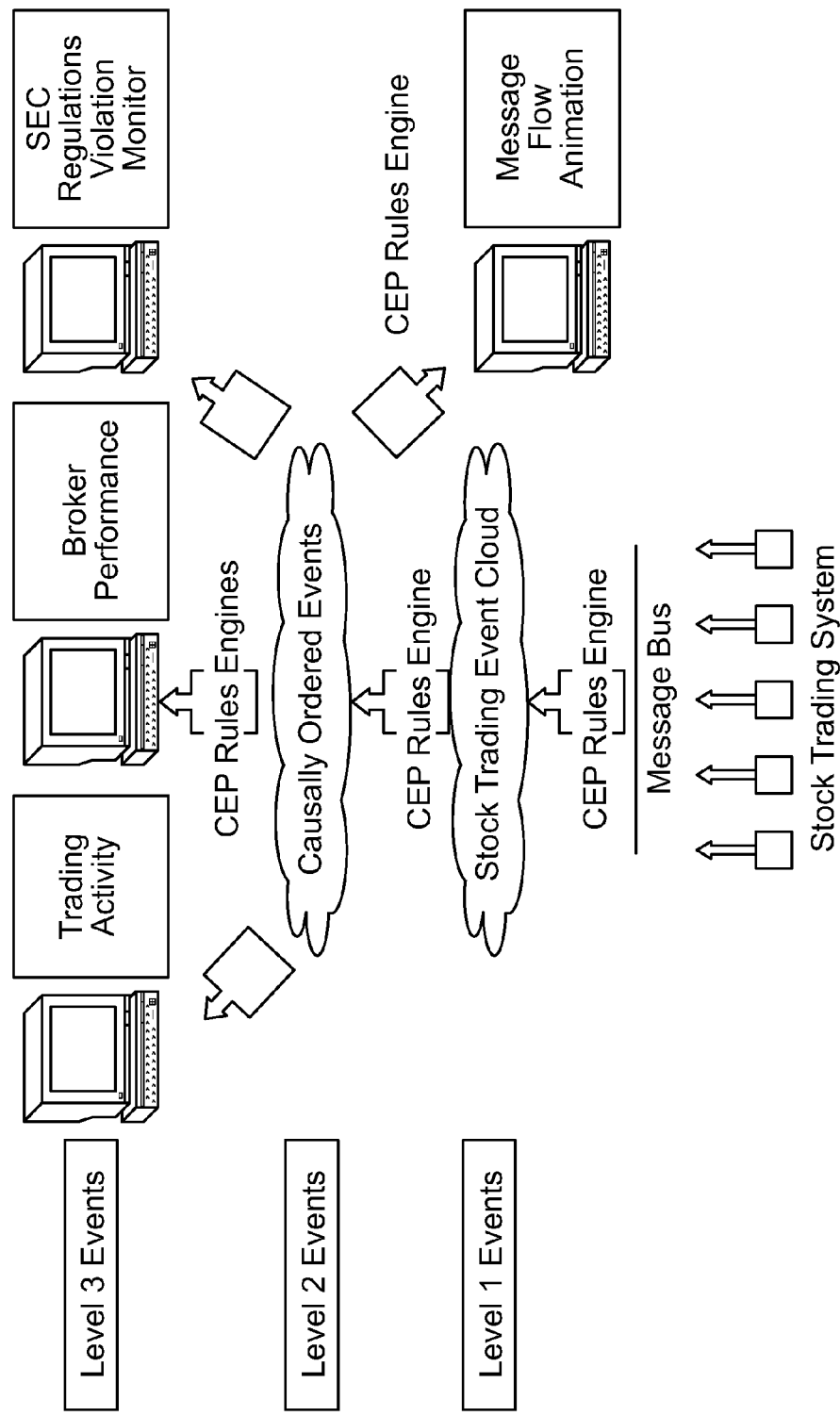
FIG. 15 illustrates an exemplary event hierarchy for a financial trading system application.

FIG. 15 illustrates an exemplary event hierarchy for a financial trading system application.

A second attribute of event processing networks is that it helps with integrability, that is, the quality of having separately developed components work correctly together. For example, one can add user code and reference to external services at several places in the network.

Figure 16:
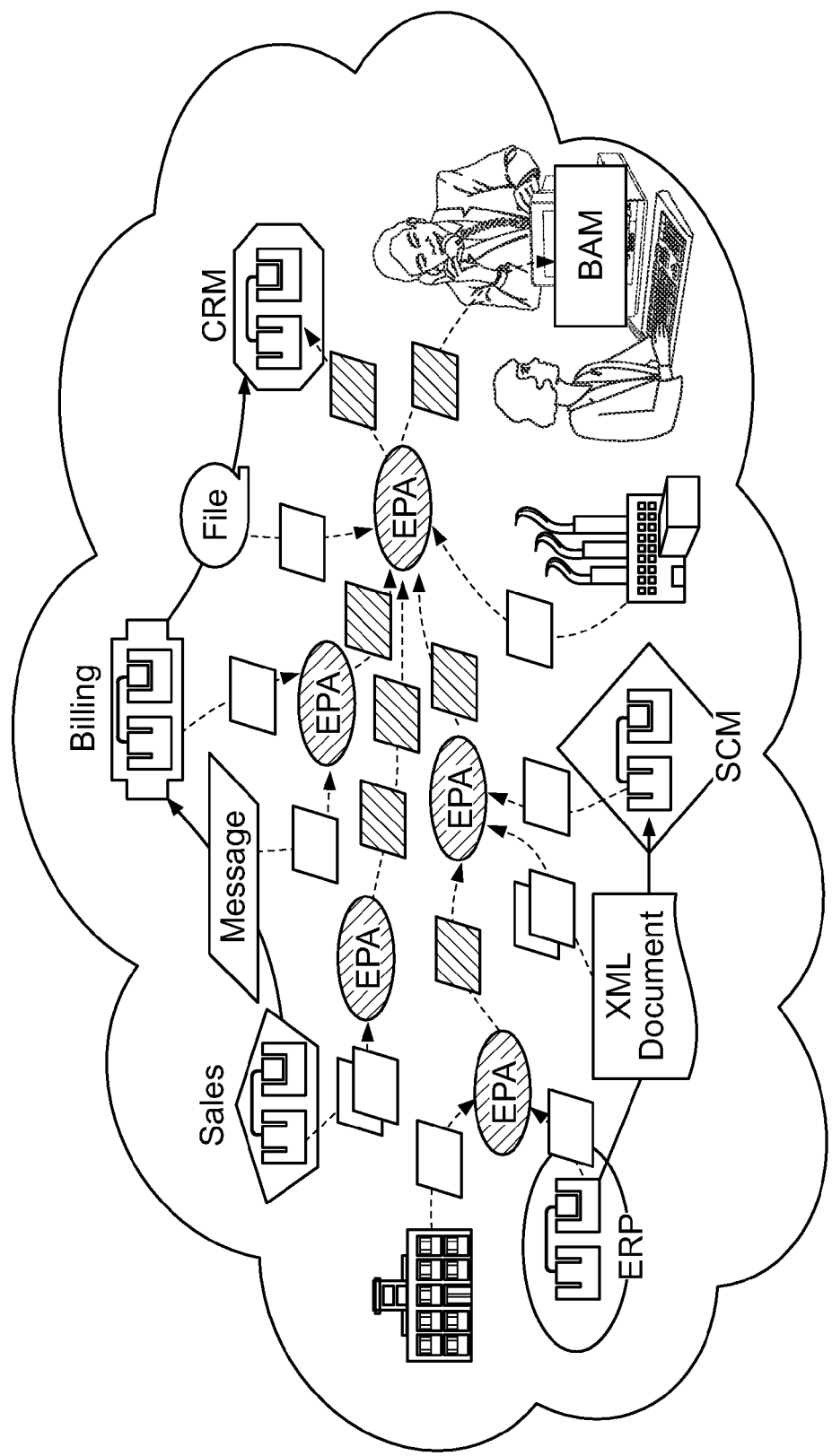
FIG. 16 illustrates an exemplary event processing network of a complete business.

FIG. 16 illustrates an exemplary event processing network of a complete business.

To provide real-time Quality of Service (QoS), we can require real-time support at all levels of the software stack.

Figure 17:
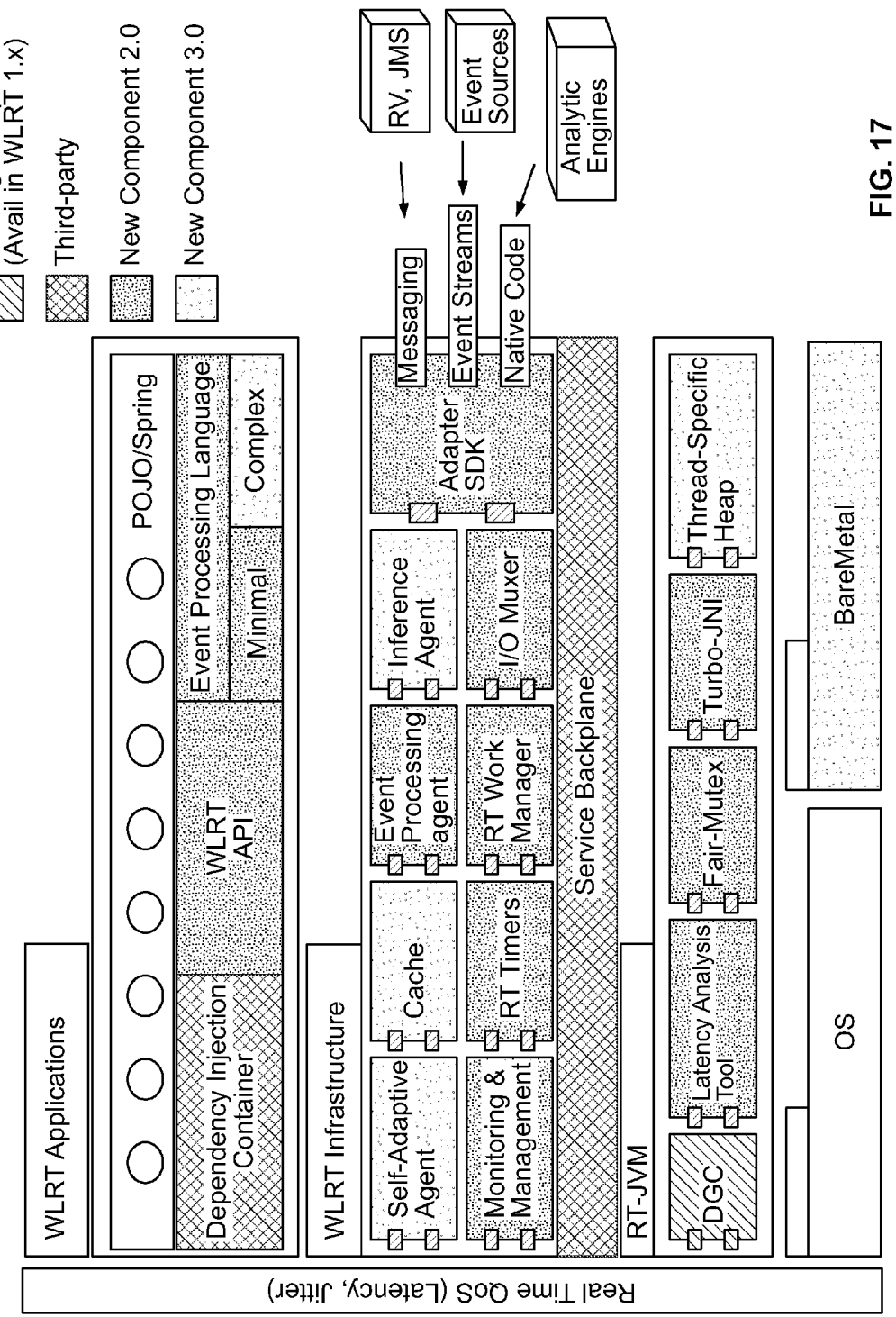
FIG. 17 illustrates an exemplary realtime application server product stack.

FIG. 17 illustrates an exemplary realtime application server product stack.

In one embodiment, there are essentially three layers:

Real-Time Java Runtime (RT-JVM): includes changes to the Java runtime needed to improve latency and determinism, and to allow better monitoring of real-time applications.

Real-time application server Infrastructure: the middleware infrastructure needed to support real-time event-driven applications. It can be made of two sub-layers:

Real-Time Core: I/O management, connection management, thread management, and other low-level services profiled for low-latency and determinism.

Event Driven Environment (EDE): event processing, stream management, and other services needed for event-driven applications.

Real-time application server Applications layer: the programming model for the development of realtime application server applications; this includes a realtime application server API, the realtime application server EPL, and a dependency injection container to assemble and configure the applications.

In summary, a real-time application server can be designed as a layered product. In one embodiment, there are currently three layers: RT-JVM, realtime application server infrastructure, and realtime application server programming model. A lower layer can be used without the upper layers. In another words, one may use the RT-JVM without the event-driven pieces, and still gain the services provided by the RT-JVM layer. Examples are legacy applications that do not want to change their code, or are not even event-driven, but do want the determinism provided by a deterministic garbage collector. Another scenario is applications that are event-driven, do need to process streaming events, but already have their own programming framework. In this case, the EDE can be used as an independent service. An example is a J2EE application, which wants to do event processing as part of a Session-Bean implementation.

Real-time application server modules can represent services. Services can improve re-use, and integrability.

A real-time application server can use an OSGi backplane as our pluggable service framework.

The OSGi backplane can provide infrastructure needed to support the pluggability of third-party components implementing our interfaces, such as third-party adapter's implementation for financial application protocols.

This can be achieved by:
1. A real-time application server makes available a set of framework interfaces (e.g. Adapter, AdapterFactory, Stream, StreamFactory, Processor, ProcessorFactory) as part of an interface-only bundle named EDE (event-driven environment).
2. Service providers register their implementations in the OSGi service registry using the realtime application server framework interfaces as service keys, and the following OSGi properties:
   VENDOR (e.g. BEA)
   TYPE (e.g. REGULAREXPRESSION, FIX, NEWSWARE)
3. Client applications request the appropriate service implementation from the OSGi registry filtering on the interface and on the previously mentioned OSGi properties.

In one embodiment, the real-time application server modules can also interface to other components solely by referencing registered OSGi services.

An adapter can have two main responsibilities: to marshal and un-marshal protocol specific messages, and to convert protocol specific data into the realtime application server normalized data model.

It is common to refer to the protocol specific part as the southbound side, and the normalization part as the northbound side of the adapter.

An adapter can define the entry-point into the realtime application server kernel, and as such is the first active object of the system. An active object can be a runnable entity, that is, it is supported by a Thread. This can be supported by providing an instance of an Executor service to all Adapter objects.

The most common type of adapters is socket-based adapters. A socket-based adapter contains an instance of an I/O multiplexer, also known as Reactor or Dispatcher. An I/O multiplexer allows a client object to asynchronously listen to file descriptors (i.e. TCP/IP ports) waiting for read and write data to become available. In addition to the I/O multiplexer, we would like to include a buffer chunking facility.

Adapters can be configured with protocol specific properties, and optionally with schema information on how to normalize the protocol specific data.

Figure 18:
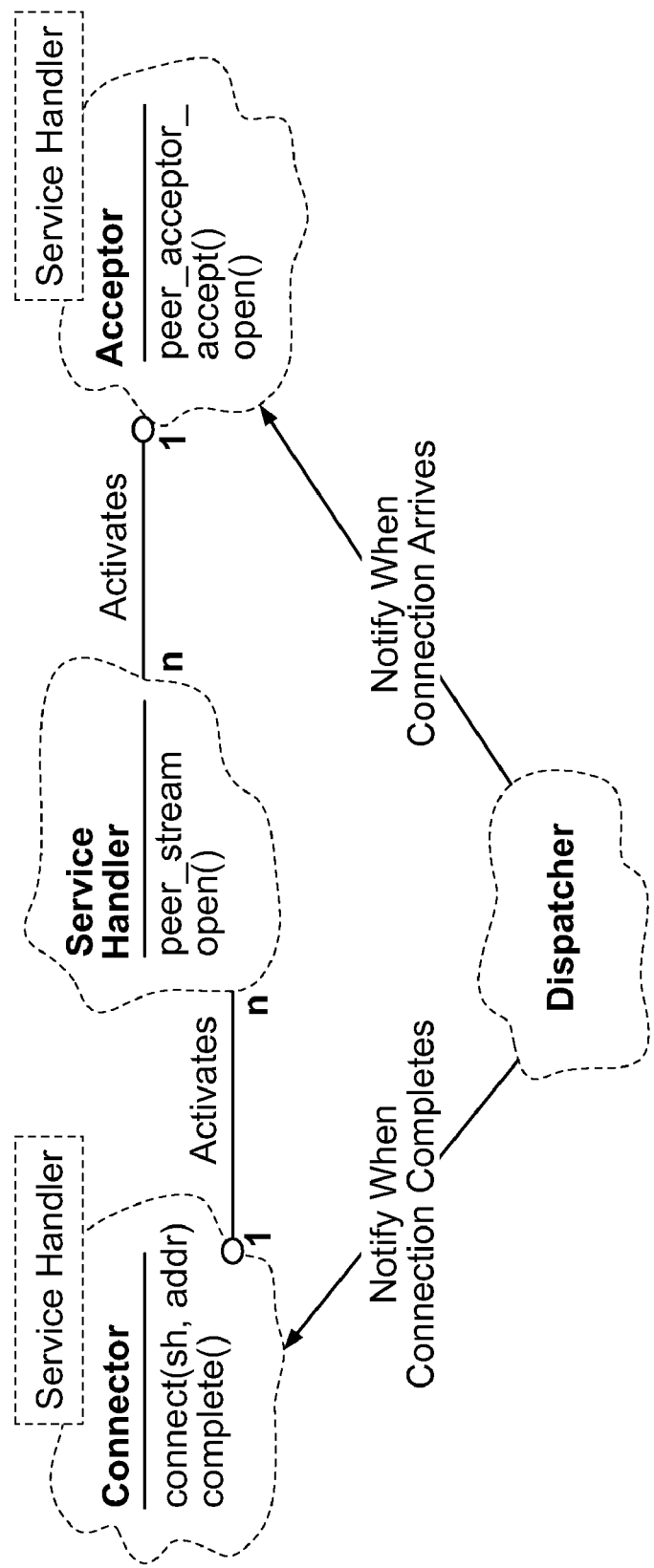
FIG. 18 illustrates an exemplary Acceptor-Connector design pattern interaction diagram.

FIG. 18 illustrates an exemplary Acceptor-Connector design pattern interaction diagram. An adapter can be similar to a Service Handler in the Acceptor-Connector design pattern.

In summary, an adapter can provide the following functions:
Delimit the entry point of a realtime application server application;
Define the threading model (e.g. priority) of the invocation path;
Normalize proprietary data model into the realtime application server's data model;

A real-time application server can provide a service provider interface (SPI) for the development of adapters. In addition, some common adapters can be provided, such as a basic socket adapter that normalizes CSV data.

The real-time application server need not provide an extensive adapter framework, such as it is the case of JCA nor provide different adapter implementations, for example for the different financial market protocols. These can be acquired by partnering with third-party vendors.

The realtime application server components (e.g. adapters, streams, EPAs, client POJOs) can communicate by sending and receiving events. This allows the modules to be decoupled of each other.

This mechanism can be implemented by using Java Bean Events.

The Java Bean's event model is outlined as:
Event notifications are propagated from sources to listeners by Java method invocations on the target listener objects.
Each distinct kind of event notification is defined as a distinct Java method. These methods are then grouped in EventListener interfaces that inherit from java.util.EventListener.
For a real-time application server, we can define a streaming Event Listener interface for receiving streaming events.
Event listener classes identify themselves as interested in a particular set of events by implementing some set of EventListener interfaces.
For a real-time application server, this means that adapters, streams, and EPAs can implement a streaming Event Listener interface. Client POJOs may also choose to implement it.
The state associated with an event notification can normally encapsulated in an event state object that inherits from java.util.EventObject and which is passed as the sole argument to the event method.
For a real-time application server, streaming Event Object class can be created. StreamingEventObject can be immutable and serializable. The latter is needed for streams that may want to store the events.
Encapsulation of the event state need not be mandatory. If the event state object is already in the appropriate form of the realtime application server data model, then the event state object can be used directly.
Event sources can identify themselves as sourcing particular events by defining registration methods that conform to a specific design pattern and accept references to instances of particular EventListener interfaces.
For real-time application servers, adapters, streams, and EPAs can be event sources. Client POJOs may also be an event source.
In circumstances where listeners cannot directly implement a particular interface, or when some additional behavior is required, an instance of a custom adaptor class may be interposed between a source and one or more listeners in order to establish the relationship or to augment behavior.
A real-time application server can provide additional mechanisms so that Client POJOs do not need to implement the StreamingEventListener interface. For example, the Stream class can provide a callback annotation that can be used by client POJOs.

The advantages of using Java Bean Events for our purposes are:
A standard-based event infrastructure mechanism, which can be introspected by third-party tools;
Efficient call-and-return (synchronous) control flow;

One can break this synchronous control flow by adding the appropriate Stream implementation between the source and the listeners. This is further described in the following section.

When an event is triggered, the event source can call each eligible target listener. By default all currently registered listeners shall be considered eligible for notification. Event processor agents can filter the target listeners and only dispatch to a subset of listeners. This filtering can be specific to an event processing language. An EPL may state which named listener should receive the events.

Event listeners may throw application exceptions, which can be propagated to the event source. The event sources can catch the exceptions, log them to the logging system, but need not re-throw or propagate them onward. Hence an event listener exception need not impact the processing of other event listeners registered to the same event source.

Exceptions need not be propagated back to the external event generators. This is due to the asynchronous nature of event-driven applications, which completely decouples sources and sinks.

In most cases, it is expected that components can dispatch single events at a time. However, there are cases, for example when accessing a relational data source, where one may want to dispatch a bulk set of events. For this effect, an event iterator abstraction can be created. Event iterators can also be events, but can provide a way for the callee to handle a bulk set of events on its own pace.

The real-time application server can support features where distribution is needed.

One option for achieving this is to use JINI's Distributed Event model. JINI's distributed event model is an extension to Java Beans Events; hence it should be possible for us to migrate to JINI events if needed.

A data stream can be a continuous flow of data from a source to a destination.

In a real-time application server, streams can function as virtual pipes that connect event processor agents and event generators, and represent logical endpoints of the EPN.

Applications can attach to these endpoints both to send events, as well as to listen for events.

Several components can be wired to a single stream. In this case, the semantic can be that of a JMS topic, in the sense that all listeners receive all the events. Streams can function as a pass-through pipe, in which case their main value is to provide inbound and outbound abstract endpoints so that event sources and event listeners do not know of each other directly. Several components can be connected to a single stream endpoint.

Streams can also allow the breaking of the control flow. By default, event dispatching happens synchronously, however a stream can be configured to dispatch events to its listeners asynchronously, similarly to a producer-consumer blocking queue.

Streams may also provide the following services:
Persistent storage, through a write-behind (i.e. asynchronous) disk update
Event distribution across machine nodes to achieve high availability and better scalability.
Sequencing of out-of-order events and handling of other streaming event imperfections.

Processors can be responsible for executing rules specified by an event processing language (EPL). Therefore, a processor can contain a set of event processing rules.

A real-time application server can provide a framework for continuous query execution. This framework is agnostic to any particular language.

One of the problems that the framework addresses is that of decreasing the number of evaluations needed to find a match.

For example, consider the case of the following rule: "match for the sequence of event A followed by event B within 10 milliseconds". A naïve implementation may do the following evaluations for every arriving event: (1) if it is event A, then update state; (2) if its event B, then update state; (3) if the state shows that both events have arrived, then check if their time is within the stipulated interval. In this case, there are a total of three evaluations for every event.

An alternative approach would be: (1) if it is event A, then insert new expression 'if it is event B, then succeed', and trigger timer 'if current time after t1+100 milliseconds, remove second expression'. So, to begin with, there is only one evaluation for every event. After event A is received, the new expression '(2) if it is event B, then succeed' is inserted dynamically, hence when event B is received, there is a direct match of the rule (2), with no further evaluations needed. In this approach, only two rules are evaluated when the event B is matched, in contrast to three evaluations warranted in the previous case. When the timer expires, the expression 'if it is event B, then succeed' is removed and the system is back to a single evaluation per event.

The continuous query execution framework can be based upon the following concepts:

A set of standard physical query plan operators can be provided, and new operators can be plugged in. These operators can represent the usual Database Management System's (DBM's) physical operators, with the addition of concurrent query operators.

Operators can be classified for being tuple based, that is, they work off from individual tuples or data items, or full-relation based, they need a complete table or set of data items to operate. In addition, operators have different number of arguments (e.g. unary, binary).

Examples of tuple-based operators are: pattern match (i.e. filter), and generation (i.e. projection). Examples of time-based operators are: hash-join, time-window, and aggregation.

Generally, it should be possible to cache the results of the operators for the same input set of events. The exception is when the operators make use of context information.

Operators may keep state for their execution. For example, a hash-join operator may create an index of its input tables, and use the index to drive the joining. The operators' state is kept in structures called synopses. Synopses may be shared by different operators for optimization. For example, you may have two instances of the same hash-join operator, and they can share a single synopsis.

A directed graph, henceforth named the Query Execution Graph (QEG), can determine the operators to be executed, and their execution order, for the complete set of queries of an EPA. The operators can be associated to edges and represent the transition actions between the vertices of the QEG. A vertex can represent a state of the EPA, and can be named a state node. A QEG can have one start state node, and may have one or more end state nodes.

Operators can either be entry actions or transition actions of an edge. The action operators form an ordered chain of operators, where each operator output becomes the input of the next operator on the chain. An edge can have two chains of operators, one for the entry actions and another for the transition actions, the latter being optional. Any time an operator returns null, the execution of that chain can be terminated, and considered unsuccessful. For a QEG to transition from a state node to another state node, all the entry action operators of the connecting edge must execute successfully. If all entry action operators execute successfully, then the transition action operators can be executed.

Entry actions can be trigged by execution events taken from execution queues. Execution events can be pairs representing the application event, that is, the event tuple as specified in the Data Model section, and a mode flag, which is either 'insert' or 'remove'. The entry actions can specify the mode of the execution event they are interested on.

Generally, an execution queue is associated to each inbound stream, but this doesn't always need to be the case. For example, a simple pass-through execution queue can be used for scenarios that do not differentiate the source of the events, or for scenarios that do not include time constraints or other features that demand buffering. This decision can be determined by the compiler.

The execution queues can be the event sources for a QEG, and drive the execution of the QEG. Inbound application events received from streams can be inserted into the connected execution queue; this can cause an execution event to be generated to the QEG, which contains the 'insert' flag, and wraps the actual application event.

Execution queues can optionally listen for heartbeat events from application clocks. The heartbeat events can be inserted into the execution queues. As the execution queues are filled up, remove execution events can be generated to the QEG. This heartbeat mechanism can be used to support time constraints. The periodicity of the heartbeats can be determined by the set of queries of the EPAs and is further detailed in a separate EPA specification.

The QEG can receive an event from an execution queue, and verify if there is an outgoing edge from its current state node whose entry actions execute successfully. If such an edge is found, then the event can be consumed, and the QEG moves to a new state node. If no edge is found from the current state node, then it can be the case that a new QEG instance needs to be started. This can be verified by performing this procedure on the start state node of the QEG. If it succeeds, then a new QEG instance can be created. Hence, although an EPA has a single QEG type, which is able to process all the EPL rules for that particular EPA, at one time an EPA may have zero or more QEG instances. As a QEG instance reaches its end state node, it can be terminated.

The benefits of the QEG can be:
A language-agnostic framework for specifying operators and their order of execution;
On its simplest form, a QEG can be a state machine. A state machine can be able to process all regular expression languages. Certain type of queries (e.g. pattern matching) can be regular expressions. Regular expressions can be closed under addition. This means that one can add all regular expression-based queries together, and the resulting expression is still a regular expression. Hence, one is able to have a single state machine, represented by a single QEG, capable of processing all the queries of an EPA in a shared highly optimized form.
As a simplistic example, consider the queries: (1) match all events for symbol 'ABC', (2) match all events for symbol 'ABD'. In this case, one can construct a QEG that systematically first matches 'AB', and then either 'C' or 'D'; and avoid the situation where first 'ABC' is processed, and if that fails, then 'ABD' is tried.
A QEG can be powerful enough to model computational rich languages (i.e. Turing complete languages), by allowing events to be put back into the execution queue, which can be compared in this case to a Turing machine tape.

An EPA can have a global context, represented by a map, which is accessible by the QEG instances of that EPA. This context can be populated by the realtime application server application developer, and can be used to provide external configurable data. This context can be shared across query execution in an EPA.

Figure 19:
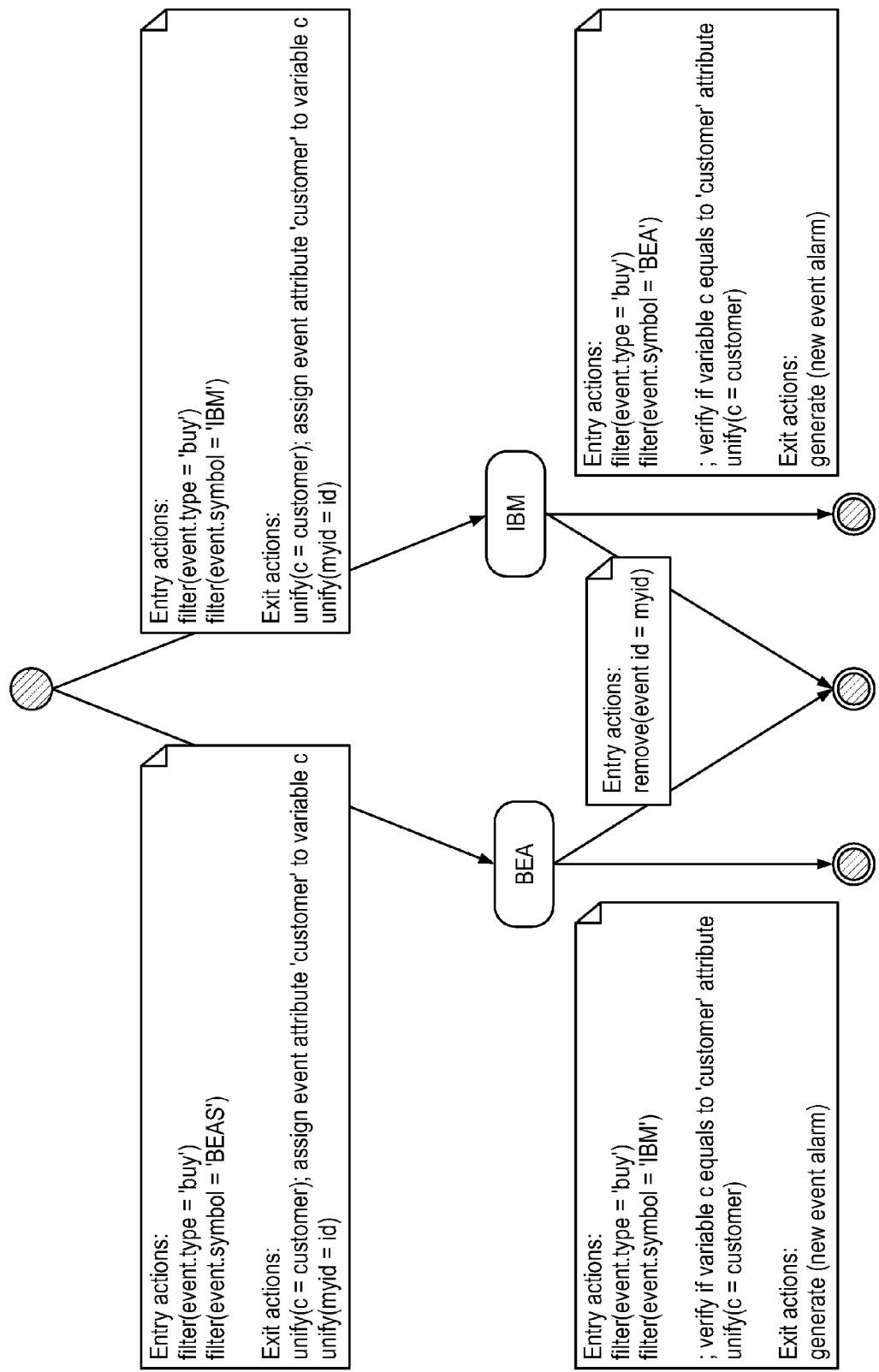
FIGS. 19 and 20 illustrate exemplary join scenarios.

Consider the scenario where one wants to generate an alarm event if the same customer c is buying stocks from both BEA and IBM within a time window of n time. One possible QEG is described by the following state diagram of FIG. 19.

Figure 20:
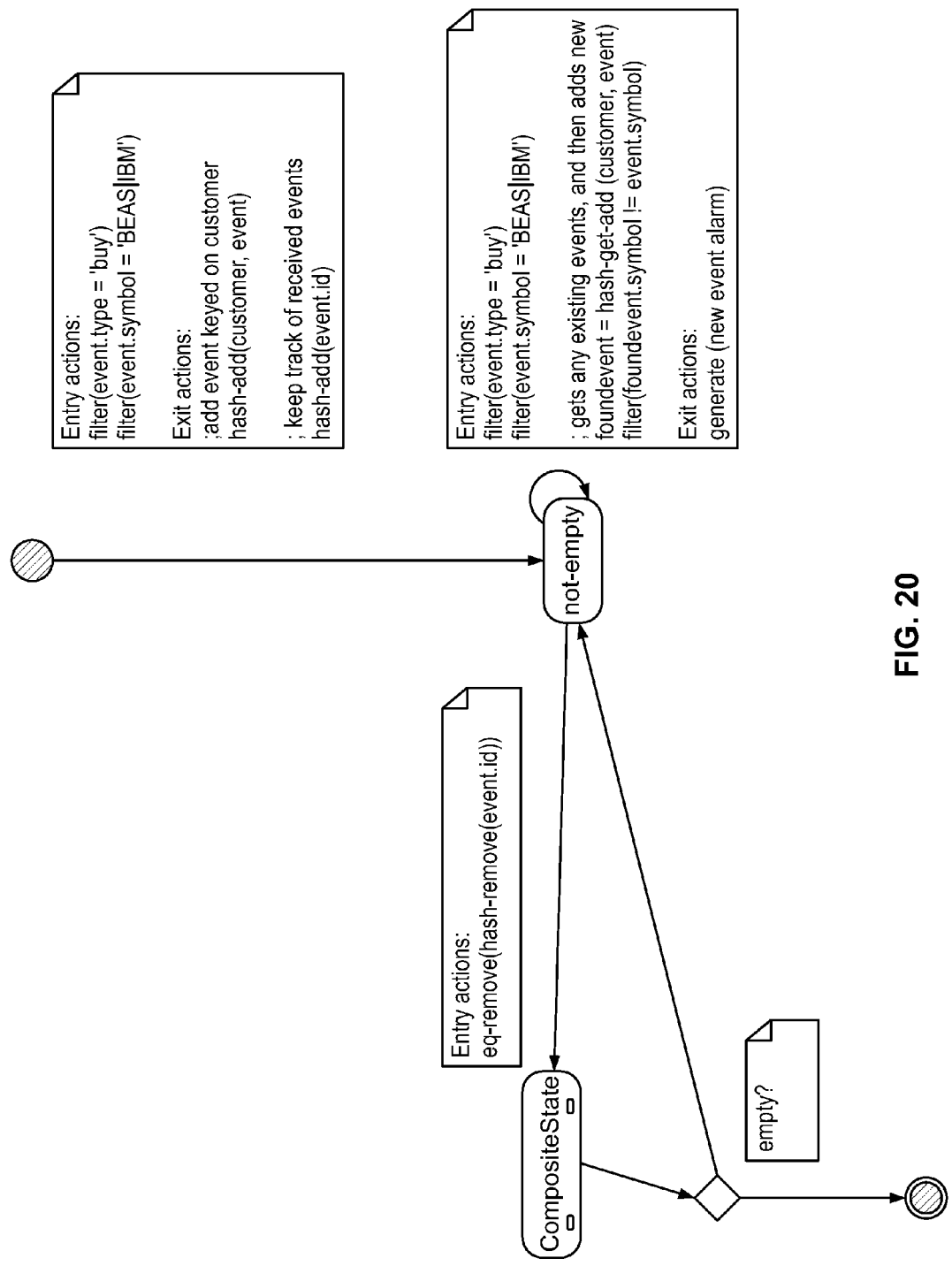

One drawback of this approach is that a new QEG instance is created per customer. If it is expected that the number of customers is high, then a more suitable approach is to keep the customers organized in hash tables. This is illustrated by the diagram of FIG. 20.

Compilers can generate physical query plans for a real-time application server, which are represented as query execution graphs and their association to processors.

Rules configured at an EPA can be specified by a single query execution graph associated to that same processor.

Compilers can construct query execution graphs in different forms. Compilers can generate the declarative assembly files that specify the execution graph, or compilers can generate Java code that directly builds the graph.

One of the main functions of the compiler is to optimize the query execution path. There are a number of heuristics that can be used for optimization:
The entry action operators can be ordered by their increasing estimated cost; one does not want to pass through a costly operator, just to fail on a cheap one afterwards.
Move filtering operations to be done as soon as possible; this is commonly known as selection pushing-down, and decreases the amount of data to be evaluated.
Try to share execution paths between queries as much as possible, this allows several queries to be evaluated by executing the minimal number of operators. The QEG should have few fan-outs as possible.

The EPL rules can reference to events. However these events can be created as Java objects by adapters, hence there can be a data model definition that is able to map the Java object events to a normalized event data model. This normalized view allows the EPL to reference events of different formats that have been generated by diverse external clients.

The data model for one embodiment of a real-time application server can define scalar types, and compound types.

The scalar types can be: Boolean, integer, long, float, and string. These are mapped directly to the corresponding Java native types.

The compound types are:
Tuple: an object that contains named properties. Properties have a name and a value. The name of a property is of string type, and the value may be of any type, including other tuple type. Tuples function similar to a dictionary, and allow for the usual insert (i.e. new name and value), remove, get and set operations.
Event (Tuple): event tuples are tuples that have the following predefined properties:
Name: string
Name defines the event type.
Id: long
All events have a unique Id in the context of an EPN, assigned at the time of the event creation.
Timestamp: long
Timestamp is the logical timestamp of the event. Timestamps are always on non-decreasing order.

Source: string (optional)
  Source is the name of the source component that generated the event (e.g. the adapter name).
Caused by: long (optional)
  Represents the event id of the causing event that led to the existence of this event.

Event tuples can be immutable. In one embodiment, they can only be populated at the time of their creation.

In Java, tuples (and event tuples) can be mapped to either Java Beans or maps. Events can form hierarchies by having a parent event type. A child event type can be used in place of its parent, and must include all the properties of its parent, in addition to its own properties.

Events can also have aliases. Aliases can represent other names that an event may be specified by.

Events can be described by an event type metadata. An event type metadata can specify the event's properties, its aliases, its parent event type, and a mapping to a Java class.

Adapters, during the normalization phase, can create event tuples by converting the inbound source event. This conversion can be done by wrapping the source event in a realtime application server event tuple interface. This allows the normalization to be implemented simply as a delegation from the event tuple interface to the actual source event, and avoids unnecessary copies.

Another option for the normalization (or lack of it in this case) is to treat the event "as is". For example, if the source event is already in the form of a map or of a Java Bean, we could avoid the cost of wrapping it. In one embodiment, in the absence of an event wrapper; we can either use reflection at runtime, or generate Java code during the query compilation. The former is simpler to do, but has a higher runtime cost.

Many source events, e.g. TIBCO messages, market handler feed events; can be in map-like form already, hence the conversion to an event tuple can be straight full. There may be cases where the event sources are deeply nested, or object-based, in which a case a more elaborate conversion may be needed, for example by caching the nested values as needed.

A real-time application server can provide an event tuple utility service, with which the client can request for the creation of an event Id, or of the complete event tuple, passing along the parameters (e.g. name, source). Timestamps can be set as part of the event tuple creation, or originating from the source event.

The threading model for realtime application server applications can be mostly determined by the selection and configuration of an Executor at the adapter, that is, the entry point of the application.

Figure 21:
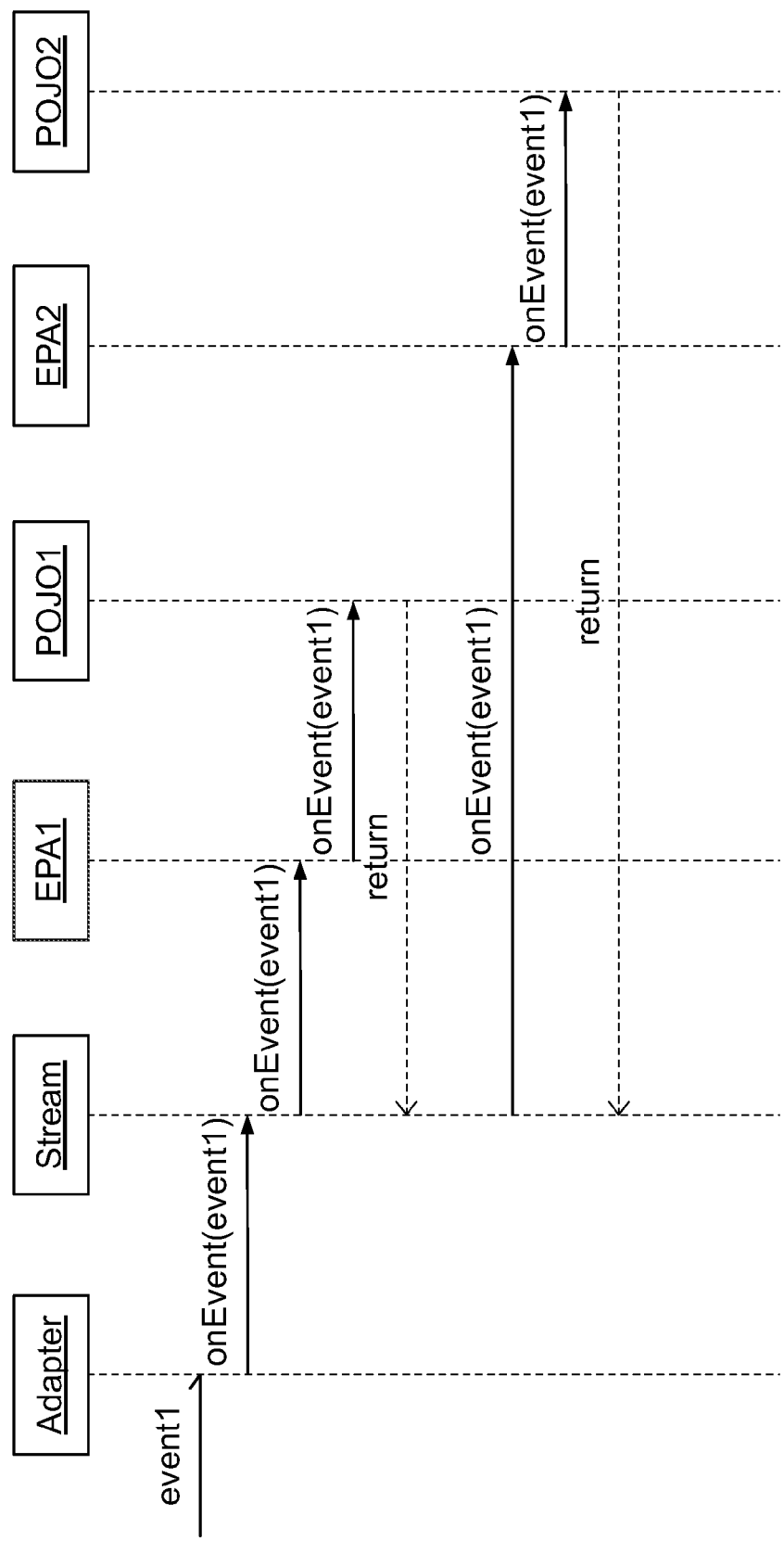
FIGS. 21 and 22 illustrate exemplary sequence diagrams.

Consider the sequence of FIG. 21. In this case, the stream is a simple pass-through. A thread is retrieved from the Executor pool, and is used to run the execution path to completion, starting at the adapter. The dispatch from the stream to the multiple listeners, i.e. EPA1 and EPA2, can happen synchronously in the context of this single thread.

All components, including the client POJO, should not hold the thread longer then it needs to, and take special care to realize asynchronous operations (e.g. write).

Figure 22:
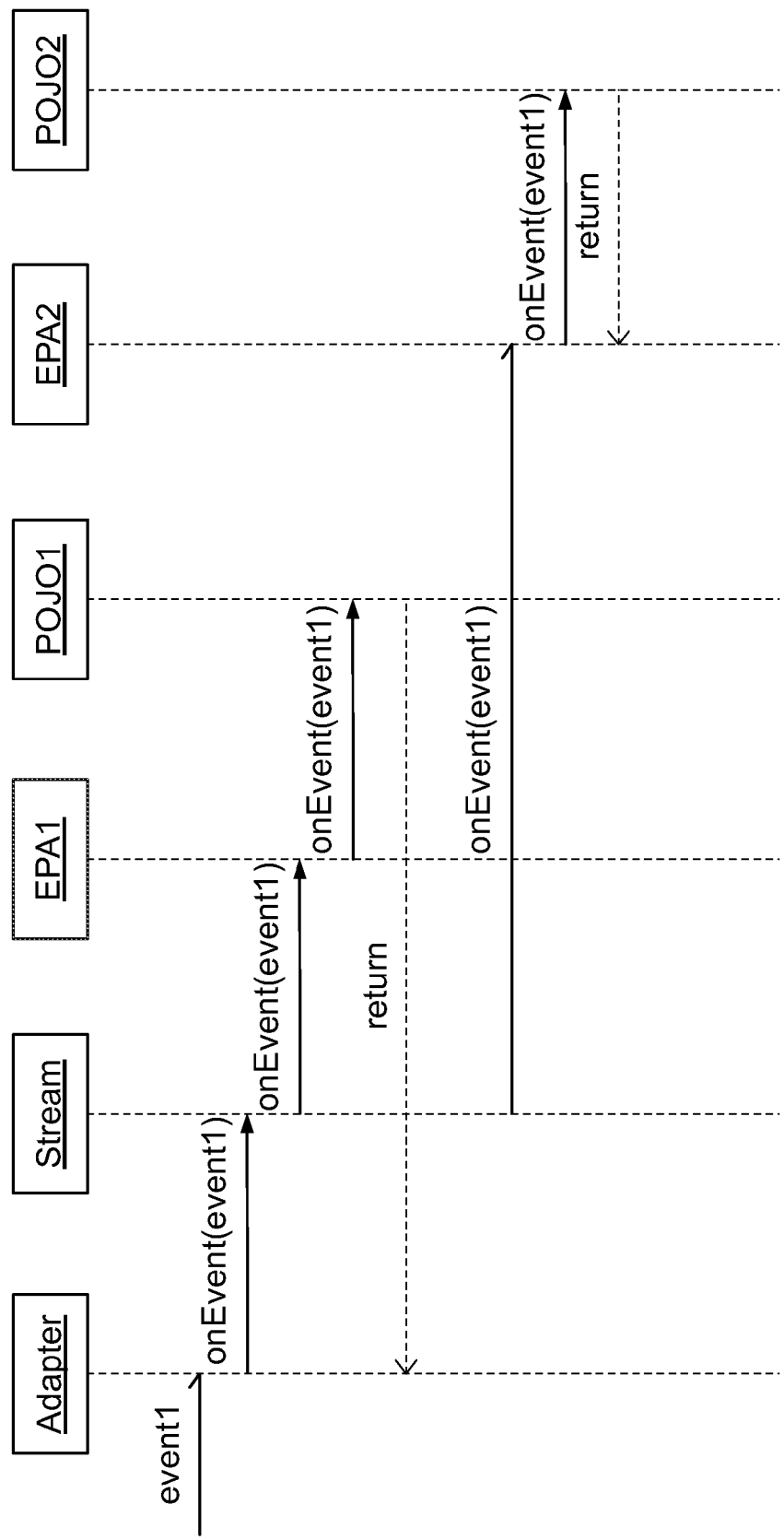

FIG. 22 shows an example where the stream is an asynchronous control flow stream.

When there are no fan-outs, that is, no component has more than one event listener, the initial thread can be used for the complete execution path, even up to the client POJO. When the path is finished, the thread is returned to the pool.

When there is a fan-out then one of the listeners can ride the caller thread, in this case EPA1, and for the remaining listeners, i.e. EPA2, a new thread can be requested from the pool by the event source and used for the dispatch to that listener. It may well be that the retrieved thread from the pool is the original caller thread that already has finished and returned to the pool, but in most cases it would be a new thread and a context switch would happen.

An executor may be configured to execute under certain priority. That is, one can assign a priority to the threads of the executor thread pool.

Executors can be assigned to adapters. A prioritized executor means that all events incoming through its assigned adapter can run using the specified priority of the executor.

This allows realtime application server applications to establish different priorities for the different execution paths of the EPN. This approach also allows the execution path to run from the start with the right priority, and hence is advantageous because changing thread priority can cause context switch.

During the execution of a client POJO, the developer has the opportunity to change the priority of the running thread, by using an interface. In doing so, the developer is essentially changing the priority of the remaining execution path. That is, the realtime application server infrastructure need not change back to the original thread priority after the thread returns from executing the client POJO. However, the realtime application server infrastructure can change back to the original thread priority of the parent executor when the thread is returned to its pool.

The execution path can always be started as a result of some asynchronous I/O trigger in an adapter.

This trigger mechanism may or may not be something that is under the control of the adapter implementation. For instance, in the case of TIBCO, one may not have access to their reactor, but rather just be called back when the TIBCO message is available.

When the trigger mechanism is available, the approach taken can be to, after the connection is established, use a thread from the executor of the adapter to wait for the availability of read data on the appropriate port (i.e. socket). When the data becomes available, the awaken thread can be the thread used to run the execution path as described previously. In another words, the 'reactor' thread can become the worker thread. However, by doing so, the port can become neglected as the waiting thread, called the leader thread, is now executing user code. Before taking away the leader thread, one should first assign another thread from the pool as the new leader thread to wait for more data on the port. This is known as the leader-follower design pattern. The advantage of this approach is that it avoids the context switch that generally happens when read data is handed off from the reactor thread to the worker thread.

One short-coming of this approach is if the execution path is long, and more read data becomes available than can be processed by the number of threads from the executor, the underlying I/O buffer may overflow. This problem can be solved by queuing the worker requests in the executor when the number of threads is exhausted. This can cause a context switch, and some locking, but allows us to support higher throughput.

Another short-coming of the lead-follower approach is that it tends to support a lesser number of connections. Although this is also resolve by the previous solution, we don't expect this to a problem, as it is anticipated that the number of clients per adapter need not be many.

This approach of using a queue between reactor and worker threads is the half-async/half-sync design pattern. Our approach can be hybrid design that is based upon the lead-follower approach when possible and fails back to the half-async/half-sync approach when needed.

In some sense, the realtime application server executor is self-tuning. The work manager for application servers can be self-tuning, it tune the number of threads of a thread-pool, trying to maximize throughput. A real-time application server with this feature means that a real-time application server developer does not have to worry about what is the best size of a realtime application server thread pool. The tuning can try to maximize latency in this case.

Finally, when the trigger mechanism is not under control of the adapter implementation, the developer can first understand what approach is taken by the vendor library. In one embodiment, if the vendor library is buffering the data and calling the adapter on a separate thread, the adapter should not again try to buffer the data and spawn new threads.

In this section we present the overall concepts for authoring realtime application server applications.

The typical realtime application server application development process can be:

User creates project, possibly a new Eclipse Java project, representing an Event Processing Network (EPN).

User configures class-path of the project to include exported packages from the needed bundles (e.g. edk). User also needs to include any used libraries, such as Spring-framework.jar.

User includes Java classes that contain the application specific code, usually in the form of POJOs.

User creates one or more Event Processing Language (EPL) files, each representing a separate Event Processing Application (EPA). For example, one could create a 'Trader.epl' file, which would contain the EPL rules for an EPA named 'Trader'.

EPAs can be scoped to an EPN, so one cannot have more than one EPA file with the same name within the same project.

The rules within an EPA may reference to streams. Any referenced stream can force the logical existence of that stream within that EPN. By default, all EPAs can have two native streams, the IN stream and the OUT stream. These can be named by prefixing IN and OUT with the EPA name.

For example, consider the following rule:
Stream1.StockQuote("BEA", price>12.00) =>Stream2.Alarm( )

This rule implicitly creates streams Stream1 and Stream2, if these streams have not been created yet.

Now consider the rule:
StockQuote("BEA", price>12.00)=>Alarm( )

This rule can implicitly create streams Trader_IN and Trader_OUT

Streams can be scoped to an EPN. This allows different EPAs within the same EPN to reference to the same streams.

Assembling the application can be the process of specifying, programmatically or declaratively, the components of the system, that is, of the EPN and wiring them together as needed for their interaction.

The first step can consist of defining what the components of the EPN are. As previously stated, the EPN component types can be: adapters, streams, EPAs, and user POJOs. One may deduce the EPA and stream instances of the EPN by inspecting the EPL files present in the project, hence there is no need to explicitly create EPA and stream instances; this can be done by the runtime framework. In one embodiment, the user does have to create instances for adapters and user POJOs, and have to wire all of the instances together.

In one embodiment, to create adapter instances, the user can have the following options:
Programmatically retrieve the registered OSGi Adapter service Declare a Spring-bean representing the OSGi Adapter service, through the Spring-OSGi integration.

User POJO instances can be created in whatever way the user chooses to. In many cases, the user can choose to do so through Spring, by declaring a Spring bean. Another option is to declare the POJO as an OSGi service and then instantiate it using OSGi's APIs. This can be a less favorable approach, as in most cases a POJO application is not a logical OSGi service.

Having created the component instances of the EPN, these instances can be wired together. This can be done by registering component instances as event listeners of component instances that are event sources, or vice-versa. Streams and EPAs can already be wired to each others by the EPA rules; hence the user only has to wire the adapters and POJOs to the desired streams. For example, the user can specify that an inbound stream of an EPA is wired to an adapter, and the outbound stream of an EPA is wired to a user POJO. The concept of stream can allow the EPA rules to be decoupled from the actual implementation component that is responsible for handling the events.

Specifically, the wiring of event sources and event listeners can be done using the following options:
The Standard Java Bean Event interfaces
Declaratively using dependency injection For the latter option, any dependency injection container can do, currently there are two options:
Core Engine's Simple Configuration Provider services
Spring framework Finally, after the assembly of the instances, one can configure the instances.

Configuration can be specific to a component type.

Adapters can be configured with an instance of a realtime application server Executor.

Socket-based Adapters can also configured with an instance of an I/O Multiplexer, whose configuration includes a TCP/IP port.

The configuration of user POJOs can be application specific.

Similarly to the assembly of the realtime application server application, the configuration of the component instances can be done programmatically using standard Java Bean interfaces, or declaratively using dependency injection.

In summary, the assembly and configuration of a realtime application server application can be open. The user can be able to programmatically or declaratively access all infrastructure component instances (e.g. adapter, stream, EPA, executors) through standard mechanisms. In one embodiment, this almost container-less environment provides a lot of flexibility, the user can integrate with other technologies, and even annotate the call path, for instance, using AOP.

There need be no object management by the infrastructure; the infrastructure can use the registered component instances as it is. For example, the same user POJO instance can be registered as an event listener can be trigged for all events. Hence, if POJO instance contains state, it can be protected (e.g. synchronized) by the user.

Another approach is to consider the user POJO as an OSGi service. In this case, a user POJO service instance can be retrieved using an event attribute as the OSGi service key to the user POJO service. This can be done per event, and can be cached as needed.

All Java files can be compiled into Java classes, and the EPL files can be compiled into executable artifacts.

All of these artifacts, that is the compiled and the configuration artifacts, can to be packaged as an OSGi bundle and placed into an OSGi modules directory. The real-time application server application is an OSGi module, which uses real-time application server modules (e.g. EDK).

For that matter, in one embodiment, the OSGi configuration files (e.g. MANIFEST.MF) can need to be configured by the user.

To run the application, the OSGi start script, which points to the OSGi modules directory, can be executed.

The real-time application server can be packaged into separate OSGi bundles to allow for extensibility. A main module can be provided with the realtime application server framework, which includes all the interfaces and some basic supporting classes. Separate modules can be provided for the out-of-the-box implementation of adapters, streams, and EPAs.

Embodiments of the present invention can include computer-based methods and systems which may be implemented using conventional general purpose or a specialized digital computer(s) or microprocessor(s), programmed according to the teachings of the present disclosure. Appropriate software coding can readily be prepared by programmers based on the teachings of the present disclosure.

Embodiments of the present invention can include a computer readable medium, such as computer readable storage medium. The computer readable storage medium can have stored instructions which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory or any media or device suitable for storing instructions and/or data. The present invention can include software for controlling both the hardware of a computer, such as general purpose/specialized computer(s) or microprocessor(s), and for enabling them to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer-implemented method for transmitting the code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations can be apparent to one of ordinary skill in the relevant arts. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

The invention claimed is:

1. A computer implemented system for real time event processing, comprising:
   a computer, including a processor and a computer readable storage medium;
   an event processor which executes on the computer, and which is configured to
   receive data as a plurality of event streams, and
   interpret statements or queries written in an event processing language, against the event streams, to query or process the data therein,
      wherein at least some of the statements or queries include, as part of the statement or query, a retain clause that defines an extent of data in a data stream which should be retained in memory and over which the statement or query should be interpreted, and
      wherein at least one statement or query defines its extent as a sliding window of stream data, over which the statement or query is processed;
   a plurality of event listeners, each of which can be associated with a statement or query to receive notifications when that statement or query is satisfied; and
   wherein, while the data streams are being received at the event processor, the event processor interprets each statement or query provided thereto, to
   retain in memory a set of data defined by the retain clause included as part of the statement or query,
   query or process the retained data as further defined by the statement or query,
   determine if the statement or query is satisfied, and
   notify associated listeners as appropriate.

2. The computer implemented system of claim 1, wherein the retain clause is interpreted by the event processor to limit the query to a certain time period of the events, as defined by the retain clause.

3. The computer implemented system of claim 1, wherein the retain clause is interpreted by the event processor to limit the query to a certain number of events.

4. The computer implemented system of claim 1, wherein the event processor further includes pattern matching functionality, including determining any matching clause in the statement or query, and querying or processing the statement or query according to the pattern defined therein.

5. The computer implemented system of claim 1, wherein the event processor determines any output clause in the statement or query that can limit the output of the query, and processes the statement or query accordingly.

6. The computer implemented system of claim 5, wherein the event processor processes the statement or query accordingly to the output clause by holding output of the statement or query until a specified amount of time has passed, or a specified number of events have been received.

7. A computer implemented method for real time event processing, comprising the steps of:
using an event processor to
receive data as a plurality of event streams, and
interpret statements or queries written in an event processing language, against the event streams, to query or process the data therein,
wherein at least some of the statements or queries include, as part of the statement or query, a retain clause that defines an extent of data in a data stream which should be retained in memory and over which the statement or query should be interpreted, and
wherein at least one statement or query defines its extent as a sliding window of stream data, over which the statement or query is processed;
providing a plurality of event listeners, each of which can be associated with a statement or query to receive notifications when that statement or query is satisfied; and
while the data streams are being received at the event processor, interpreting each statement or query provided thereto, to
retain in memory a set of data defined by the retain clause included as part of the statement or query,
query or process the retained data as further defined by the statement or query,
determine if the statement or query is satisfied, and
notify associated listeners as appropriate.

8. The computer implemented method of claim 7, wherein the retain clause is interpreted by the event processor to limit the query to a certain time period of the events, as defined by the retain clause.

9. The computer implemented method of claim 7, wherein the retain clause is interpreted by the event processor to limit the query to a certain number of events.

10. The computer implemented method of claim 7, wherein the event processor further includes pattern matching functionality, including determining any matching clause in the statement or query, and querying or processing the statement or query according to the pattern defined therein.

11. The computer implemented method of claim 7, wherein the event processor determines any output clause in the statement or query that can limit the output of the query, and processes the statement or query accordingly.

12. The computer implemented method of claim 11, wherein the event processor processes the statement or query accordingly to the output clause by holding output of the statement or query until a specified amount of time has passed, or a specified number of events have been received.

13. A non-transitory computer readable storage medium including code to:
use an event processor to
receive data as a plurality of event streams, and
interpret statements or queries written in an event processing language, against the event streams, to query or process the data therein,
wherein at least some of the statements or queries include, as part of the statement or query, a retain clause that defines an extent of data in a data stream which should be retained in memory and over which the statement or query should be interpreted, and
wherein at least one statement or query defines its extent as a sliding window of stream data, over which the statement or query is processed;
provide a plurality of event listeners, each of which can be associated with a statement or query to receive notifications when that statement or query is satisfied; and
while the data streams are being received at the event processor, interpret each statement or query provided thereto, to
retain in memory a set of data defined by the retain clause included as part of the statement or query,
query or process the retained data as further defined by the statement or query,
determine if the statement or query is satisfied, and
notify associated listeners as appropriate.

14. The non-transitory computer readable storage medium of claim 13, wherein the retain clause is interpreted by the event processor to limit the query to a certain time period of the events, as defined by the retain clause.

15. The non-transitory computer readable storage medium of claim 13, wherein the retain clause is interpreted by the event processor to limit the query to a certain number of events.

16. The non-transitory computer readable storage medium of claim 13, wherein the event processor further includes pattern matching functionality, including determining any matching clause in the statement or query, and querying or processing the statement or query according to the pattern defined therein.

17. The non-transitory computer readable storage medium of claim 13, wherein the event processor determines any output clause in the statement or query that can limit the output of the query, and processes the statement or query accordingly.

18. The non-transitory computer readable storage medium of claim 17, wherein the event processor processes the statement or query accordingly to the output clause by holding output of the statement or query until a specified amount of time has passed, or a specified number of events have been received.

* * * * *

UNITED STATES PATENT AND TRADEMARK OFFICE
CERTIFICATE OF CORRECTION

PATENT NO.       : 8,122,006 B2
APPLICATION NO.  : 12/043480
DATED            : February 21, 2012
INVENTOR(S)      : de Castro Alves et al.

It is certified that error appears in the above-identified patent and that said Letters Patent is hereby corrected as shown below:

On Title page 2, in column 1, under "Other Publications", line 22, delete "he" and insert -- the --, therefor.

In column 3, line 28, after "milliseconds" insert -- . --.

In column 5, line 31, delete "( (FIRST" and insert -- (FIRST --, therefor.

In column 10, line 3, delete "com.bean.wlrt.ede." and insert -- com.bea.wlrt.ede. --, therefor.

In column 12, line 34, delete "subordinate[0] name" and insert -- subordinate[0].name --, therefor.

In column 16, line 46, after "need" insert -- to --.

In column 16, line 61, delete "'withdrawlFraud'" and insert -- 'withdrawalFraud' --, therefor.

In column 19, line 26, delete "EQL" and insert -- SQL --, therefor.

In column 20, line 34, delete "arregate" and insert -- aggregate --, therefor.

In column 20, line 34, delete "arregate" and insert -- aggregate --, therefor.

In column 20, line 43, delete "then" and insert -- than --, therefor.

In column 21, line 67, delete "then" and insert -- than --, therefor.

In column 22, line 7, delete "then" and insert -- than --, therefor.

In column 22, line 10, delete "then" and insert -- than --, therefor.

In column 22, line 10, delete "then" and insert -- than --, therefor.

In column 22, line 30, delete "then" and insert -- than --, therefor.

Signed and Sealed this
Third Day of July, 2012

David J. Kappos
*Director of the United States Patent and Trademark Office*

CERTIFICATE OF CORRECTION (continued)
U.S. Pat. No. 8,122,006 B2

In column 23, line 7, delete "then" and insert -- than --, therefor.

In column 23, line 13, delete "then" and insert -- than --, therefor.

In column 24, line 51, delete "then" and insert -- than --, therefor.

In column 26, line 55, delete "then" and insert -- than --, therefor.

In column 28, line 44, delete ",...])" and insert -- [,...]) --, therefor.

In column 32, line 18, delete "AMCE" and insert -- ACME --, therefor.

In column 34, line 31, delete "then" and insert -- than --, therefor.

In column 34, line 54, delete "WI" and insert -- W1 --, therefor.

In column 35, line 27, delete "then" and insert -- than --, therefor.

In column 38, line 17, before "Completed" insert -- ( --.

In column 41, line 56, delete "any one" and insert -- anyone --, therefor.

In column 45, line 30, after "time" insert -- . --.

In column 47, line 31, after "requests" insert -- . --.

In column 50, line 42, delete "seem" and insert -- seen --, therefor.

In column 51, line 51, delete "EBJ" and insert -- EJB --, therefor.

In column 61, line 57, after "update" insert -- . --.

In column 63, line 46, delete "execution;" and insert -- execution. --, therefor.

In column 67, line 67, after "service" insert -- . --.